United States Patent
Kim et al.

(10) Patent No.: US 8,724,564 B2
(45) Date of Patent: May 13, 2014

(54) METHOD FOR TRANSMITTING CONTROL INFORMATION ABOUT DOWNLINK MULTIPLE CARRIERS IN A WIRELESS COMMUNICATION SYSTEM

(75) Inventors: Ki Hwan Kim, Gyeonggi-do (KR); Hyun Soo Ko, Gyeonggi-do (KR); Jae Hoon Chung, Gyeonggi-do (KR); Yeong Hyeon Kwon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 705 days.

(21) Appl. No.: 13/055,702

(22) PCT Filed: Aug. 3, 2009

(86) PCT No.: PCT/KR2009/004324
§ 371 (c)(1),
(2), (4) Date: Jan. 24, 2011

(87) PCT Pub. No.: WO2010/016698
PCT Pub. Date: Feb. 11, 2010

(65) Prior Publication Data
US 2011/0128942 A1      Jun. 2, 2011

Related U.S. Application Data

(60) Provisional application No. 61/156,333, filed on Feb. 27, 2009, provisional application No. 61/153,972, filed on Feb. 20, 2009, provisional application No. 61/116,641, filed on Nov. 21, 2008, provisional application No. 61/116,640, filed on Nov. 21, 2008, provisional application No. 61/087,181, filed on Aug. 8, 2008, provisional application No. 61/086,474, filed on Aug. 6, 2008, provisional application No. 61/086,454, filed on Aug. 5, 2008.

(30) Foreign Application Priority Data

Jul. 14, 2009   (KR) .................. 10-2009-0064135

(51) Int. Cl.
| | | |
|---|---|---|
| H04W 72/04 | (2009.01) | |
| H04L 1/00 | (2006.01) | |
| H04L 1/16 | (2006.01) | |
| H04L 1/18 | (2006.01) | |
| H04L 5/00 | (2006.01) | |

(52) U.S. Cl.
CPC ......... *H04W 72/0413* (2013.01); *H04L 1/0026* (2013.01); *H04L 1/1671* (2013.01); *H04L 1/1861* (2013.01); *H04L 5/0053* (2013.01)
USPC .......................................... 370/329; 370/522

(58) Field of Classification Search
CPC ................... H04W 72/0413; H04W 72/1263; H04W 72/1268; H04W 72/1278; H04W 72/1284; H04L 1/0026; H04L 1/1671; H04L 1/1861; H04L 5/0053; H04L 5/0055; H04L 5/0057
USPC ........................................................ 370/336
See application file for complete search history.

(56) References Cited

U.S. PATENT DOCUMENTS 7,184,703 B1    2/2007  Naden et al.
7,912,133 B2 *  3/2011  Cheon et al. ............. 375/240.27
(Continued)

FOREIGN PATENT DOCUMENTS

| EP | 1533966 | 5/2005 |
|---|---|---|
| KR | 10-2005-0048861 | 5/2005 |
| WO | 2007/020995 | 2/2007 |

OTHER PUBLICATIONS

Texas Instruments, "Design Aspects of UE Feedback", R1-073423, 3GPP TSG RAN WG1 50, Aug. 2007, 5 pages.

(Continued)

*Primary Examiner* — Min Jung
(74) *Attorney, Agent, or Firm* — Lee, Hong, Degerman, Kang & Waimey

(57) ABSTRACT

A method for transmitting uplink control information in a wireless communication system is disclosed. The method includes receiving one or more downlink component carriers among N downlink component carriers created by dividing a multi-carrier by an integer N, and transmitting control information about the received one or more downlink component carriers in one or more uplink component carriers among N uplink component carriers created by dividing a multi-carrier by the integer N, wherein the control information about the received one or more downlink component carriers is distributed equally or unequally to the one or more uplink component carriers and the control information includes at least one of a Channel Quality Information/Precoding Matrix Index (CQI/PMI), an ACKnowledgment/Negative ACKnowledgment (ACK/NACK), and a Rank Indication (RI).

16 Claims, 72 Drawing Sheets

(56) References Cited

U.S. PATENT DOCUMENTS

| | | | |
|---|---|---|---|
| 8,094,733 B2 | 1/2012 | Kwon et al. | |
| 8,140,944 B2 * | 3/2012 | Chen et al. | 714/776 |
| 8,165,081 B2 * | 4/2012 | Papasakellariou et al. | 370/329 |
| 8,171,372 B2 * | 5/2012 | Pan | 714/758 |
| 8,209,576 B2 | 6/2012 | Zhang | |
| 8,259,848 B2 * | 9/2012 | Malladi | 375/298 |
| 8,289,908 B2 | 10/2012 | Barriac | |
| 8,457,235 B2 * | 6/2013 | Ko et al. | 375/267 |
| 2004/0227859 A1 | 11/2004 | Liang et al. | |
| 2005/0128993 A1 | 6/2005 | Yu et al. | |
| 2005/0281226 A1 | 12/2005 | Lee et al. | |
| 2006/0274712 A1 | 12/2006 | Malladi et al. | |
| 2007/0098093 A1 | 5/2007 | Kwon et al. | |
| 2007/0218917 A1 | 9/2007 | Frederiksen et al. | |
| 2008/0051149 A1 | 2/2008 | Mehta et al. | |
| 2008/0095106 A1 | 4/2008 | Malladi et al. | |
| 2008/0095223 A1 | 4/2008 | Tong et al. | |
| 2009/0103447 A1 | 4/2009 | Harada et al. | |
| 2009/0180561 A1 * | 7/2009 | Kim et al. | 375/260 |
| 2009/0245169 A1 * | 10/2009 | Zhang et al. | 370/328 |
| 2011/0274099 A1 | 11/2011 | Kwon et al. | |
| 2012/0008585 A1 | 1/2012 | Kwon et al. | |
| 2012/0014329 A1 | 1/2012 | Kwon et al. | |
| 2012/0120838 A1 | 5/2012 | Farajidana et al. | |
| 2013/0003681 A1 | 1/2013 | Earnshaw et al. | |

OTHER PUBLICATIONS

Ericsson, "Carrier aggregation in LTE-Advanced", R1-082468, TSG-RAN WG1 #53bis, Jun.-Jul. 2008, 6 pages.

Huawei, "Carrier aggregation in Advanced E-UTRA", R1-082448, 3GPP TSG RAN WG1#53bis, Jun.-Jul. 2008, 4 pages.

United Kingdom Intellectual Property Office Application Serial GB1100271.4, Office Action dated Dec. 13, 2012, 4 pages.

United States Patent and Trademark Office U.S. Appl. No. 13/054,895, Office Action dated Dec. 20, 2012, 12 pages.

The State Intellectual Property Office of the People's Republic of China Application Serial No. 200980130841.1, Office Action dated Mar. 14, 2013, 4 pages.

United States Patent and Trademark Office U.S. Appl. No. 13/054,895, Final Office Action dated Jun. 27, 2013, 11 pages.

* cited by examiner existing backward mapping

METHOD FOR TRANSMITTING CONTROL INFORMATION ABOUT DOWNLINK MULTIPLE CARRIERS IN A WIRELESS COMMUNICATION SYSTEM

CROSS-REFERENCE TO RELATED APPLICATIONS

This application is a 371 U.S. national stage application of International Application No. PCT/KR2009/004324, filed on Aug. 3, 2009, which claims priority to Korean Application No. 10-2009-0064135, filed on, Jul. 14, 2009, and U.S. Provisional Application Ser. Nos. 61/156,333, filed on Feb. 27, 2009, 61/153,972, filed on Feb. 20, 2009, 61/116,641, filed on Nov. 21, 2008, 61/116,640, filed on Nov. 21, 2008, 61/087, 181, filed on Aug. 8, 2008, 61/086,474, filed on Aug. 6, 2008, and 61/086,454, filed on Aug. 5, 2008, the contents of which are incorporated by reference herein in their entirety.

TECHNICAL FIELD

The present invention relates to a wireless communication system, and more particularly, to a method for transmitting control information about downlink multiple carriers in a wireless communication system.

BACKGROUND ART

FIG. 1 illustrates a subframe structure in which data and control information to be transmitted on a data channel are multiplexed and mapped to the data channel. A frame transmitted during one Transmission Time Interval (TTI) includes N×M Resource Elements (REs) that may be represented as a combination of N subcarriers and M Single Carrier-Frequency Division Multiple Access (SC-FDMA) symbols. Data and control information may reside in the REs on a modulation symbol basis.

In the frame, neither the data nor the control information is positioned in K REs having a Reference Signal (RS) and a Sounding RS (SRS). Therefore, the data may be carried in (N×M)-K REs. The data and the control information may have different modulation orders according to a transmission condition, a plurality of bits may be mapped to one symbol according to a modulation order, and one symbol is mapped to one RE. First, the amount of data and control information that can be delivered per SC-FDMA symbol is calculated. Then multiplexed data and control information are mapped sequentially to Resource Block (RB) 0 to RB (N−1) along a time axis (i.e. along an SC-FDMA symbol direction) on a subcarrier-by-subcarrier basis.

In FIG. 1, the control information may include first control information (control information 1), second control information (control information 2), and third control information (control information 3) or part of them. The multiplexed data and control information are mapped to the data channel on a modulation symbol basis according to a modulation scheme. The mapping proceeds to the right, starting from an uppermost left position of a first RB. In the same manner, modulation symbols are mapped to one subcarrier after another subcarrier.

Hence, the data and the control information are multiplexed through rate matching or puncturing to insert the control information between the data. The data and control information are not provided at the positions of the RSs and the SRS. Control information 1 is mapped along the SC-FDMA symbol direction, starting from an uppermost left RE of a subframe. Mapping of control information 2 starts with a last subcarrier, proceeding toward a first subcarrier, subcarrier 0.

Control information 3 is mapped to REs each apart from the RS by one RE, in the direction from the last subcarrier toward subcarrier 0. The Data is eventually filled in the remaining REs from the control information mapping in a similar manner to the mapping of control information 1.

Control information 1 may be a Channel Quality Information/Precoding Matrix Index (CQI/PMI) being a combination of a CQI and a PMI. As its appellation implies, the CQI is information indicative of a channel quality, and the PMI is the index of a codebook used for precoding. Control information 1 may be multiplexed with the data by rate matching.

Control information 2 may be a Hybrid Automatic Repeat reQuest (HARQ) response, ACKnowledgment/Negative ACKnowledgment (ACK/NACK). Control information 2 may be multiplexed by puncturing the data or control information 1.

Control information 3 may be a Rank Indication (RI) indicating the number of transport streams. Control information 3 may be multiplexed by puncturing the data or control information 1 or rate-matching with the data and/or control information 1.

Puncturing is the process of eliminating predetermined bits (or symbols) in a bit (or symbol) sequence and inserting new bits (or symbols) at the empty positions. That is, puncturing amounts to replacement of part of information with another piece of information. When data or control information is multiplexed, information to be inserted substitutes for punctured bits (or symbols) of information. Despite the insertion of new information by puncturing, a total bit (or symbol) length is maintained unchanged. Yet, the puncturing affects the coding rate of the punctured information.

Rate matching is the process of adjusting the coding rate of data. When data or control information is multiplexed by rate matching, the position of each piece of information may be changed but the rate matching does not affect bits (or symbols) prior to multiplexing. That is, 'rate matching' of control information 1 and the data means that control information 1 and the data are processed such that their sum is a predetermined value. Accordingly, if control information 1 increases in amount, the amount of data to be rate-matched with the control information is reduced as much.

FIG. 2 illustrates a multi-carrier. In FIG. 2, the multi-carrier represents a total frequency band available to a Base Station (BS), equivalent to a whole band in its meaning.

A Component Carrier (CC) is an element of the multi-carrier. That is, a plurality of CCs form the multi-carrier by carrier aggregation. A CC includes a plurality of lower bands. If the multi-carrier is called a whole band, a CC may be referred to as a subband and a lower band as a partial band. Carrier aggregation is also called bandwidth aggregation.

Carrier aggregation refers to extending a bandwidth by aggregating a plurality of carriers in order to increase data rate. For example, $3^{rd}$ Generation Partnership Project Long Term Evolution (3GPP LTE) uses a carrier of 20 MHz and Long Term Evolution-Advanced (LTE-A) extends the bandwidth of the carrier up to 100 MHz by aggregating five 20-MHz carriers. Carrier aggregation covers aggregating carriers in different frequency bands.

The extended bandwidth for communications increases the transmission capacity of a transmission system, thus increasing control information associated with the transmission in amount. Also, when bandwidth aggregation is adopted for compatibility with legacy systems, control information is created for each band. As a result, more control information as well as more data are produced. Simple extension of conventional methods to transmit the increased control information may cause the following problems.

Firstly, control information 1 as well as the data is punctured to ensure the performance of control information 2 that has been increased in amount. The puncturing brings about the performance degradation of control information 1. Secondly, if the transmission bandwidth of the control information is extended to ensure the performance of all increased control information, a last Code Block (CB) of the data is concentratedly punctured, thereby degrading the performance of the data. Thirdly, when a conventional method is used for a band to which bandwidth aggregation is applied, increased control information concentrates on a specific band among aggregated bands. Thus, the above first problem may be generated.

Meanwhile, if a BS fails to decode control information 3 (e.g. an RI) received from a mobile terminal, it may not find the start of the data because it does not locate control information 1 (e.g. a CQI/PMI) accurately. Consequently, data decoding is affected. Especially in the case where the data is constructed in a plurality of CBS, decoding errors become serious. In case of an extended Cyclic Prefix (CP), if the SRS is included in a last SC-FDMA symbol, power transition distorts the symbols of control information 3 adjacent to the SRS. Thus, the overall performance of control information 3 may be degraded. Moreover, conventional techniques do not ensure compatibility with a transmission system that extends a bandwidth by aggregating a plurality of groups of carriers (e.g. LTE-A), due to an increase in bandwidth for communications.

FIG. 3 illustrates a subframe structure in which control information except data is mapped to a data channel. Referring to FIG. 3, if specific control information is mapped to symbols near to an RS to guarantee the performance of the specific control information, meaningless data such as blanks illustrated in FIG. 3 are created, thus increasing an occupied bandwidth. In other words, more subcarriers are unused and thus the communication capacities of other mobile terminals may be decreased as much as the number of the unused subcarriers. Therefore, there exists a need for a method for avoiding HARQ buffer corruption in an HARQ transmission scheme, while reducing a bandwidth as much as possible.

DISCLOSURE

Technical Problem

An object of the present invention devised to solve the problem lies on a method for, when a bandwidth is extended for wireless communications, transmitting control information about the extended bandwidth.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

Technical Solution

The object of the present invention can be achieved by providing a method for transmitting uplink control information in a wireless communication system, the method including receiving one or more downlink component carriers among N downlink component carriers created by dividing a multi-carrier by an integer N, and transmitting control information about the received one or more downlink component carriers in one or more uplink component carriers among N uplink component carriers created by dividing a multi-carrier by the integer N, wherein the control information about the received one or more downlink component carriers is distributed equally or unequally to the one or more uplink component carriers and the control information includes at least one of a Channel Quality Information/Precoding Matrix Index (CQI/PMI), an ACKnowledgment/Negative ACKnowledgment (ACK/NACK), and a Rank Indication (RI).

If data is constructed in a plurality of code blocks in a subframe included in the one or more uplink component carriers, the plurality of code blocks may be interlaced on a time-domain modulation symbol basis in the subframe and mapped to the subframe.

If data is constructed in a plurality of code blocks in a subframe included in the one or more uplink component carriers, each of the plurality of code blocks may be mapped diagonally to the subframe on a time-domain modulation symbol basis.

The control information about each of the received one or more downlink component carriers may be separately encoded, concatenated, and distributed equally or unequally to the one or more uplink component carriers.

The control information about each of the received one or more downlink component carriers may be concatenated and jointly encoded.

The CQI/PMI included in the control information about the received one or more downlink component carriers may be sequentially mapped, starting from a first symbol of a first subcarrier used for uplink transmission.

The ACK/NACK included in the control information about the received one or more downlink component carriers may be mapped to symbols next to symbols to which a Reference Signal (RS) is mapped, starting from a last subcarrier toward a first subcarrier used for uplink transmission.

The ACK/NACK included in the control information about the received one or more downlink component carriers may be mapped to symbols next to symbols to which an RS is mapped, starting from a first subcarrier toward a last subcarrier used for uplink transmission.

The RI included in the control information about the received one or more downlink component carriers may be mapped to symbols apart from an RS by one Resource Element (RE), starting from a last subcarrier toward a first subcarrier used for uplink transmission.

The RI included in the control information about the received one or more downlink component carriers may be mapped sequentially, following data mapped in a predetermined carrier group.

In another aspect of the present invention, provided herein is a User Equipment (UE) for transmitting uplink control information in a wireless communication system, including a receiver for receiving one or more downlink component carriers among N downlink component carriers created by dividing a multi-carrier by an integer N, a transmitter for transmitting control information about the received one or more downlink component carriers in one or more uplink component carriers among N uplink component carriers created by dividing a multi-carrier by the integer N, and a processor for distributing the control information about the received one or more downlink component carriers equally or unequally to the one or more uplink component carriers, wherein the control information includes at least one of a Channel Quality Information/Precoding Matrix Index (CQI/PMI), an ACKnowledgment/Negative ACKnowledgment (ACK/NACK), and a Rank Indication (RI).

If data is constructed in a plurality of code blocks in a subframe included in the one or more uplink component carriers, the processor may map the plurality of code blocks to the subframe by interlacing the plurality of code blocks on a time-domain modulation symbol basis.

If data is constructed in a plurality of code blocks in a subframe included in the one or more uplink component carriers, the processor may map each of the plurality of code blocks diagonally to the subframe on a time-domain modulation symbol basis.

The processor may separately encode control information about each of the received one or more downlink component carriers, concatenate the separately coded control information, and distribute the concatenated control information equally or unequally to the one or more uplink component carriers.

The processor may concatenate the control information about each of the received one or more downlink component carriers and jointly encode the concatenated control information.

The processor may sequentially map the CQI/PMI included in the control information about the received one or more downlink component carriers, starting from a first symbol of a first subcarrier used for uplink transmission.

The processor may map the ACK/NACK included in the control information about the received one or more downlink component carriers to symbols next to symbols to which a Reference Signal (RS) is mapped, starting from a last subcarrier toward a first subcarrier used for uplink transmission.

The processor may map the ACK/NACK included in the control information about the received one or more downlink component carriers to symbols next to symbols to which an RS is mapped, starting from a first subcarrier toward a last subcarrier used for uplink transmission.

The processor may map the RI included in the control information about the received one or more downlink component carriers to symbols apart from an RS by one Resource Element (RE), starting from a last subcarrier toward a first subcarrier used for uplink transmission.

The processor may sequentially map the RI in the control information about the received one or more downlink component carriers, subsequently to data mapped in a predetermined carrier group.

Advantageous Effects

According to exemplary embodiments of the present invention, control information about a multi-carrier bandwidth can be transmitted, while ensuring the performance of data or the control information.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
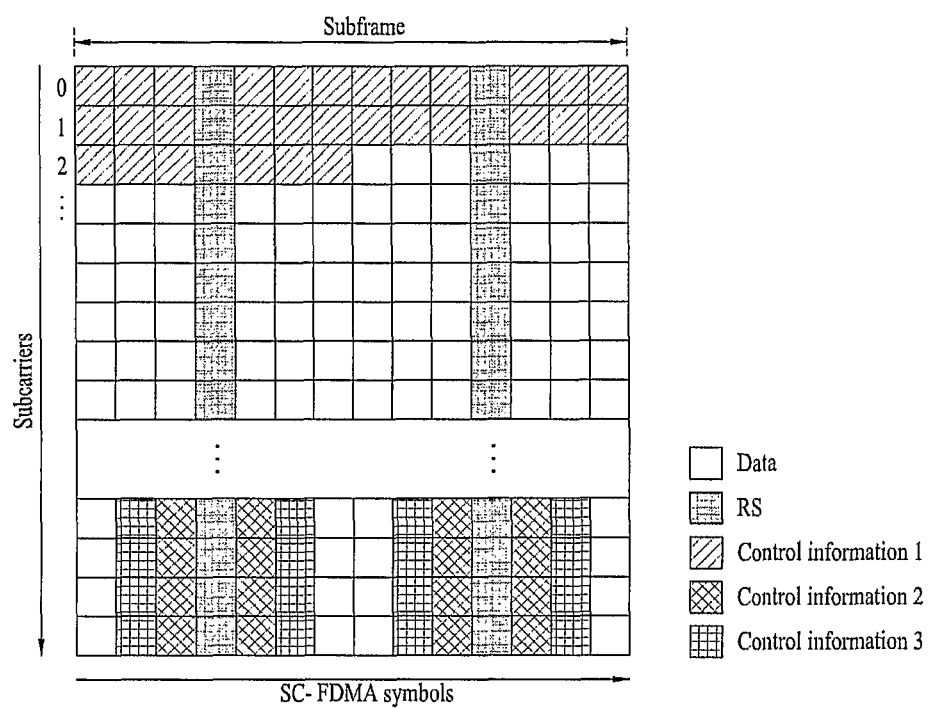
FIG. 1 illustrates a subframe structure in which data and control information to be transmitted on a data channel are multiplexed and mapped to the data channel.
Figure 2:
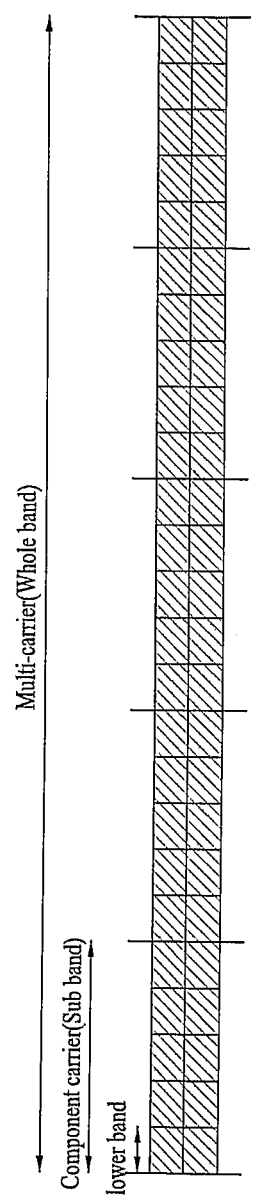
FIG. 2 illustrates a multi-carrier.
Figure 3:
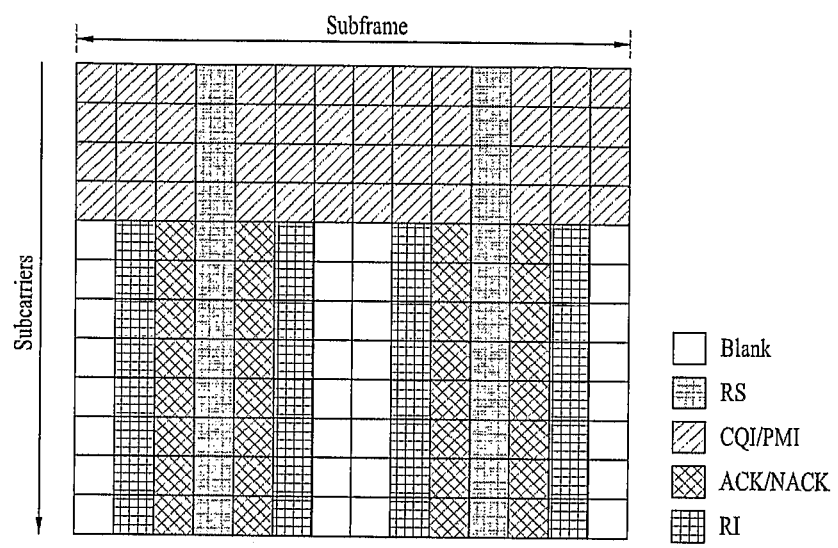
FIG. 3 illustrates a subframe structure in which control information except data is mapped to a data channel.

Now, the above and other aspects of the present invention will be described in detail through preferred embodiments with reference to the accompanying drawings so that the present invention can be easily understood and realized by those skilled in the art. The detailed description is intended to explain exemplary embodiments of the present invention, rather than to show the only embodiments that can be implemented according to the invention. In the attached drawings, parts irrelevant to the description of the present invention are omitted so as not to obscure the concept of the present invention. Wherever possible, the same reference numbers will be used throughout this specification to refer to the same or like components.

Throughout the specification, when it is said that a certain part "includes" a specific component, this implies that the certain part may further include other components, rather than it excludes other components, unless otherwise specified. Also, the terms " . . . portion", " . . . er(or)", and "module" refer to a unit that performs at least one function or operation, which can be implemented in hardware, software, or a combination thereof. Hereinbelow, a description will be made of a method for transmitting control information in a multi-carrier system according to an exemplary embodiment of the present invention.

The following description is made with the appreciation that first control information (control information 1) may be a Channel Quality Information (CQI)/Precoding Matrix Index (PMI) being a combination of a CQI representing information about a channel quality and a PMI indicating the index of a codebook used for precoding, and control information 1 may be multiplexed with data by rate matching.

Second control information (control information 2) may be a Hybrid Automatic repeat reQuest (HARQ) response, ACKnowledgment/Negative ACKnowledgment (ACK/NACK) and multiplexed with the data or control information 1 by puncturing the data or control information 1.

Control information 3 may be a Rank Indication (RI) indicative of the number of transport streams. Control information 3 may be multiplexed by puncturing the data or control information 1 or by rate-matching with the data and/or control information 1. Control information may be configured so as to include control information 1, control information 2, and control information 3, or part of them.

Embodiment 1

Figure 4:
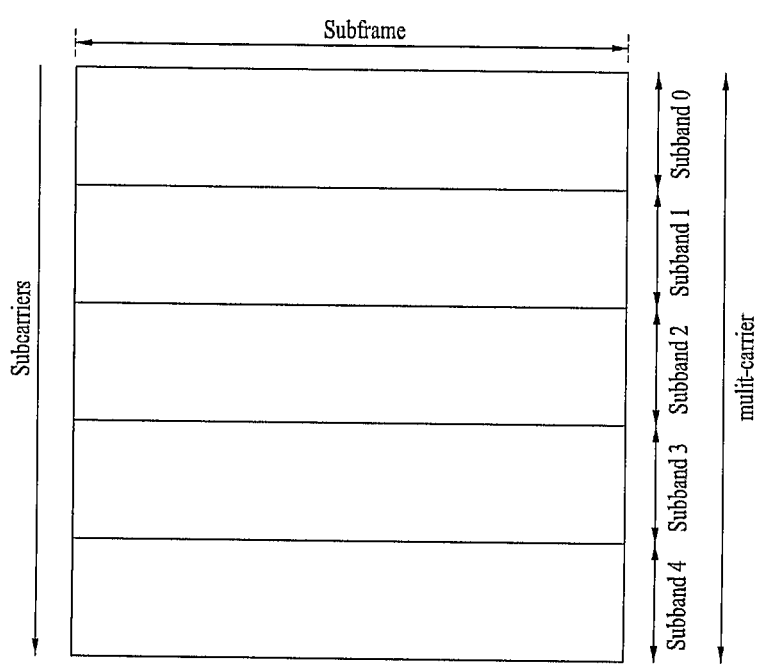
FIG. 4 illustrates a multi-carrier structure in which a whole band is subjected to bandwidth aggregation.

FIG. 4 illustrates a multi-carrier structure in which a whole band is subjected to bandwidth aggregation.

Referring to FIG. 4, the whole band includes subbands each occupying a predetermined frequency band. The whole band may be divided into five subbands of the same bandwidth or any other number of subbands.

In accordance with a method for transmitting control information in the subframe structure illustrated in FIG. 4 according to an exemplary embodiment of the present invention, data or control information is transmitted in a distributed fashion according to the channel qualities of the subbands. That is, CQIs being information about channel quality measurements may be used as a criterion for selecting subbands to be used for transmission. In an LTE system, a mobile terminal measures the CQIs of channels and transmits the CQI measurements to a BS periodically or non-periodically.

Figure 5:
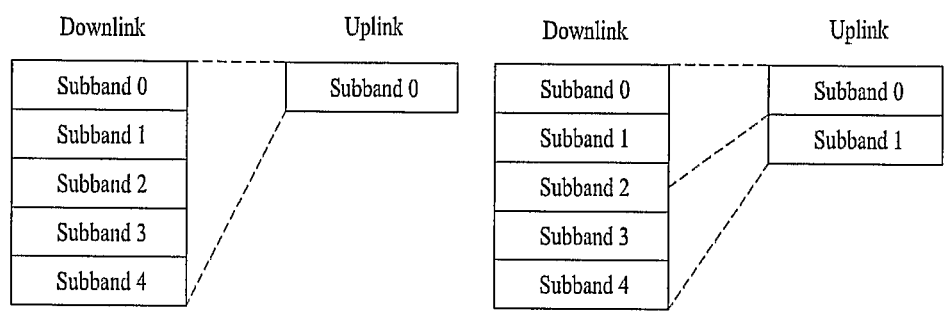
FIG. 5 illustrates a method for transmitting data and control information, when a DownLink (DL) and an Uplink (UL) are asymmetrical and the number of DL subbands is larger than that of UL subbands available for carrying responses to the DL subbands.

Therefore, the BS may select a subband in good status and notify the mobile terminal of the selected subband on the DownLink (DL), so that the mobile terminal transmits significant information or more information in the selected subband, when transmitting control information or data. The mobile terminal may allocate the control information or the data unequally to subbands based on a control information distribution rule preliminarily agreed on with the BS. Also, the mobile terminal may selectively transmit high-priority data or control information in a good-quality subband. Hence, the performance of the communication system may be increased. The control information may be distributed by types or by ratios. FIG. 5 illustrates a method for transmitting data and control information, when DL subbands and Uplink (UL) subbands are asymmetrical and the number of DL subbands is larger than that of UL subbands available for carrying responses to signals in the DL subbands.

The left side of FIG. 5 shows that control information about the DL subbands may be collected and transmitted in a specific UL subband (for example, a predetermined one subband), whereas the right side of FIG. 5 shows that the control information about the DL subbands may be transmitted in two UL subbands, equally or unequally. While one or two UL subbands are taken as an example in FIG. 5, the number of UL subbands may be 3 or 4.

Figure 6:
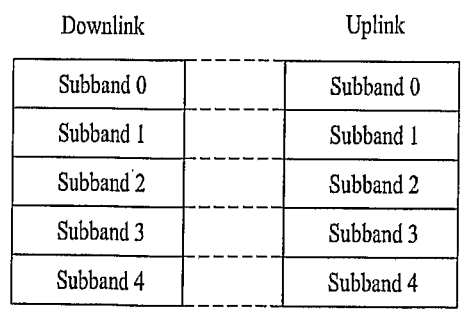
FIG. 6 illustrates a method for transmitting data and control information, when a DL and a UL are symmetrical and the number of DL subbands is equal to that of UL subbands.

FIG. 6 illustrates a method for transmitting data and control information, when a DL and a UL are symmetrical and the number of DL subbands is equal to that of UL subbands. Because there are as many UL subbands as DL subbands, control information about each DL subband may be transmitted in a UL subband mapped to the DL subband or control information about the DL subbands is collected and transmitted in the UL subbands, equally or unequally.

Figure 7:
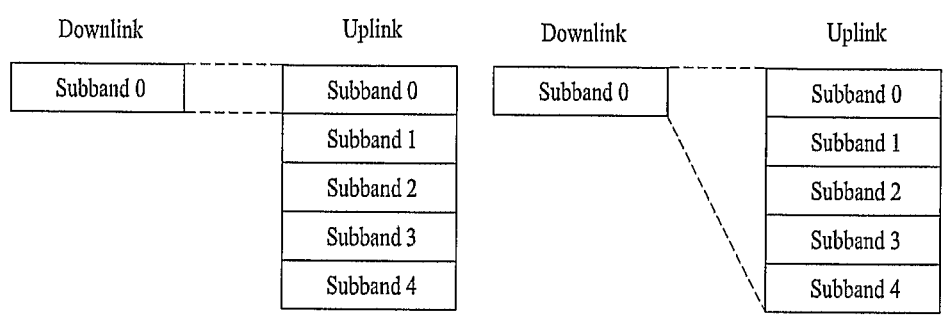
FIG. 7 illustrates a method for transmitting data and control information, when a DL and a UL are asymmetrical and the number of DL subbands is less than that of UL subbands available for transmitting responses to the DL subbands.

FIG. 7 illustrates a method for transmitting data and control information, when a DL and a UL are asymmetrical and the number of DL subbands is less than that of UL subbands available for transmitting responses to the DL subbands.

The left side of FIG. 7 shows that control information about a DL subband may be transmitted in a UL subband mapped to the DL subband, whereas the right side of FIG. 7 shows that the control information about the DL subband may be distributed to the UL subbands, equally or unequally. For data transmitted in each DL subband, it is required that an ACK/NACK signal as an HARQ response is transmitted on the UL. At the same time, at least one of a CQI/PMI and an RI may be reported on the UL together with the ACK/NACK.

Therefore, increased control information may be transmitted on a data channel in a predetermined single subband or equally or unequally in two or more subbands.

Control information 1 may be delivered in one subband, control information 2 in another subband, and control information 3 in a third subband. Alternatively, each of control information 1, control information 2 and control information 3 may be divided equally or unequally and transmitted in separate subbands.

In addition, the total UL control information to be transmitted may be allocated to UL subbands on a symbol basis, or allocated separately to the UL subbands according to the DL subbands associated with the UL control information.

Figure 8:
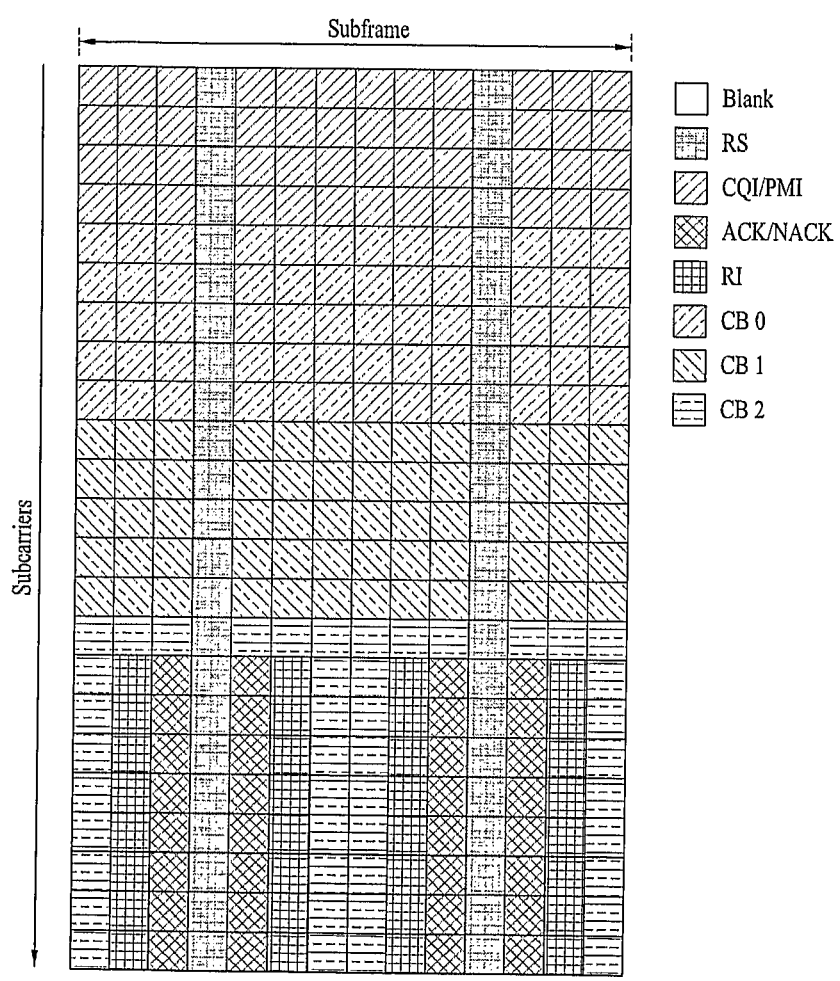
FIG. 8 illustrates a subframe structure in which data is constructed in one or more Code Blocks (CBs).

FIG. 8 illustrates a subframe structure in which data is constructed in one or more Code Blocks (CBs).

Referring to FIG. 8, CBs to be transmitted are serialized and mapped to a transmission channel in a time-first manner. The time-first mapping refers to sequential mapping in the time domain. Herein, much data are punctured in a specific CB due to control information 2 which has been increased in amount, resulting in the degradation of the whole performance of data transmission.

Figure 9:
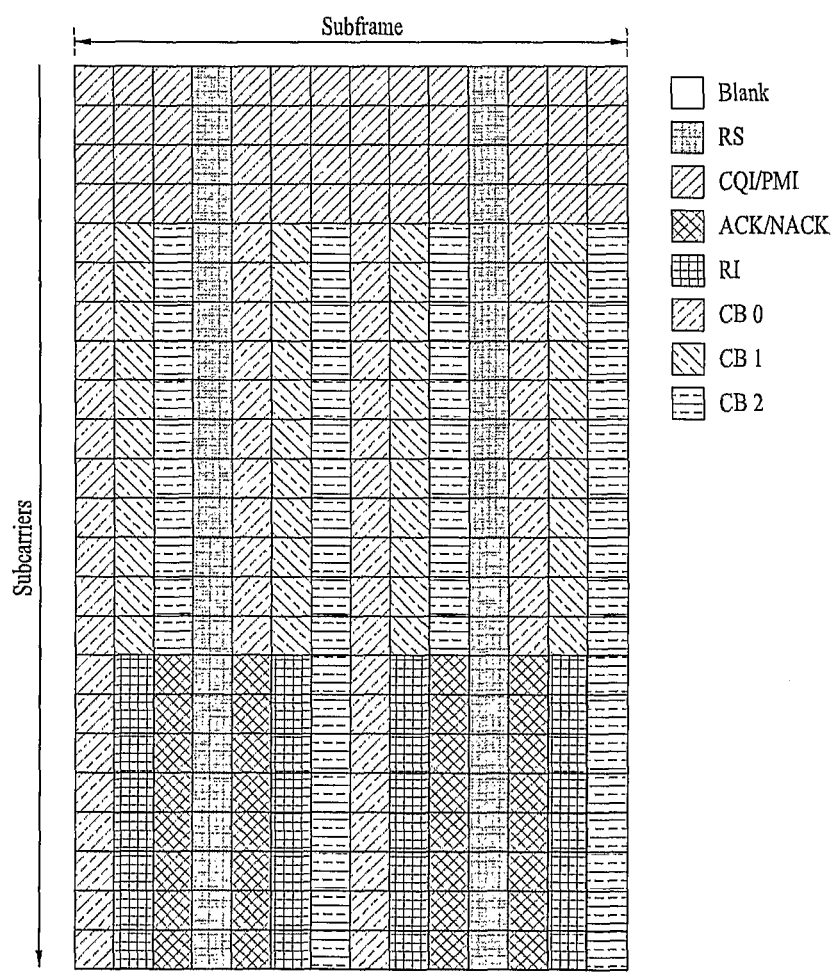
FIG. 9 illustrates a subframe structure in the case where CBs of data are interlaced with one another on a CB symbol basis or on a predetermined size basis prior to multiplexing and then the interlaced code blocks are input to a multiplexer of data and control information.

FIG. 9 illustrates a subframe structure in the case where CBs of data are interlaced with one another on a CB symbol basis or on the basis of a predetermined size prior to multiplexing and then the interlaced CBs are input to a data-control information multiplexer. Compared to the subframe structure illustrated in FIG. 8, since CBs of data are interlaced with one another on a CB symbol basis or on the basis of a predetermined size prior to multiplexing and then the interlaced CBs are input to the multiplexer, the CBs are mixed with one another in the data. Therefore, despite puncturing of the data for inserting control information 2, the coding rate of each CB may be maintained relatively uniform and the decoding performance of the transmitted data may be increased.

Figure 10:
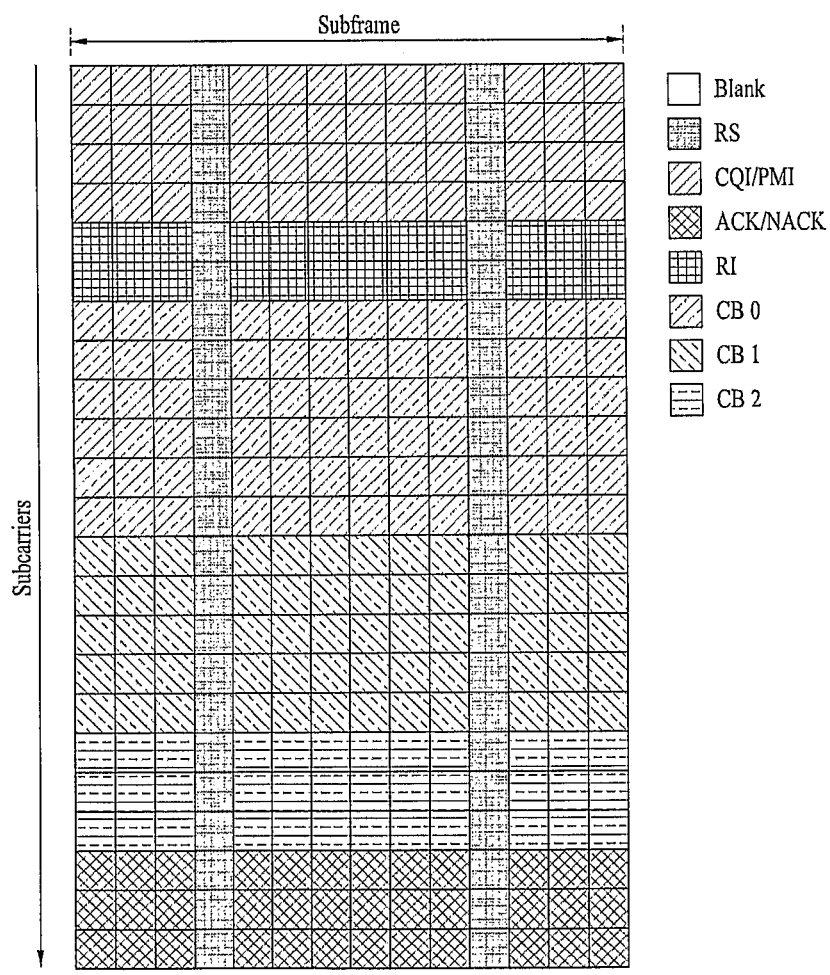
FIGS. 10 to 13 illustrate subframe structures referred to for describing exemplary methods for multiplexing and mapping data and control information, when the data is constructed in one or more CBs.

FIG. 10 illustrates a subframe structure referred to for describing an exemplary method for multiplexing and mapping data and control information, when the data is constructed in one or more CBs.

Referring to FIG. 10, control information 1 is mapped in the time-first manner, starting from a first SC-FDMA symbol of a first subcarrier and then mapped to following subcarriers in the same manner, as is done conventionally. Unlike the conventional mapping, control information 3 follows control information 1 in the time-first mapping manner. Control information 2 is mapped to REs allocated to it, starting from a last SC-FDMA symbol of a last subcarrier and the data occupies remaining REs except the REs allocated to the control information.

When rate matching is applied to control information, a rate matcher controls the transmission capacities of the data and the control information according to a transmission band. On the other hand, if puncturing is applied to control information, the data is placed in the area of the control information and punctured for the control information.

Figure 11:
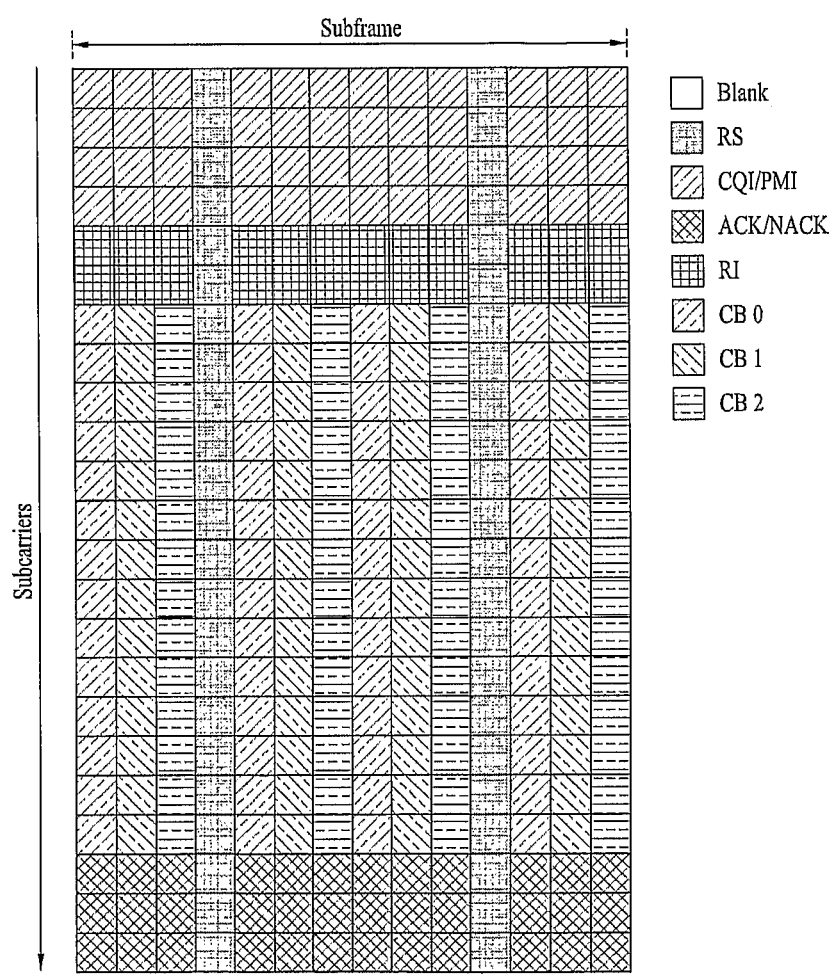

FIG. 11 illustrates a subframe structure referred to for describing an exemplary method for multiplexing and mapping data and control information, when the data is constructed in one or more CBs. A big problem encountered with the subframe structure illustrated in FIG. 9 is that due to control information 2 inserted through puncturing, a specific CB is subjected to concentrated puncturing and, as a result, the overall transmission performance of the data may be degraded. In this context, the multiplexing and mapping method illustrated in FIG. 10 may be introduced to re-configure a subframe. That is, the subframes illustrated in FIGS. 10 and 11 are identical in that the control information is mapped at the same positions in the two subframes, but different in that the data is mixed on a CB basis or on the basis of part of a CB in the subframe illustrated in FIG. 11. Accordingly, despite an increase in the amount of control information 2, data puncturing may be relatively uniform in the specific CB and thus the overall performance degradation of the data transmission may be avoided.

Figure 12:
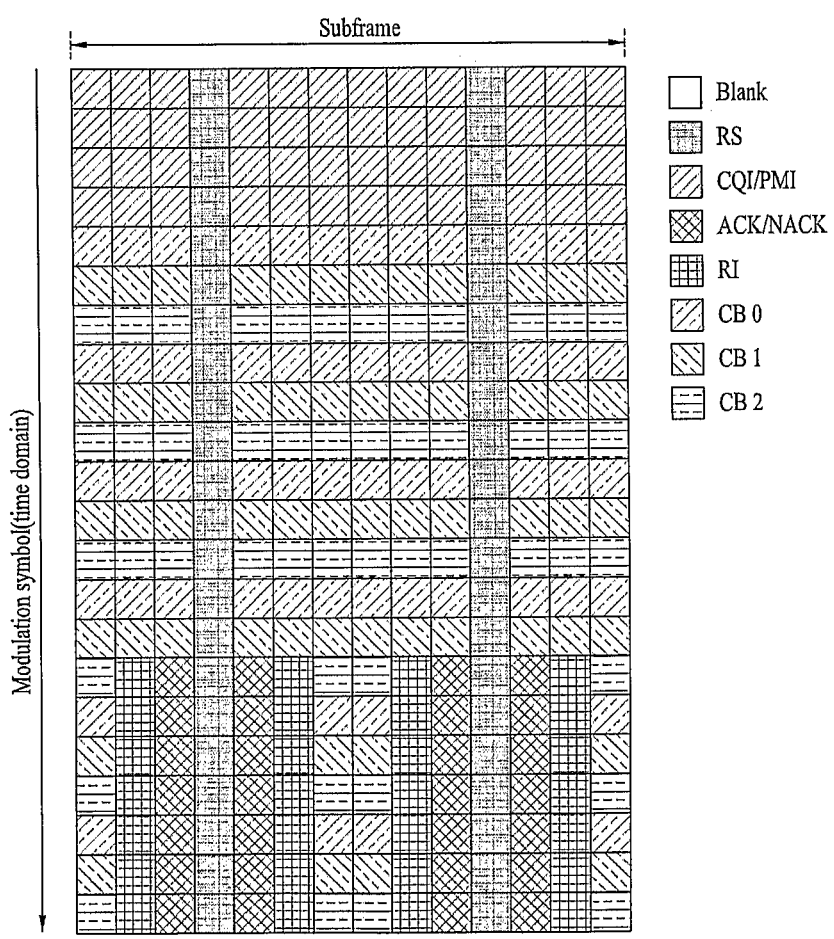

FIG. 12 illustrates a subframe structure referred to for describing an exemplary method for multiplexing and mapping data and control information, when the data is constructed in one or more CBs. As stated above, an increase in the amount of control information 2 may lead to concentrated puncturing in a specific CB, degrading the overall transmission performance of data, when the data is constructed in one or more CBs. To avert this problem, there is proposed a method for interlacing the CBs of the data with one another on an SC-FDMA symbol basis or on a time-domain modulation symbol basis, prior to multiplexing of the control information and the data, and then providing the interlaced CBs to the data-control information multiplexer, rather than for serially concatenating the CBs and mapping them to a transmission channel in the time-first manner.

Figure 13:
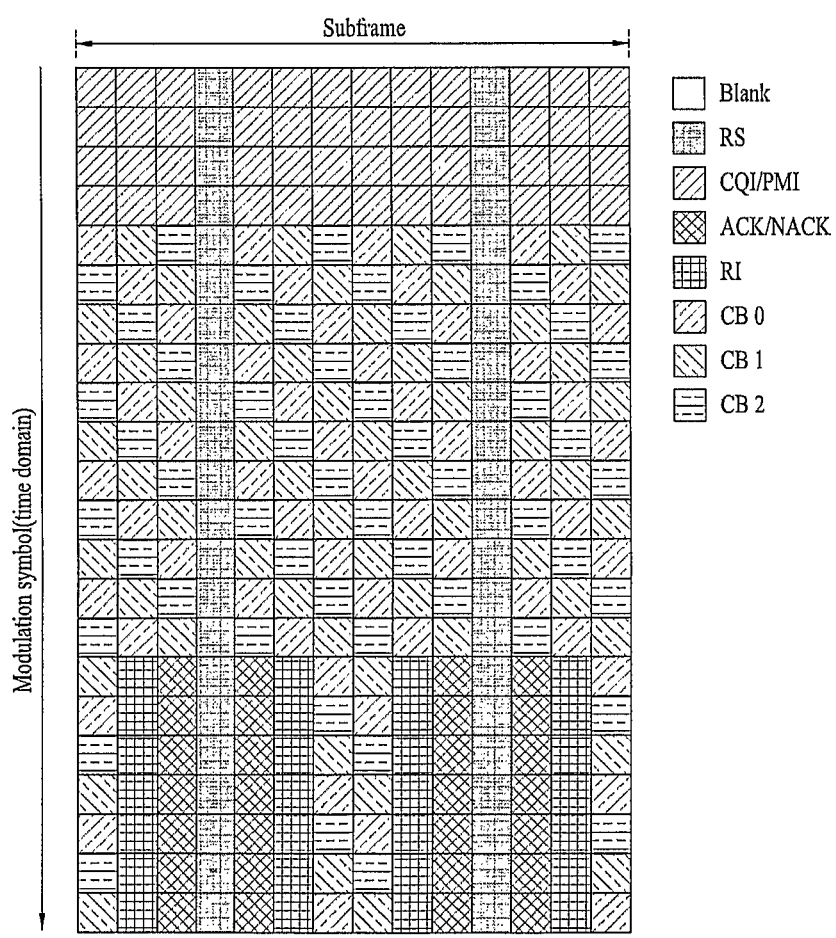

FIG. 13 illustrates a subframe structure referred to for describing an exemplary method for multiplexing and mapping data and control information, when the data is constructed in one or more CBs. As stated above, an increase in the amount of control information 2 may lead to concentrated puncturing in a specific CB, degrading the overall transmission performance of data, when the data is constructed in one or more CBs. To avert this problem, there is proposed a method for performing symbol interleaving on the CBs in such a manner that time-domain modulation symbols of each CB are ordered diagonally, prior to multiplexing of the control information and the data, and then providing the CBs to the data-control information multiplexer.

According to the multiplexing and mapping methods illustrated in FIGS. 12 and 13, the CBs of data are interlaced with one another, thus maintaining the coding rate of each CB relatively uniform and increasing the decoding performance of the transmitted data, in spite of data puncturing for control information 2. To generate the input to the data-control information multiplexer, a Code Block Concatenation (CBC) function block of a conventional coding chain or an additional interleaver function block may be used. The CBC function block may construct coded transmission blocks by interleaving the CBs on a symbol basis or on the basis of a predetermined size, for input to the multiplexer.

Or an interleaver may be provided within the CBC function block or interposed between the CBC function block and the data-control information multiplexer, or an interleaver capable of multiplexing may be used, so as to construct coded transmission blocks by interleaving the CBs on a symbol basis or on the basis of a predetermined size, for input to the multiplexer of data and control information, or so as to perform interleaving in the multiplexer. Each of one or more CCs for use in transmission may be composed of contiguous or non-contiguous subcarriers.

Embodiment 2

Figure 14:
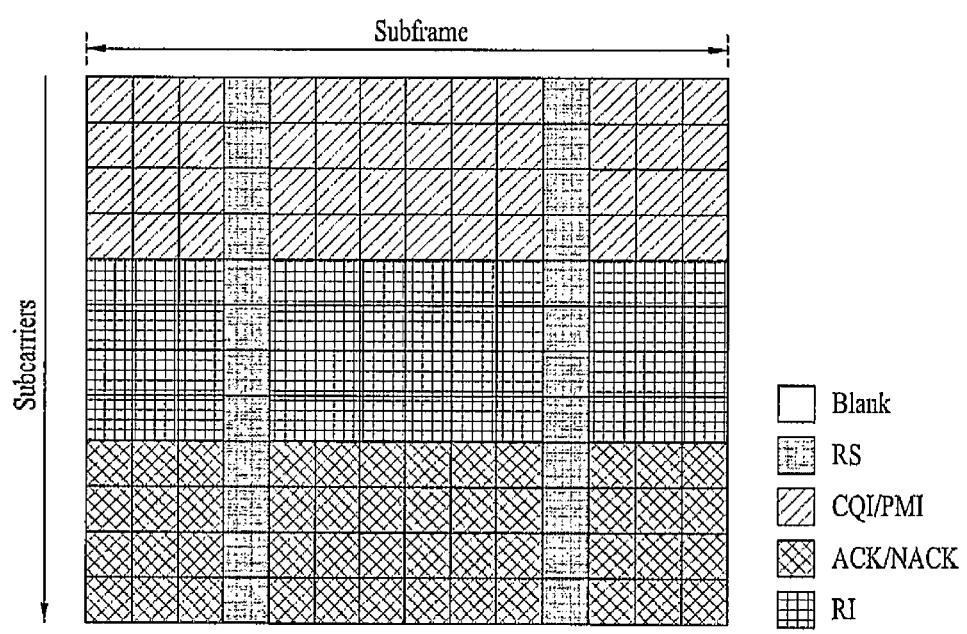
FIG. 14 illustrates a subframe structure in which control information except data is mapped to a data channel according to an exemplary embodiment of the present invention.

FIG. 14 illustrates a subframe structure in which only control information without data is mapped to a data channel.

Referring to FIG. 14, control information 1 is mapped to a first subcarrier, starting from a first SC-FDMA symbol in the time-first manner and then mapped to following subcarriers in the same manner, as is done conventionally. Control information 3 follows control information 1 in the time-first mapping manner, unlike the conventional mapping. Control information 2 occupies REs allocated to it, starting from a last SC-FDMA symbol of a last subcarrier. When rate matching is applied to control information, a rate matcher controls the transmission capacities of the data and the control information according to a transmission band. On the other hand, if puncturing is applied to the control information, the data is placed in the area of the control information and punctured for the control information.

Figure 15:
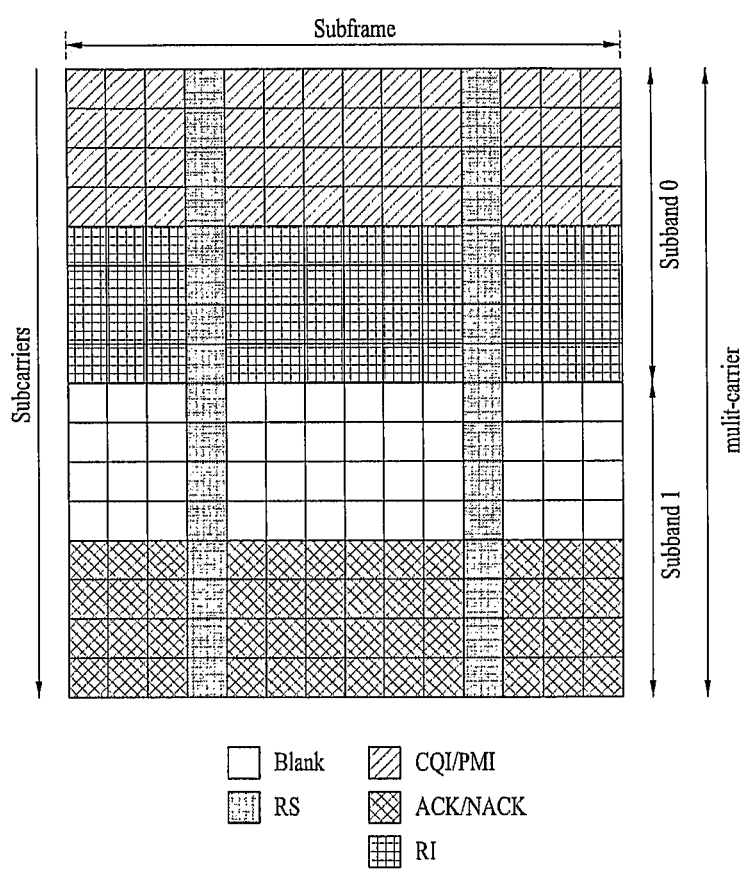
FIG. 15 illustrates a subframe structure in which control information except data is mapped to a data channel, in case of bandwidth aggregation.

FIG. 15 illustrates a subframe structure in which only control information without data is mapped to a data channel, in case of band aggregation.

Referring to FIG. 15, a whole band is divided into smaller bandwidths (e.g. subbands) and the following method applies to the smaller bandwidths. In the same manner as illustrated in FIG. 14, control information 1 and control information 3 may be mapped to a predetermined band (e.g. subband 0) in the time-first manner. Control information 2 may be mapped to another predetermined band (e.g. subband 1). In other words, when two or more subbands are used, the control information may be separately mapped to the subbands according to the characteristics of the control information. Control information 2 may be positioned at the start or end of the other subband (e.g. subband 1).

Figure 16:
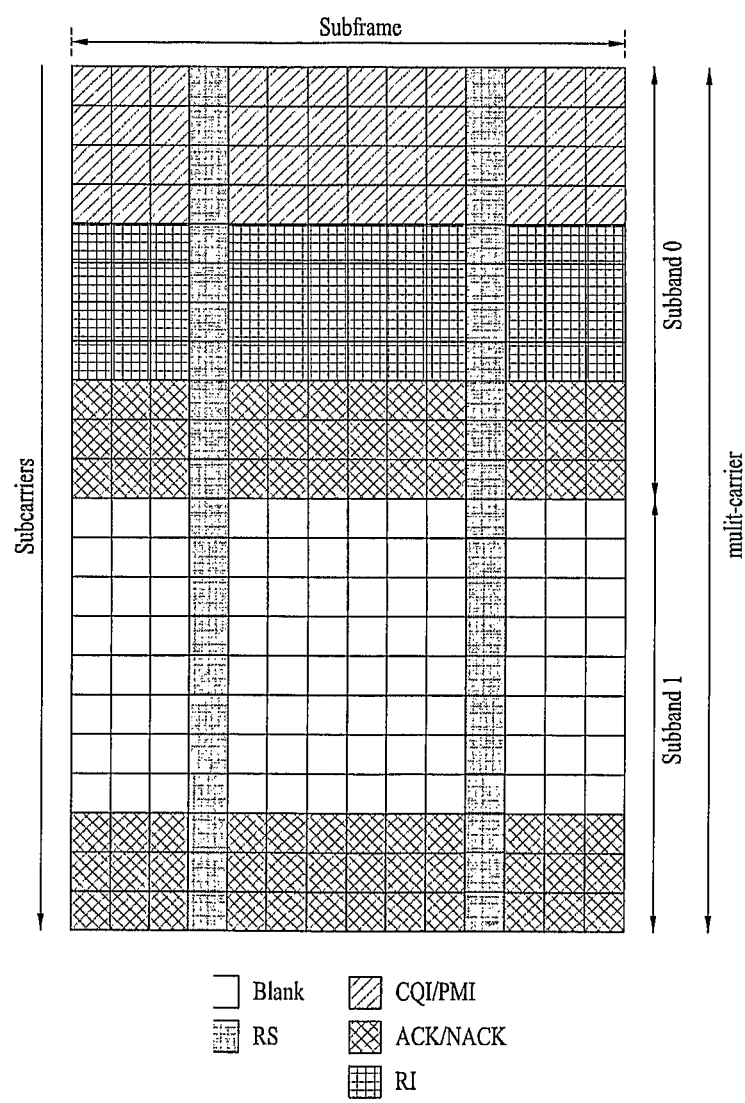
FIG. 16 illustrates a subframe structure in which control information except data is mapped to a data channel, in case of bandwidth aggregation.

FIG. 16 illustrates a subframe structure in which only control information without data is mapped to a data channel, in case of band aggregation.

Referring to FIG. 16, a whole band is divided into smaller bandwidths (e.g. subbands) and the following method applies to the smaller bandwidths. In the same manner as illustrated in FIG. 13, control information 1 and control information 3 may be mapped sequentially to a predetermined band (e.g. subband 0) in the time-first manner. Control information 2 may be distributed to predetermined bands (e.g. subband 0 and subband 1). In other words, when two or more subbands are used, the control information may be separately mapped and distributed to the subbands according to the characteristics of the control information. Control information 2 may be positioned at the start or end of each of the subbands (e.g. subbands 0 and 1).

While the cases of mapping only control information without data have been described above with reference to FIGS. 14, 15 and 16, if the data is mapped together with the control information, the data may be positioned in blanks, in blanks and the area of control information 2, next to control information 1, next to control information 3, between control information 1 and control information 2, in the areas of control information 1 and control information 2, between control information 3 and control information 2, or in the areas of control information 3 and control information 2. The positions of the data may be determined by interlacing the data on a CB basis or on the basis of part of a CB.

Embodiment 3

In a system where a whole band is a set of subbands, a DL and a UL may be symmetrical or asymmetrical in terms of the number of subbands. Hence, a mobile terminal needs to measure and report a CQI in a predetermined rule.

Figure 17:
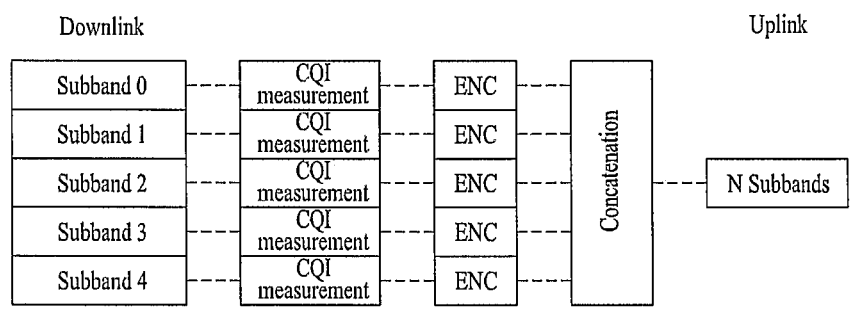
FIGS. 17 and 18 illustrate methods for reporting DL Channel Quality Information (CQIs) to a Base Station (BS) by a mobile terminal according to exemplary embodiments of the present invention.

FIG. 17 illustrates a method for reporting DL CQIs on an uplink to a BS by a mobile terminal according to an exemplary embodiment of the present invention.

Referring to FIG. 17, CQIs measured about DL subbands may be separately encoded and then concatenated. The concatenated CQI measurements may be distributed to UL subbands or collected to a predetermined UL subband, for transmission.

Figure 18:
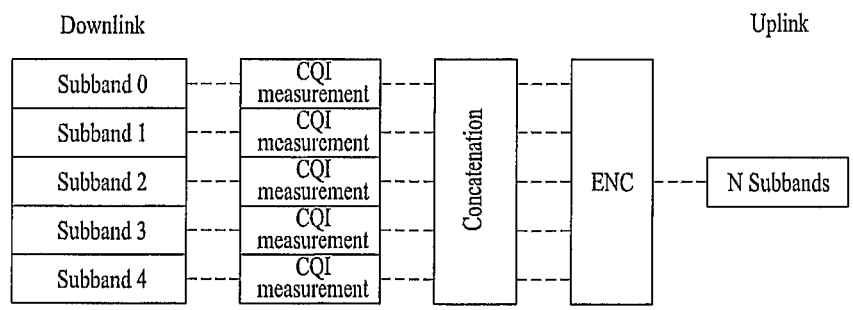

FIG. 18 illustrates a method for reporting DL CQIs on an uplink to a BS by a mobile terminal according to an exemplary embodiment of the present invention.

Referring to FIG. 18, CQIs measured about DL subbands may be concatenated and then encoded. The coded CQI measurements may be distributed to UL subbands or collected to a predetermined UL subband, for transmission.

In the cases illustrated in FIGS. 17 and 18, one or more UL subbands may be used to transmit CQIs. While five DL subbands are illustrated in FIGS. 17 and 18, the number of DL subbands may vary depending on circumstances. Hence, it may be understood that there are one or more DL subbands. Also, FIGS. 17 and 18 have been described above in the context of subbands, by way of example. Thus the subbands may be CCs.

If a specific DL subband is excluded from the CQI measuring, the CQI of the DL subband may not be subjected to measuring, coding, and concatenation.

Accordingly, the difference in number between DL subbands and UL subbands does not affect transmission of CQI measurements on the uplink and the CQI measurements may be decoded separately according to the DL subbands associated with the CQI measurements.

While only CQIs are transmitted in the methods illustrated in FIGS. 17 and 18, CQIs, ACKs/NACKs, and RIs may be wholly or partially joint-encoded or separately encoded, for transmission.

Embodiment 4

Figure 19:
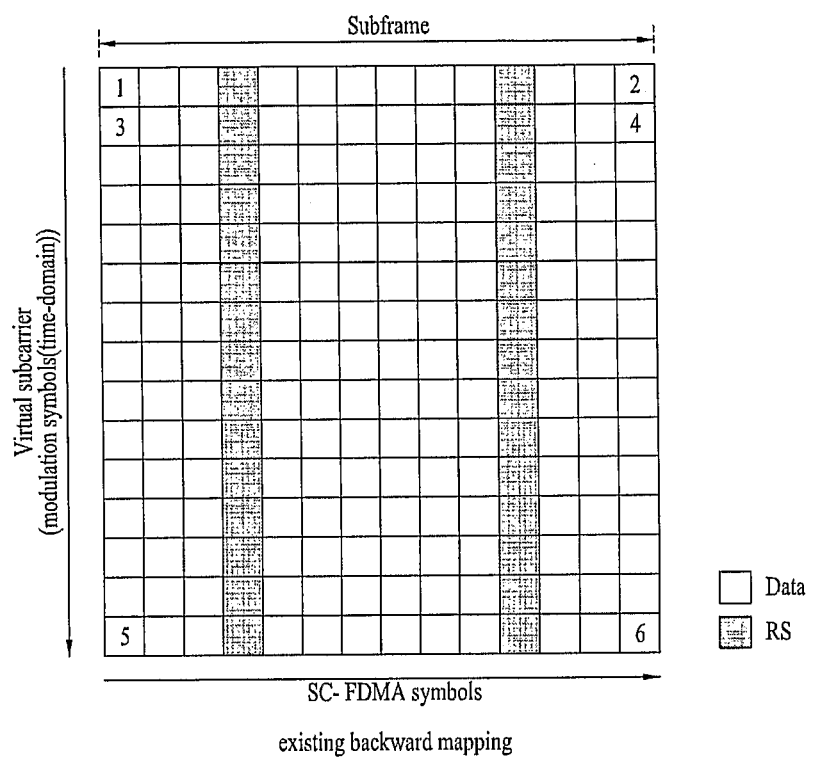
FIGS. 19 and 20 illustrate subframe structures referred to for describing data mapping methods in an LTE system.

FIG. 19 illustrates a subframe structure referred to for describing a data mapping method in an LTE system.

Referring to FIG. 19, when data or a transmission block is constructed in one or more CBs and the CBs are serialized to a sequence, the data is mapped sequentially to one RE after another RE in the direction from RE1 to RE2 (denoted by '1' and '2' in FIG. 19) at a first virtual subcarrier and then in the direction from RE3 to RE4 (denoted by '3' and '4' in FIG. 19) at the following virtual subcarrier.

In the same manner, the data is finally mapped to the REs of a last virtual subcarrier, one by one, along the direction from RE 5 to RE 6 (denoted by '5' and '6' in FIG. 19). The data may be rate-matched with a CQI/PMI and an RI and follow the REs of the CQI/PMI. If an RI is to be transmitted, the data is mapped to REs other than the REs of the RI.

An LTE-A system may still adopt the data mapping scheme of the LTE system, to thereby support a multiplexing scheme of the LTE system.

Figure 20:
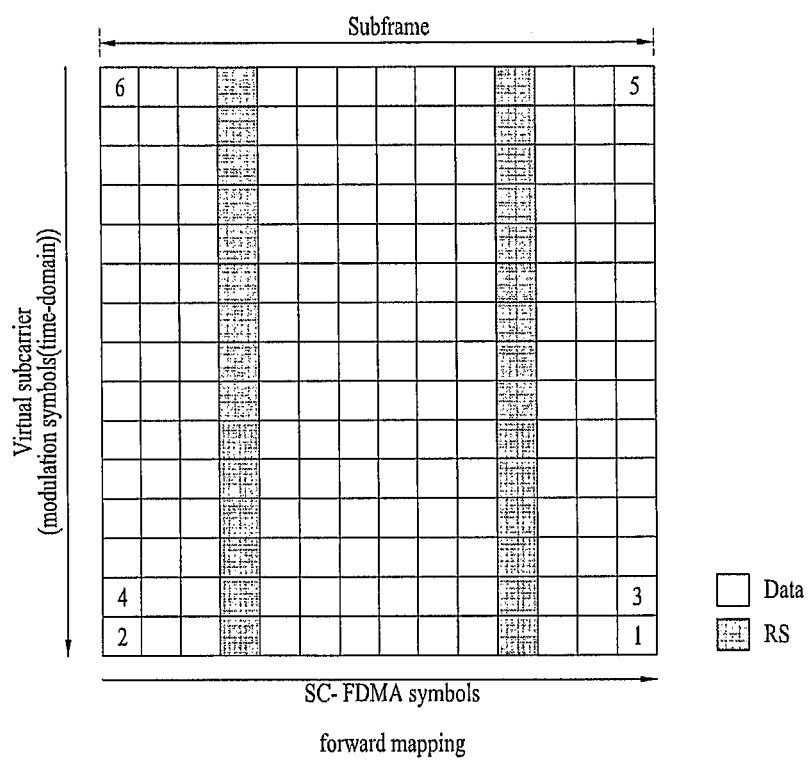

FIG. 20 illustrates a subframe structure referred to for describing the data mapping method in the LTE system.

Referring to FIG. 20, data is mapped in the reverse order to the data mapping illustrated in FIG. 19. Specifically, the data mapping starts with a last SC-FDMA symbol of a last virtual subcarrier, proceeding to a first SC-FDMA symbol of the last virtual subcarrier. In the same manner, the data is mapped to last to first SC-FDMA symbols at the second-to-last virtual subcarrier. Finally, the data mapping ends with a first SC-FDMA symbol of a first virtual subcarrier.

The data may be rate-matched with a CQI/PMI and an RI. Then the data mapping may end at an RE following the last RE of the CQI/PMI. In the presence of an RI, the data mapping avoids the REs of the RI. The same effects of the mapping illustrated FIG. 20 may be achieved even by reversing the sequence of one or more CBs serialized sequentially and mapping the reversed sequence in the mapping order illustrated in FIG. 19. The data mapping method illustrated in FIG. 20 offers the benefit of solving the problem that the start of data is not known due to miss-detection of the RI, as encountered with multiplexing a CQI/PMI and an RI with data, by reversing a data mapping order or a data construction order.

In FIGS. 19 and 20, a normal Cyclic Prefix (CP) is used for Physical Uplink Shared CHannel (PUSCH) transmission in the LTE system. Although the number of REs and the positions of an RS and an SRS may vary with the structures of the RS, the SRS and the CP, the basic concept is same.

The data mapping method illustrated in FIG. 19 may be modified as follows. The data is sequentially mapped to one RE after another RE in the direction from RE 5 to RE 6 at the last virtual subcarrier. Then at the second-to-last virtual subcarrier, the data is mapped to an RE corresponding to RE 5 to an RE corresponding to RE 6 on an RE basis. In this manner, the data mapping is carried out to the other subcarriers until the data is finally mapped to REs one by one in the direction from RE 1 to RE2 at the first virtual subcarrier. Herein, the data is rate-matched with a CQI/PMI and an RI and mapped to REs other than the REs assigned to the CQI/PMI and the RI.

Figure 21:
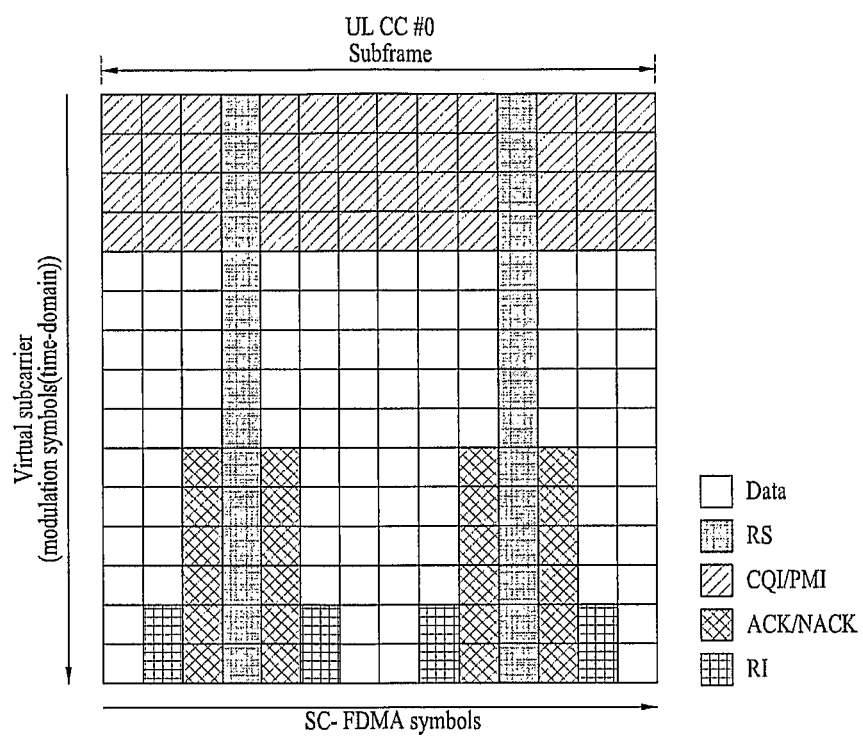
FIG. 21 illustrates a UL CC structure according to an exemplary embodiment of the present invention.

FIG. 21 illustrates the structure of a UL CC according to an exemplary embodiment of the present invention. It is assumed herein that links are established on N DL CCs and one UL CC between a BS and a mobile terminal, control information about the N DL CCs are transmitted on the single UL CC, the BS requests transmission of one RI per TTI to the mobile terminal, and a CQI/PMI, an RI, and an ACK/NACK are transmitted on a PUSCH during a TTI.

In case of CQI/PMI separate encoding, CQIs/PMIs about the N DL CCs are separately encoded, then concatenated, and mapped in the conventional LTE mapping scheme. In case of joint encoding, the CQIs/PMIs about the N DL CCs are first concatenated, then jointly encoded, and mapped in the conventional LTE mapping scheme.

An RI for a DL CC indicated by the BS is encoded and sequentially mapped in the conventional LTE mapping scheme.

Data is sequentially mapped, starting from an RE following the CQIs/PMIs according to the conventional LTE mapping scheme. Or the sequence of the data is reversed and then mapped sequentially, following the CQIs/PMIs in the conventional LTE mapping scheme. Or the data mapping is performed such that a last symbol of the data is mapped to the RE following the CQIs/PMIs, avoiding the REs of the RI, in the reverse order of the conventional LTE mapping scheme.

In case of separate ACK/NACK encoding, ACKs/NACKs are separately encoded according to their associated DL CCs, concatenated, and mapped in the conventional LTE mapping scheme. On the other hand, in case of joint encoding, the ACKs/NACKs for the DL CCs are concatenated, jointly encoded, and mapped in the conventional LTE mapping scheme. If the data or the CQIs/PMIs occupy REs available for the ACKs/NACKs, the data or the CQIs/PMIs are punctured for the ACKs/NACKs. The ACK/NACK joint encoding may differ depending on the number of ACK/NACK bits prior to encoding. If the number of ACK/NACK bits prior to encoding is equal to or less than a predetermined value A, a block encoder such as a Reed Muller (RM) encoder or the like may be used. If the number of ACK/NACK bits prior to encoding is larger than A, an encoder such as a Tail Biting Convolution Coder (TBCC) or the like may be used.

For example, with 11 bits used as a criterion, the LTE system may use a block code with a fixed output length and a variable input length or a bit tail biting convolutional code by reusing an LTE CQI/PMI coding scheme. When needed, a Cyclic Redundancy Check (CRC) may be attached to the code. Each piece of control information and data may occupy different numbers of REs according to Modulation and Coding Schemes (MCS) and coding rates, but their mappings are carried out in the same manner.

Figure 22:
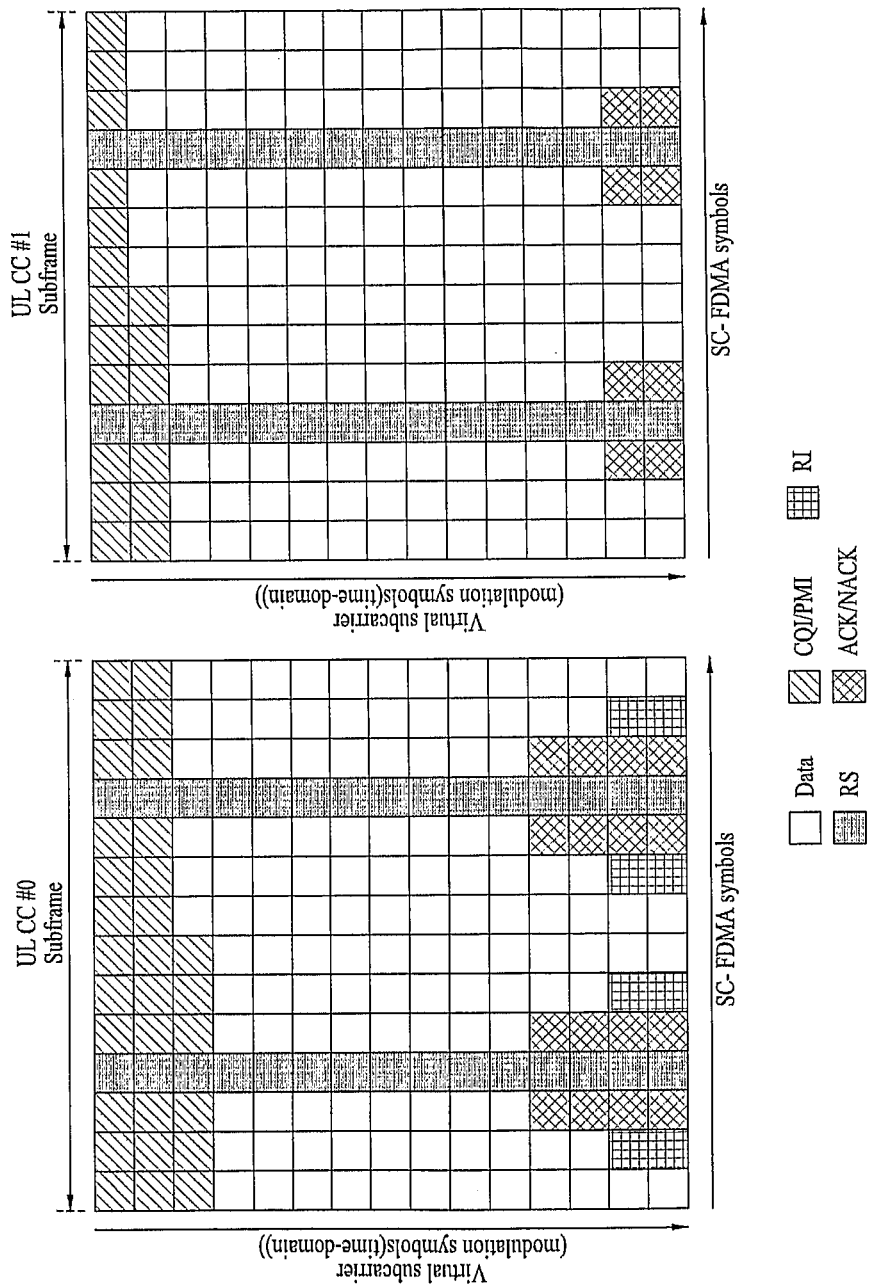
FIG. 22 illustrates a UL CC structure according to an exemplary embodiment of the present invention.

If four REs per virtual carrier available for each of an RI and an ACK/NACK are labeled so that a RE on the left of a left RS is RE 0, an RE on the right of the left RS is RE 1, an RE on the left of a right RS is RE 2, and an RE on the right of the right RS is RE 3, the conventional LTE mapping order of RE 0, RE 3, RE 2, and RE 1 may still be adopted. Or the mapping may be performed in any other order such as an order of RE 1, RE 2, RE 3, and RE 0, an order of RE 1, RE 2, RE 0, and RE 3, an order of RE 2, RE 1, RE 0, and RE 3, or an order of RE 2, RE 3, RE 0 and RE1, which is effective to symbol recovery based on inter-RS interpolation. FIG. 22 illustrates a UL CC structure according to an exemplary embodiment of the present invention. It is assumed herein that links are established on three DL CCs and two UL CCs between a BS and a mobile terminal, control information about two DL CCs set by the BS, DL CC #0 and DL CC #1 are transmitted on a UL CC set by the BS, UL CC #0, control information about the other DL CC set by the BS, DL CC #2 is transmitted on the other UL CC set by the BS, UL CC #1, the BS requests the mobile terminal to transmit one RI per TTI on UL CC #0, and data, a CQI/PMI, an RI, and an ACK/NACK are transmitted on a PUSCH during a TTI.

In the case where CQIs/PMIs are separately encoded, a CQI/PMI per DL CC is individually encoded. The coded CQIs/PMIs about DL CC #0 and DL CC #1 are concatenated and mapped to UL CC 0 in the conventional LTE mapping scheme. The coded CQI/PMI about DL CC #2 is mapped to UL CC #1 in the conventional LTE mapping scheme.

In case of joint encoding, the CQIs/PMIs for DL CC #0 and DL CC #1 are concatenated, jointly encoded, and mapped to UL CC #0 in the conventional LTE mapping scheme. The CQI/PMI about DL CC #2 is encoded and mapped to UL CC #1 in the conventional LTE mapping scheme.

An RI for a DL CC selected by the BS is encoded and sequentially mapped to UL CC #0 in the conventional LTE mapping scheme.

Data is sequentially mapped to each UL CC, starting from an RE following the CQIs/PMIs, or the sequence of the data is reversed and then mapped sequentially, following the CQIs/PMIs in the conventional LTE mapping scheme. Or the data mapping is performed such that a last symbol of the data is mapped to the RE following the CQIs/PMIs, avoiding the REs of the RI, in the reverse order of the conventional LTE mapping scheme.

In case of separate encoding, ACKs/NACKs for the respective DL CCs are separately encoded. Then the coded ACKs/NACKs for DL CC #0 and DL CC #1 are concatenated and mapped to UL CC #0. The coded ACK/NACK for DL CC #2 is mapped to UL CC #1 in the conventional LTE mapping scheme.

On the other hand, in case of joint encoding, the ACKs/NACKs for DL CC #0 and DL CC #1 are concatenated, jointly encoded, and mapped to UL CC #0. The ACK/NACK for DL CC #2 is encoded and mapped to UL CC #1 in the conventional LTE mapping scheme. If the data or the CQIs/PMIs occupy REs available for the ACKs/NACKs, the data or the CQIs/PMIs are punctured for the ACKs/NACKs. The ACK/NACK joint encoding may differ depending on the number of ACK/NACK bits prior to encoding. If the number of ACK/NACK bits prior to encoding is equal to or less than a predetermined value A, a block encoder such as an RM encoder or the like may be used. If the number of ACK/NACK bits prior to encoding is larger than A, an encoder such as a TBCC or the like may be used.

For example, with 11 bits used as a criterion, the LTE system may use a block code with a fixed output length and a variable input length or a bit tail biting convolutional code by reusing the LTE CQI/PMI coding scheme. When needed, a CRC may be attached to the code. Each piece of control information and data may occupy different numbers of REs according to an MCS and coding rates, but their mappings are carried out in the same manner.

If four REs per virtual carrier available for each of an RI and an ACK/NACK are labeled so that an RE on the left of a left RS is RE 0, an RE on the right of the left RS is RE 1, an RE on the left of a right RS is RE 2, and an RE on the right of the right RS is RE 3, the conventional LTE mapping order of RE 0, RE 3, RE 2, and RE 1 may still be adopted. Or the mapping may be performed in any other order such as an order of RE 1, RE 2, RE 3, and RE 0, an order of RE 1, RE 2, RE 0, and RE 3, an order of RE 2, RE 1, RE 0, and RE 3, or an order of RE 2, RE 3, RE 0 and RE 1, which is effective to symbol recovery based on inter-RS interpolation.

In the subframe structure according to the exemplary embodiment of the present invention, a transmission band may be divided into one or more carrier groups or aggregate carriers. Subcarriers or RBs for use in transmission may be from the same carrier group or from different carrier groups. The subcarriers or RBs may be consecutive or non-consecutive.

That is, when transmitting data, a mobile terminal may use subcarriers which are parts of the same carrier group or which are parts of the subcarriers or RBs of different carrier groups. Thus, subcarriers described in exemplary embodiments of the present invention may be successive or non-successive subcarriers within the same carrier group or a set of successive or non-successive subcarriers or RBs from different carrier groups. Also, it is to be understood that an SC-FDMA symbol may be an Orthogonal Frequency Division Multiple Access (OFDMA) symbol, a Discrete Fourier Transform Spread-Orthogonal Frequency Division Multiplexing (DFTS-OFDM) symbol, a clustered DFTS-OFDM symbol, or a pure SC-FDMA symbol according to a transmission scheme.

Figure 23:
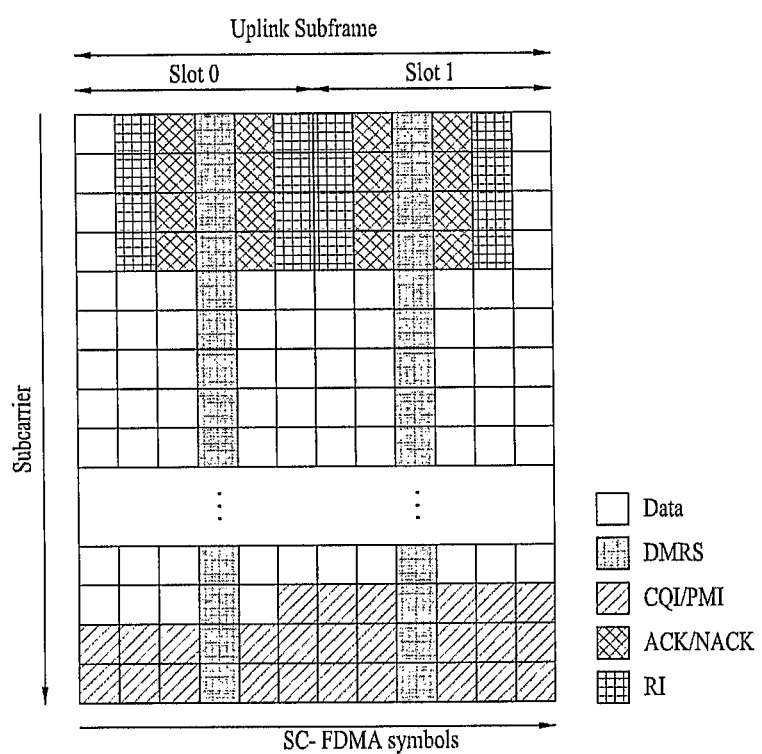
FIGS. 23, 24 and 25 illustrate subframe structures in which data and control information to be transmitted on a data channel are multiplexed and mapped to the data channel.

FIG. 23 illustrates a subframe structure in which data and control information to be transmitted on a data channel are multiplexed and then mapped to the data channel.

Referring to FIG. 23, an ACK/NACK is mapped to four REs corresponding to SC-FDMA symbols adjacent to DeModulation Reference Signals (DMRSs) and an RI is mapped to four REs each apart from the DMRSs by one RE.

Specifically, the ACK/NACK occupies REs corresponding to SC-FDMA symbols at both sides of the DMRSs at each of subcarriers starting from subcarrier 0 downward. Subcarrier 0 may be considered to be the first subcarrier of an RB, under which subcarriers 1, 2, 3, . . . are defined. The RI is positioned at REs one RE apart from the DMRSs at each of subcarriers starting from subcarrier 0 downward.

Figure 24:
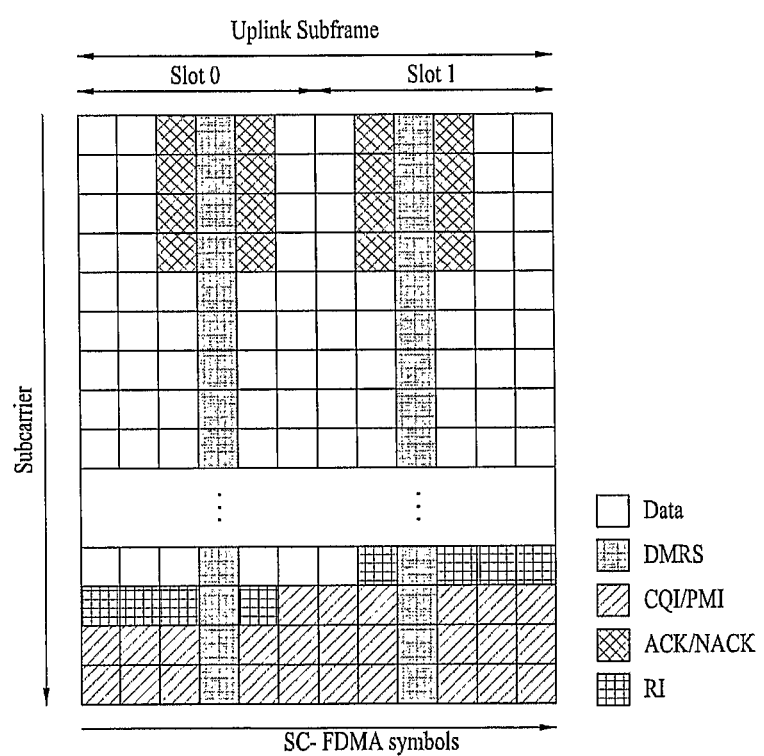

FIG. 24 illustrates a subframe structure in which data and control information to be transmitted on a data channel are multiplexed and mapped to the data channel.

Referring to FIG. 24, an ACK/NACK is mapped to four REs corresponding to SC-FDMA symbols adjacent to DMRSs and an RI follows data in the time-first mapping manner.

Specifically, the ACK/NACK occupies REs corresponding to SC-FDMA symbols at both sides of the DMRSs at each of subcarriers starting from subcarrier 0 downward. Subcarrier 0 may be considered to be the first subcarrier of an RB, under which subcarriers 1, 2, 3, . . . are defined.

When data is multiplexed with a CQI/PMI or the RI, it is mapped in the time-first manner, avoiding the REs of the CQI/PMI and the RI. If the CQI/PMI or the RI is not multiplexed with the data, the data may occupy the REs that might otherwise be occupied by the CQI/PMI or the RI. Also, the data occupies the REs of the ACK/NACK irrespective of the presence or absence of the ACK/NACK. In the presence of the ACK/NACK, the data is punctured for the ACK/NACK. When the RI is used, the CQI/PMI follows the RI in the time-first mapping manner. If the RI is not transmitted, the CQI/PMI is mapped in the time-first manner, following the data.

Figure 25:
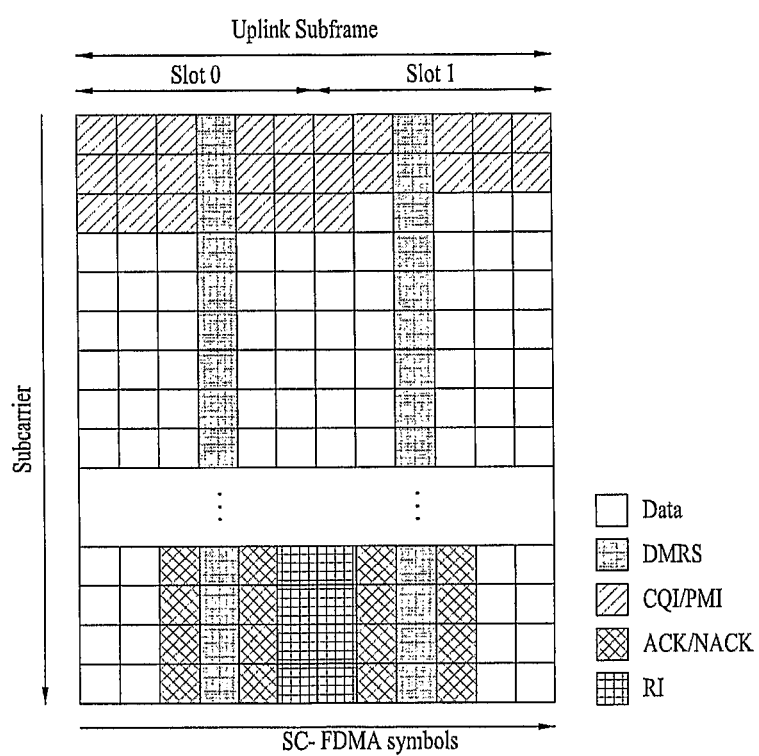

FIG. 25 illustrates a subframe structure in which data and control information to be transmitted on a data channel are multiplexed and mapped to the data channel.

Referring to FIG. 25, the number of symbols per subcarrier that an RI occupies is different from in FIGS. 23 and 24. That is, the RI may not be mapped to positions that might be affected by power transition-caused performance degradation in case where a last SC-FDMA symbol is used in the previous subframe or in the current subframe.

Therefore, the RI is mapped to two REs each being spaced from a DMRS by one RE at each of subcarriers starting from subcarrier 0 downward. Subcarrier 0 may be considered to be the first subcarrier of an RB, under which there are subcarriers 1, 2, 3, . . . .

In addition, a mapping order may be changed, while the conventional technological structure is still maintained. For example, time-first mapping reverse to the mapping illustrated in FIG. 1 as described in Background Artbrings about effects similar to those of FIG. 23.

An ACK/NACK occupies four REs corresponding to SC-FDMA symbols adjacent to the DMRSs and an RI is at four REs apart from the DMRSs by one RE. Specifically, the ACK/NACK is mapped to REs corresponding to SC-FDMA symbols at both sides of the DMRSs at each of subcarriers starting from a last subcarrier upward. Subcarrier 0 may be considered to be the first subcarrier of an RB, under which subcarriers 1, 2, 3, . . . are defined.

The RI is positioned at REs one RE apart from the DMRSs at each of subcarriers starting from a last subcarrier upward. Subcarrier 0 may be considered to be a first subcarrier of the RB, under which subcarriers 1, 2, 3, . . . are defined.

If data is multiplexed with a CQI/PMI or the RI, it is mapped in the reverse time-first manner, avoiding the REs of the CQI/PMI or RI. To be more specific, the data mapping starts with a last SC-FDMA symbol of the last subcarrier, proceeding to the first SC-FDMA symbol of the last subcarrier. After the data mapping is completed for one subcarrier, it is performed at another subcarrier immediately above the subcarrier, from the last to first SC-FDMA symbols. In this manner, the data is completely mapped. If the CQI/PMI or the RI is not multiplexed with the data, the data may occupy the REs that might be otherwise occupied by the CQI/PMI or RI.

In the subframe structures illustrated in FIGS. 23, 24 and 25, when data is multiplexed with a CQI/PMI or an RI, the data is mapped in the time-first manner, avoiding the positions of the CQI/PMI or the RI. On the contrary, if the data is not multiplexed with the CQI/PMI or the RI, it may occupy the positions of the CQI/PMI or the RI.

Also, the data occupies the positions of an ACK/NACK regardless of the presence or absence of the ACK/NACK. If the ACK/NACK is used, the data is punctured for the ACK/NACK. The CQI/PMI follows the data by the time-first mapping.

In the absence of the ACK/NACK, the CQI/PMI and the RI are mapped in the manner illustrated in FIG. 25, only without the ACK/NACK. In the absence of the RI, the CQI/PMI and the ACK/NACK are mapped in the manner illustrated in FIG. 25, only without the RI. The CQI/PMI, which may be a concatenation of control information with different characteristics, does not lead to data puncturing. Rather, it is rate-matched with the data. For the ACK/NACK, the data is punctured, and the RI is rate-matched with the data.

Embodiment 5

Figure 26:
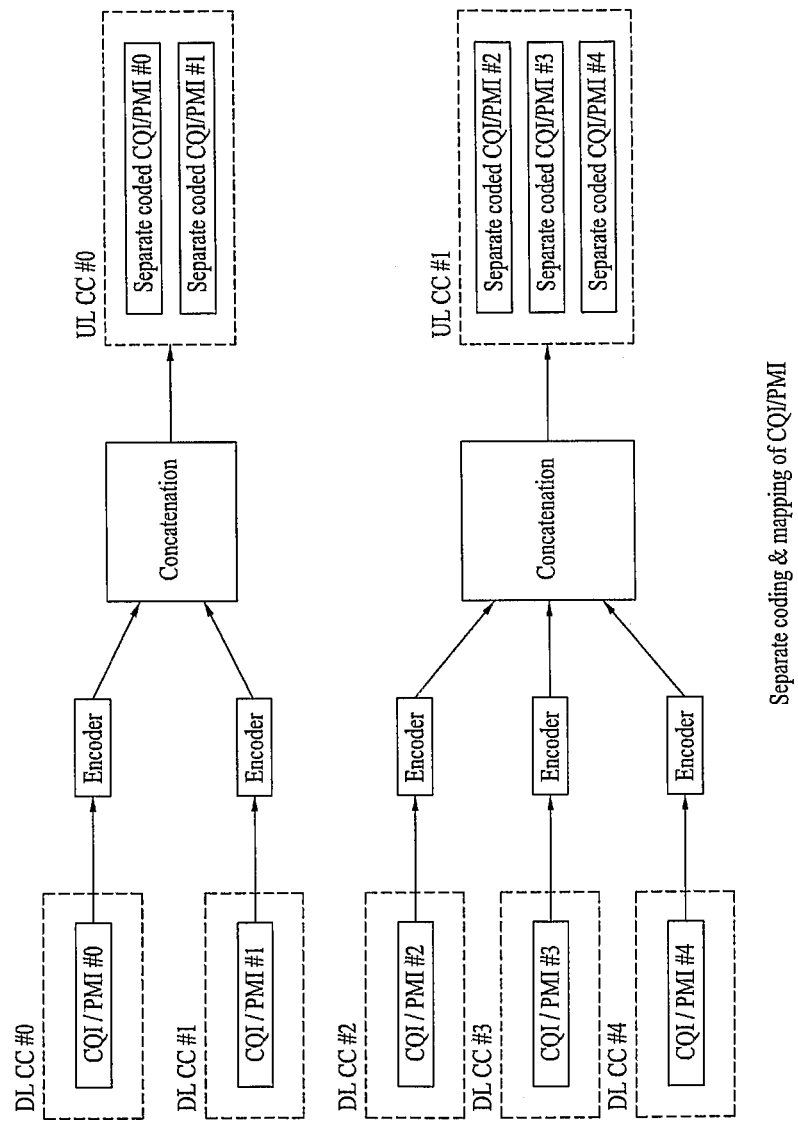
FIGS. 26 and 27 illustrate methods for mapping Channel Quality Information/Precoding Matrix Indexes (CQIs/PMIs) to UL CCs, when a BS requests a mobile terminal to transmit data and the CQIs/PMIs, or the CQIs/PMIs on a Physical Uplink Shared CHannel (PUSCH).

FIG. 26 illustrates a method for mapping CQIs/PMIs to UL CCs by reusing the LTE CQI/PMI coding scheme based on information about the linkage between DL CCs and UL CCs between a BS and a mobile terminal which the BS has allocated to the mobile terminal, when the BS requests the mobile terminal to transmit data and the CQIs/PMIs on a Physical Uplink Shared CHannel (PUSCH).

Referring to FIG. 26, the mobile terminal measures or calculates CQIs/PMIs about the DL CCs allocated from the BS, and separately encodes the CQIs/PMIs. For each of the UL CCs, the coded CQIs/PMIs about DL CCs are sequentially concatenated and transmitted in one or more the UL CC. Specifically, the coded CQIs/PMIs about one or more DL CCs are collected according to BS-preset links between the DL CCs and the UL CCs. In each of the UL CCs, CQIs/PMIs about DL CCs linked to the UL CC are mapped by the conventional LTE PUSCH multiplexing scheme, in a sequential order of the DL CCs, in the reverse order of the sequence of the DL CCs, or in a BS-intended order.

Figure 27:
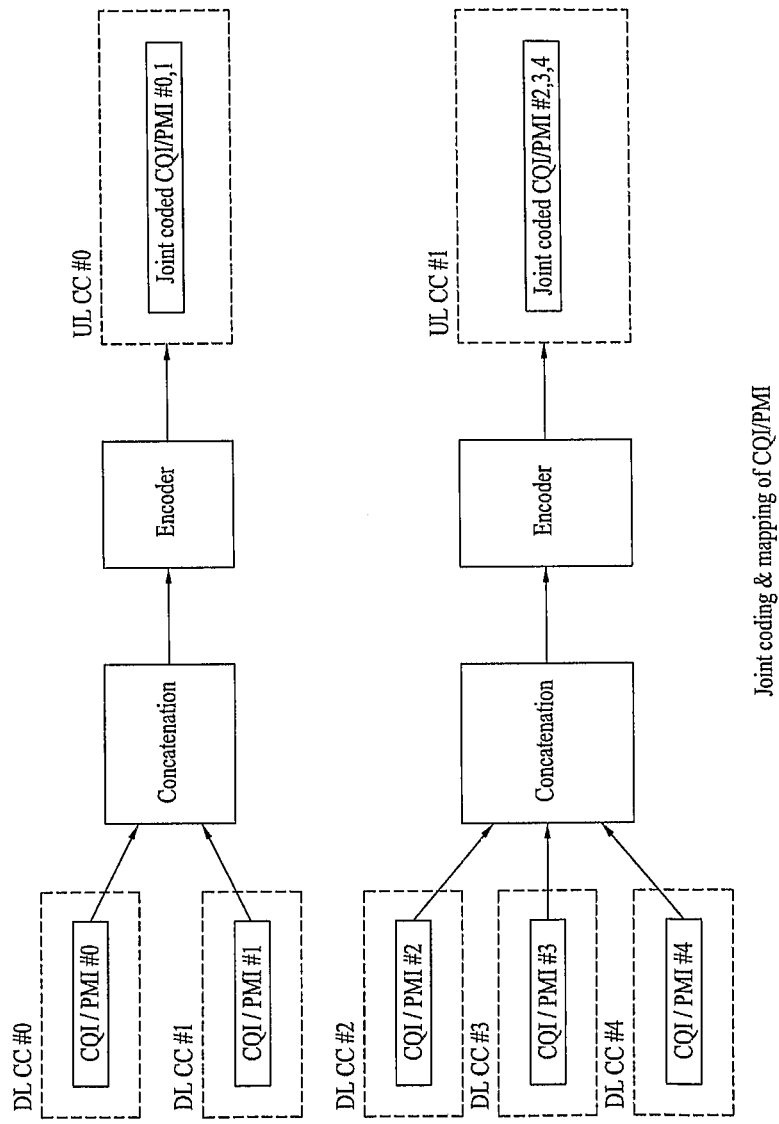

FIG. 27 illustrates a method for measuring or calculating CQIs/PMIs about DL CCs that a BS has allocated to a mobile terminal, sequentially concatenating CQIs/PMIs about DL CCs assigned to the same UL CC, and transmitting the concatenated CQIs/PMIs in the respective UL CCs associated with them. For each of BS-preset links between DL CCs and UL CCs, the concatenated CQIs/PMIs about one or more DL CCs assigned to a UL CC are collected and encoded. Then the coded CQIs/PMIs are sequentially mapped to the UL CC in the conventional LTE PUSCH multiplexing scheme. While five DL CCs and two UL CCs are illustrated in FIGS. 26 and 27, by way of example, the numbers of DL CCs and UL CCs and their linkage may be changed by the BS. If the numbers of DL CC and UL CCs are equal, the CQIs/PMIs about the DL CCs may be transmitted in the UL CCs in a one-to-one correspondence. The reuse of the LTE multiplexing and encoding scheme for CQIs/PMIs makes it possible to map CQIs/PMIs to a PUSCH irrespective of the numbers and linkage of the DL CCs and the UL CCs, in spite of carrier aggregation.

The method illustrated in FIG. 26 may be modified in such a manner that CQIs/PMIs about DL CCs that the BS has allocated to the mobile terminal are measured or calculated on a DL CC basis, are concatenated sequentially, fully joint-encoded, and transmitted in one or more UL CCs, each of the UL CCs carrying as much CQI/PMI information as assigned to it. The coded CQIs/PMIs about the DL CCs are sequentially mapped to the UL CCs assigned to the DL CCs in the LTE PUSCH multiplexing scheme. While five DL CCs and two UL CCs are illustrated in FIGS. 26 and 27, by way of example, the numbers of DL CCs and UL CCs and their linkage may be varied by the BS. If the numbers of DL CCs and UL CCs are equal, the CQIs/PMIs about the DL CCs may be transmitted in the UL CCs in a one-to-one correspondence.

Hereinbelow, from the perspective of an RI, a description will be made of a method for mapping RIs to UL CCs by reusing an LTE RI coding scheme based on information about the linkage between DL CCs and UL CCs between a BS and a mobile terminal and the number of required RIs per TTI, when the BS requests the mobile terminal to transmit data and RIs, or RIs on a PUSCH.

Figure 28:
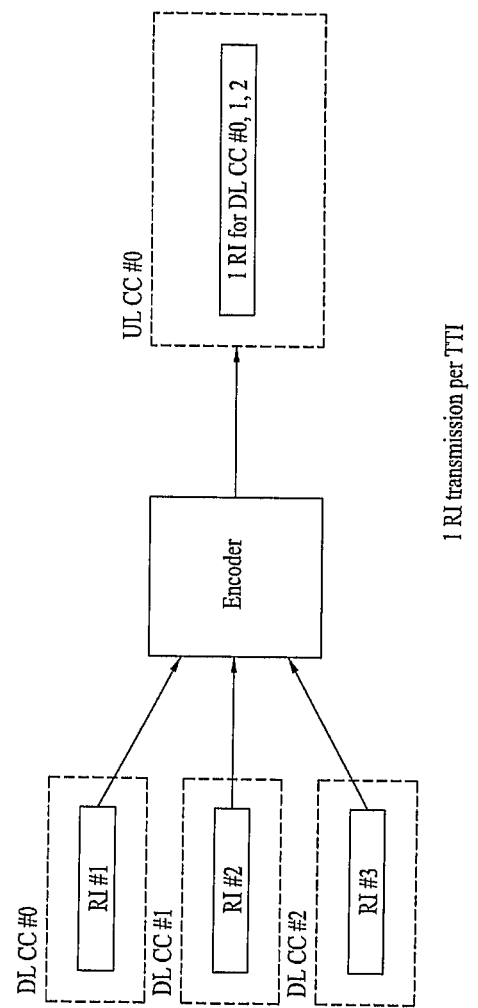
FIG. 28 illustrates a method for transmitting an RI in a UL CC when the BS requests one RI for specific DL CCs.

FIG. 28 illustrates a method for transmitting an RI in a UL CC, when a BS requests one RI for predetermined DL CCs.

Referring to FIG. 28, mobile terminal-desired RIs for one or more DL CCs are encoded and mapped to a BS-preset UL CC by the conventional LTE PUSCH multiplexing scheme. If the number of BS-intended RIs exceeds that of UL CCs available for transmission, for example, if the BS wants two RIs and only one UL CC is available for RI transmission, the mobile terminal may transmit one RI in the UL CC during a first TTI and the other RI in the UL CC during a second TTI with a TTI offset in a BS-desired order. While three DL CCs and one UL CC are illustrated in FIG. 28, by way of example, the numbers of DL CCs and UL CCs and the linkage between the DL CCs and the UL CCs may be changed by the BS. If as many UL CCs as DL CCs exist, RIs for the DL CCs may be transmitted in the UL CCs, in a one-to-one correspondence.

Figure 29:
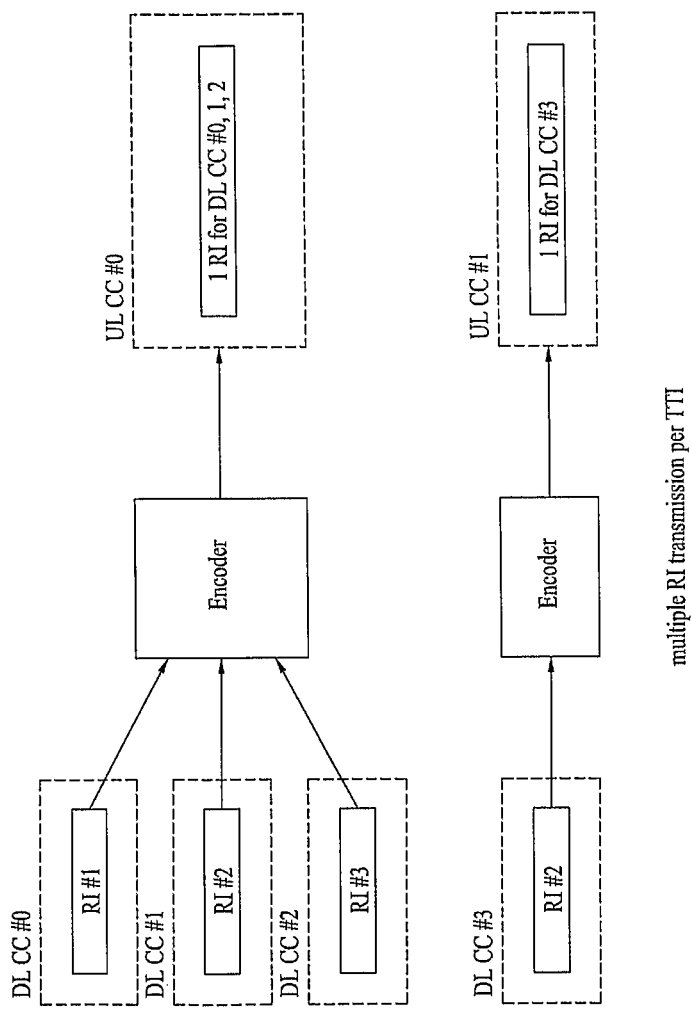
FIG. 29 illustrates a method for transmitting an RI in UL CCs when the BS requests two or more RIs for specific DL CCs.

FIG. 29 illustrates a method for transmitting RIs in UL CCs when a BS requests two or more RIs for predetermined DL CCs.

Referring to FIG. 29, mobile terminal-desired RIs for one or more DL CC groups are encoded and mapped to BS-preset UL CCs by the conventional LTE PUSCH multiplexing scheme. If the number of BS-intended RIs exceeds that of UL CCs available for transmission, the mobile terminal may transmit one RI in each of the UL CCs during a TTI and the other RIs in the UL CCs during another TTI with a TTI offset in a BS-desired order.

While four DL CCs and two UL CCs are illustrated in FIG. 29, by way of example, the numbers of DL CCs and UL CCs and the linkage between the DL CCs and the UL CCs may be changed by the BS. If as many UL CCs as DL CCs exist, RIs for the DL CCs may be transmitted in the UL CCs, in a one-to-one correspondence.

The methods illustrated in FIGS. 28 and 29 reuse an LTE RI multiplexing method, reuse a 1- or 2-bit coding scheme, and simply extend a 3-bit coding scheme. Thus, RIs can be mapped to a PUSCH irrespective of the numbers and linkage of DL CCs and UL CCs, even under the situation of carrier aggregation. Also, since the number of RIs that can be transmitted per UL CC at one time is limited, the problem that the BS continuously makes a wrong decision as to the start of data due to RI miss-detection may be averted.

Now, from the perspective of an ACK/NACK, a description will be made of a method for mapping ACKs/NACKs to UL CCs by reusing an LTE ACK/NACK coding scheme based on information about the linkage between DL CCs and UL CCs between a BS and a mobile terminal which the BS has allocated to the mobile terminal, when the BS requests the mobile terminal to transmit data and ACKs/NACKs, or ACKs/NACKs on a PUSCH.

Figure 30:
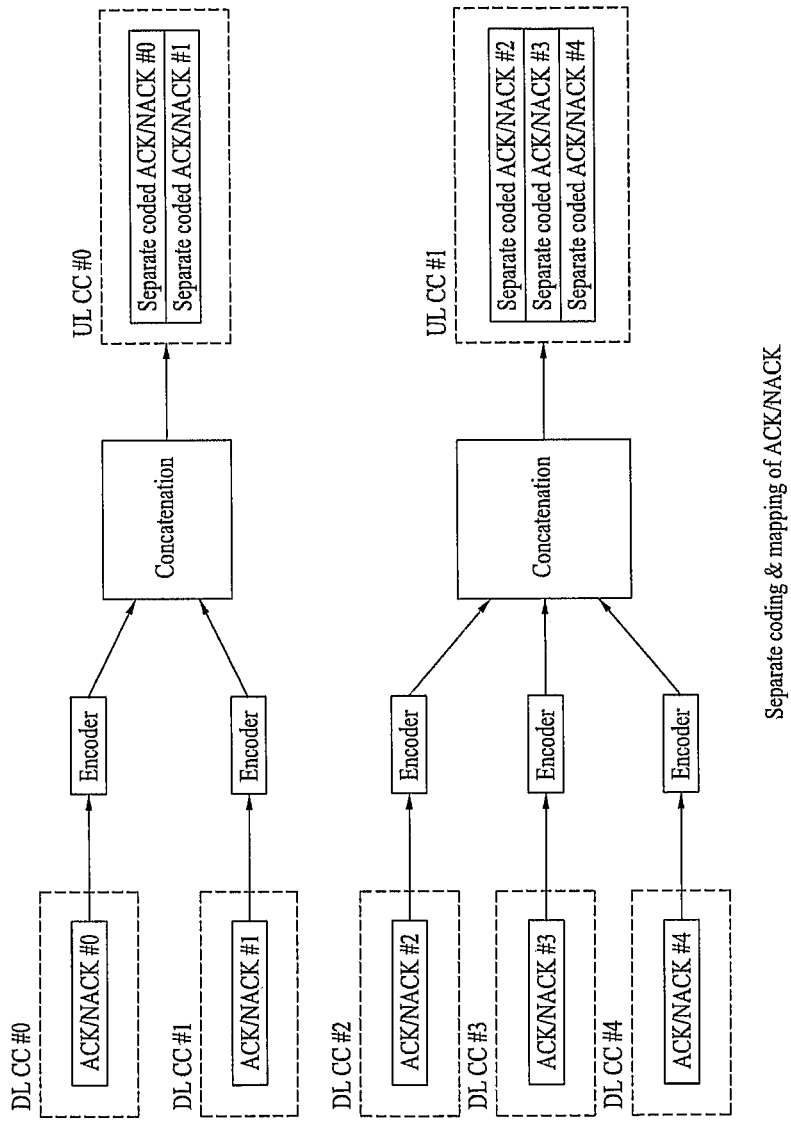
FIGS. 30, 31 and 32 illustrate methods for transmitting Acknowledgments/Negative Acknowledgments (ACKs/NACKs) for DL CCs allocated to a mobile terminal by a BS in one or more UL CCs by the mobile terminal.

FIG. 30 illustrates a method for separately encoding ACKs/NACKs for DL CCs allocated to a mobile terminal by a BS on a DL CC basis, sequentially concatenating coded ACKs/NACKs for DL CCs assigned to the same UL CC, and transmitting the concatenated ACKs/NACKs in one or more UL CCs.

Referring to FIG. 30, coded ACKs/NACKs for one or more DL CCs are collected according to BS-preset links between the DL CCs and the UL CCs. In each of the UL CCs, ACKs/NACKs for DL CCs linked to the UL CC are mapped by the conventional LTE PUSCH multiplexing scheme, in a sequential order of the DL CCs, in the reverse order of the sequence of the DL CCs, or in a BS-intended order.

Figure 31:
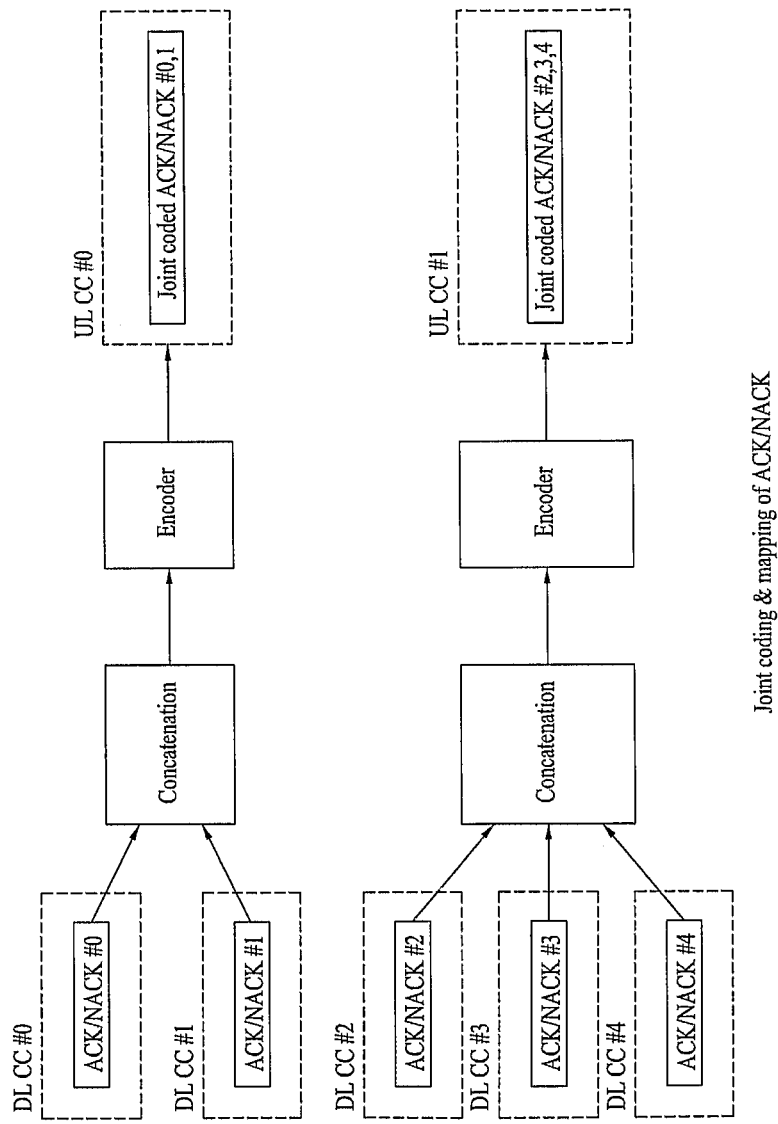

FIG. 31 illustrates a method for sequentially concatenating ACKs/NACKs for DL CCs allocated to a mobile terminal by a BS according to UL CCs linked to the DL CCs, encoding the concatenated ACKs/NACKs, and transmitting the coded ACKs/NACKs in one or more UL CCs.

Referring to FIG. 31, for respective BS-preset links between DL CCs and UL CCs, concatenated ACKs/NACKs for one or more DL CCs assigned to UL CCs are collected, encoded, and then mapped by the conventional LTE PUSCH multiplexing scheme. If concatenated ACKs/NACKs prior to the encoding exceed three bits, the LTE system may use a CQI/PMI encoder, a modified RM encoder, or a TBCC for the ACK/NACK coding, instead of a simplex encoder.

Figure 32:
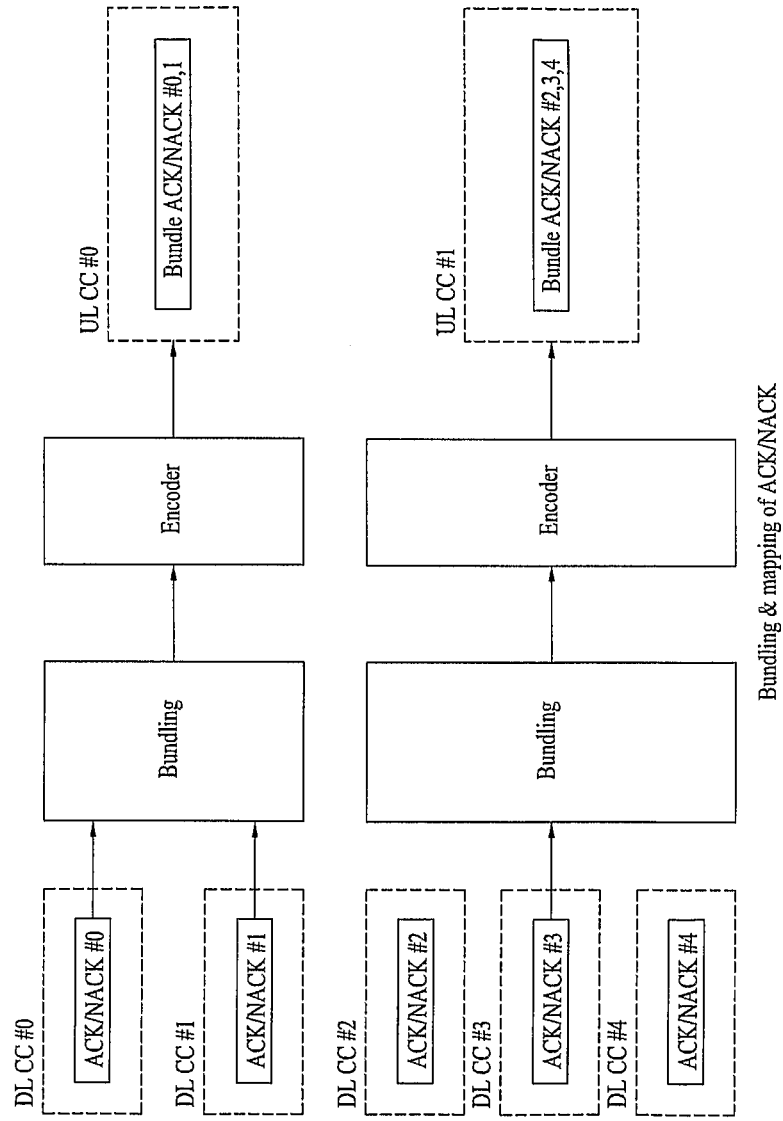

FIG. 32 illustrates a method for, when the number of ACKs/NACKs for DL CCs allocated to a mobile terminal for each UL CC by a BS is equal to or larger than a predetermined number N, bundling the ACKs/NACKs for each UL CC, encoding the bundled ACKs/NACKs for the UL CC, concatenating the coded ACKs/NACKs for the UL CC, and transmitting the concatenated ACKs/NACKs in the UL CC, rather than transmitting the ACKs/NACKs on a DL CC basis.

In case of two or more UL CCs, the number of ACKs/NACKs for DL CCs assigned to a UL CC may or may not exceed the predetermined number N. For a UL CC with ACKs/NACKs more than N, the ACKs/NACKs are bundled, whereas for a UL CC with ACKs/NACKs fewer than N, the separate encoding illustrated in FIG. 30 or the joint encoding illustrated in FIG. 31 may apply. Then, mapping is performed by the conventional LTE PUSCH multiplexing scheme. Thus, a receiver may make the same decision of the ACKs/NACKs of bundled DL CCs.

While five DL CCs and two UL CCs are illustrated in FIGS. 30, 31 and 32, by way of example, the numbers of DL CCs and UL CCs and the linkage between the DL CCs and the UL CCs may be changed by the BS. In the case where the DL CCs and the UL CCs are equal in number, ACKs/NACKs for the DL CCs may be transmitted in the UL CCs in a one-to-one correspondence. The methods illustrated in FIGS. 30, 31 and 32 advantageously map ACKs/NACKs to a PUSCH irrespective of the numbers of DL CCs and UL CCs and the linkage between the DL CCs and the UL CCs by reusing the LTE PUSCH multiplexing and coding scheme for ACKs/NACKs, even when carrier aggregation is performed. One or more CCs used for transmission may have successive or non-successive subcarriers.

In subframe structures according to exemplary embodiments of the present invention, a transmission band may be divided into one or more carrier groups or aggregate carriers, and subcarriers or RBs for use in transmission RBs may be from the same carrier group or from different carrier groups. Also, the subcarriers or RBs are successive or non-successive. This means that when transmitting data, the mobile terminal may use a set of subcarriers or RBs which are parts of the subcarriers or RBs of the same carrier group or different carrier groups.

Therefore, the following description is made with the appreciation that subcarriers or RBs may be successive or non-successive subcarriers or RBs within the same carrier group or a set of successive or non-successive subcarriers or RBs from different carrier groups.

The forgoing subframe structures are applicable to subframes with extended CPs. Also, an SC-FDMA symbol may be an OFDMA symbol, a DFTS-OFDM symbol, a clustered DFTS OFDM symbol, or a pure SC-FDMA symbol according to a transmission scheme.

In a description of the following drawings, F0, F1 and F2 denote DL carrier groups and DL subcarriers are part of the subcarriers of the same carrier group or a set of subcarriers or RBs from different carrier groups. The subcarriers or RBs are consecutive or non-consecutive.

F3 and F4 denote UL carrier groups. UL subcarriers are part of the subcarriers of the same carrier group or a set of subcarriers or RBs from different carrier groups. The subcarriers or RBs are consecutive or non-consecutive. Hereinbelow, CA #0 and CA #1 represent two UL carrier groups.

While the following description is made in the context of three DL carrier groups and two UL carrier groups, the numbers of DL carrier groups and UL carrier groups may vary. Reference character ENC denotes an encoder.

Figure 33:
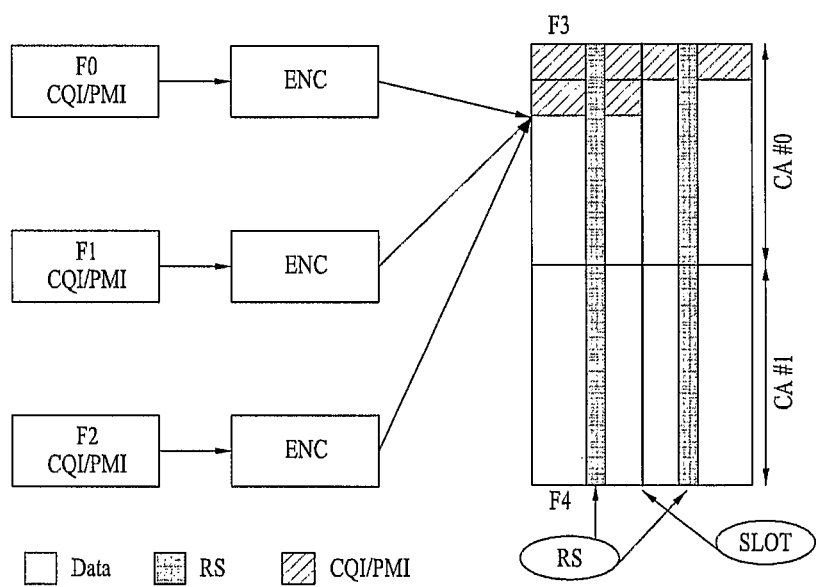
FIGS. 33 to 40 illustrate methods for transmitting CQIs/PMIs about three DL carrier groups according to exemplary embodiments of the present invention.

FIG. 33 illustrates a method for transmitting CQIs/PMIs about three DL carrier groups in a predetermined UL carrier group according to an exemplary embodiment of the present invention.

Referring to FIG. 33, CQIs/PMIs are measured or calculated on a DL carrier group basis. The CQIs/PMIs about the DL carrier groups are encoded separately in ENCs and transmitted in the predetermined UL carrier group (e.g., CA #0). The coded CQIs/PMIs are mapped in the time-first manner, starting from a first SC-FDMA symbol of a first subcarrier available for transmission in the UL carrier group, such that they are arranged in a predetermined order of the DL carrier groups or they are interlaced with one another on a symbol basis.

Figure 34:
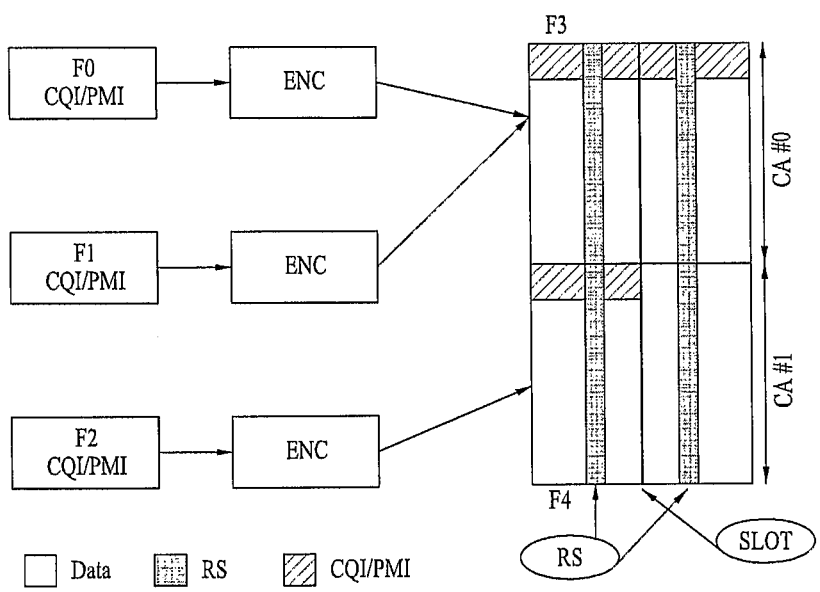

FIG. 34 illustrates a method for transmitting CQIs/PMIs about three DL carrier groups in two UL carrier groups according to an exemplary embodiment of the present invention.

Referring to FIG. 34, CQIs/PMIs are measured or calculated on a DL carrier group basis. The CQIs/PMIs about the DL carrier groups are encoded separately in ENCs and distributed to the UL carrier groups. The coded CQIs/PMIs are mapped in the time-first manner, starting from a first SC-FDMA symbol of a first subcarrier available for transmission in each of the UL carrier groups, such that they are arranged in a predetermined order of the DL carrier groups or they are interlaced with one another on a symbol basis.

Figure 35:
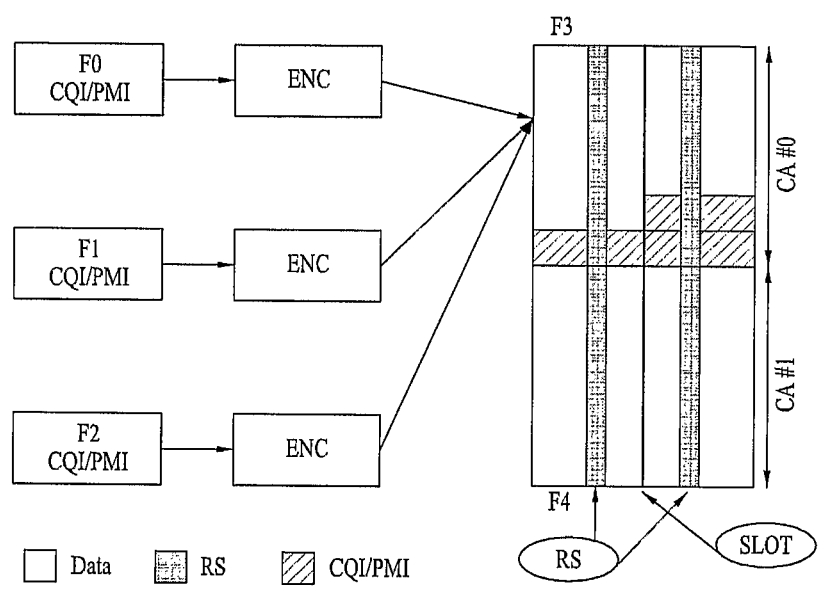

FIG. 35 illustrates a method for transmitting CQIs/PMIs about three DL carrier groups in a predetermined UL carrier group according to an exemplary embodiment of the present invention.

Referring to FIG. 35, CQIs/PMIs are measured or calculated on a DL carrier group basis. The CQIs/PMIs about the DL carrier groups are encoded separately in ENCs and transmitted in the predetermined UL carrier group (e.g., CA #0). The coded CQIs/PMIs are mapped in the time-first manner, following data in the UL carrier group, such that they are arranged in a predetermined order of the DL carrier groups or they are interlaced with one another on a symbol basis. If an RI is transmitted together, the data, the RI, and the CQIs/PMIs in this order are sequentially mapped in the time-first manner.

Figure 36:
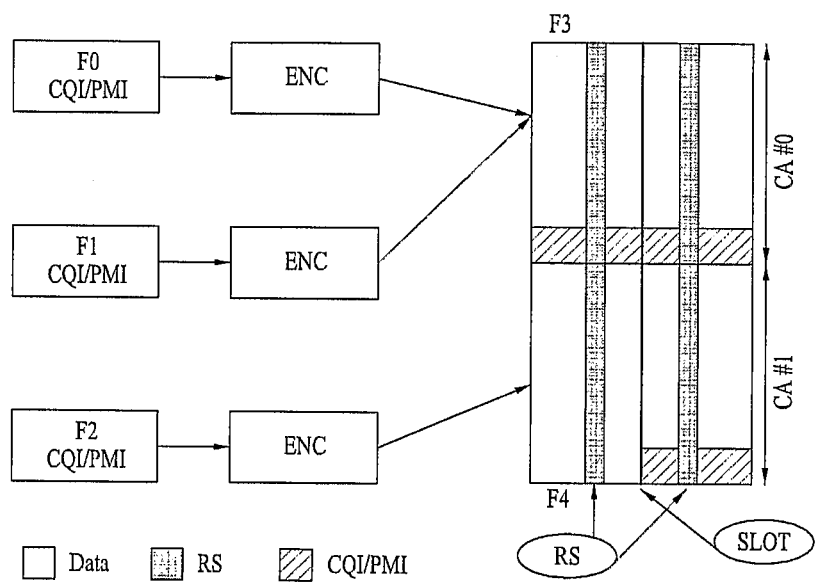

FIG. 36 illustrates a method for transmitting CQIs/PMIs about three DL carrier groups in two UL carrier groups according to an exemplary embodiment of the present invention.

Referring to FIG. 36, a CQI/PMI is measured or calculated for each DL carrier group. The CQIs/PMIs about the DL carrier groups are encoded separately in ENCs and distributed to the UL carrier groups, for transmission. The coded CQIs/PMIs are mapped in the time-first manner, following data in the UL carrier groups, such that they are arranged in a predetermined order of the DL carrier groups or they are interlaced with one another on a symbol basis. If an RI is transmitted together, the data, the RI, and the CQIs/PMIs in this order are sequentially mapped in the time-first manner.

On the premise that UL carrier groups to be used are preliminarily agreed between the BS and the mobile terminal, the BS should notify the mobile terminal of DL carrier groups to be used or/and the priority levels or numbers of the DL carrier groups, for implementation of the CQI/PMI transmission methods illustrated in FIGS. 33 to 36.

Figure 37:
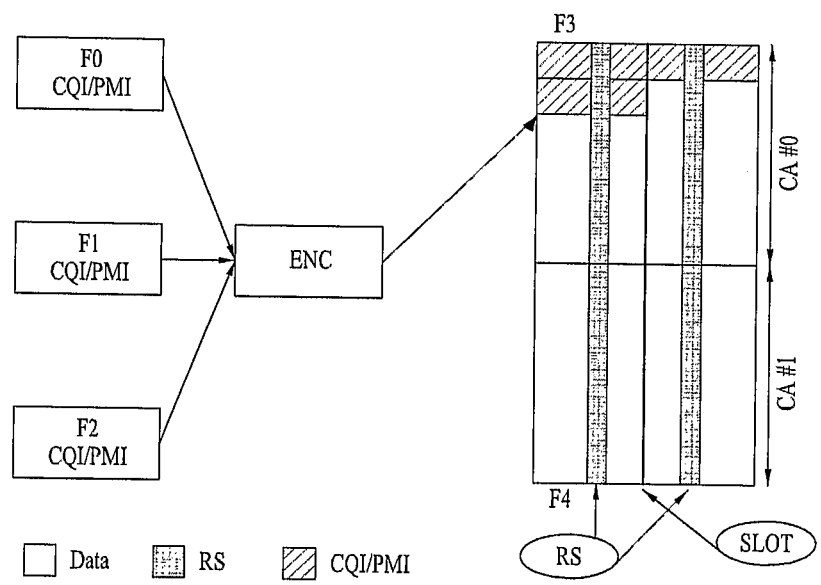

FIG. 37 illustrates a method for transmitting CQIs/PMIs about three DL carrier groups in a predetermined UL carrier group according to an exemplary embodiment of the present invention.

Referring to FIG. 37, a CQI/PMI is measured or calculated for each DL carrier group. The CQIs/PMIs about the DL carrier groups are jointly encoded in a single ENC and transmitted in the predetermined UL carrier group (e.g., CA #0). The coded CQIs/PMIs are mapped in the time-first manner, starting from a first SC-FDMA symbol of a first subcarrier available for transmission in the UL carrier group, such that they are arranged in a predetermined order of the DL carrier groups or they are interlaced with one another on a symbol basis.

Figure 38:
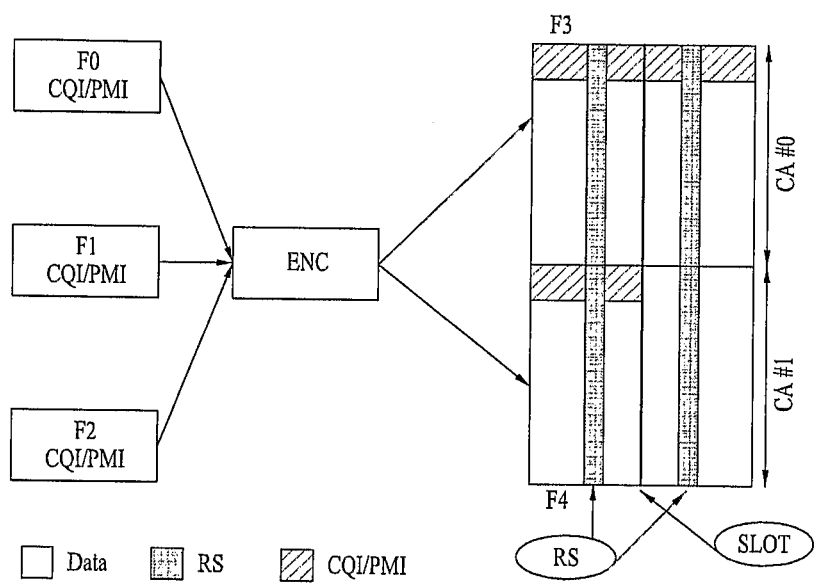

FIG. 38 illustrates a method for transmitting CQIs/PMIs about three DL carrier groups in two UL carrier groups according to an exemplary embodiment of the present invention.

Referring to FIG. 38, a CQI/PMI is measured or calculated for each DL carrier group. The CQIs/PMIs about the DL carrier groups are jointly encoded in a single ENC and distributed to the UL carrier groups. The coded CQIs/PMIs are mapped in the time-first manner, starting from a first SC-FDMA symbol of a first subcarrier available for transmission in each of the UL carrier groups, such that they are arranged in a predetermined order of the DL carrier groups or they are interlaced with one another on a symbol basis.

Figure 39:
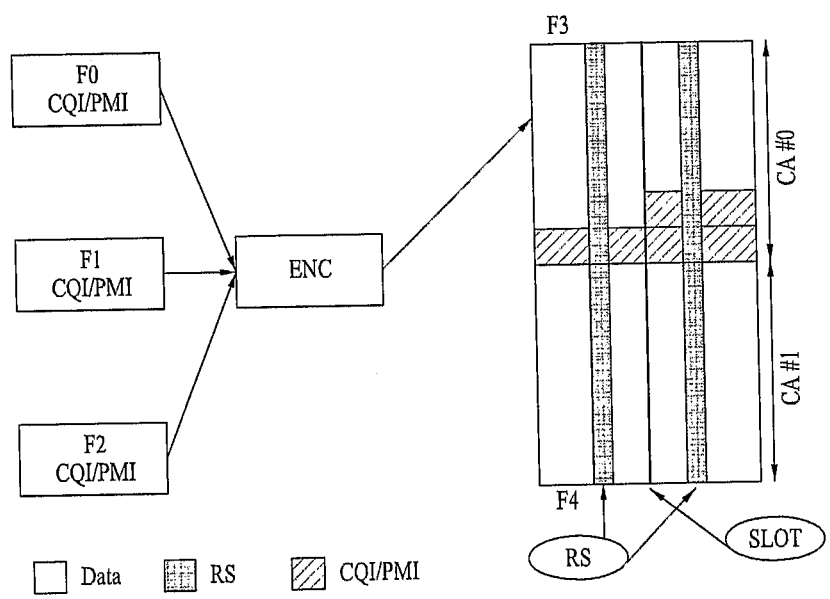

FIG. 39 illustrates a method for transmitting CQIs/PMIs about three DL carrier groups in a predetermined UL carrier group according to an exemplary embodiment of the present invention.

Referring to FIG. 39, a CQI/PMI is measured or calculated for each DL carrier group. The CQIs/PMIs about the DL carrier groups are jointly encoded in a single ENC and transmitted in the predetermined UL carrier group (e.g., CA #0). The coded CQIs/PMIs are mapped in the time-first manner, following data in the UL carrier group, such that they are arranged in a predetermined order of the DL carrier groups or they alternate symbol by symbol. If an RI is transmitted along, the data, the RI, and the CQIs/PMIs in this order are sequentially mapped in the time-first manner.

Figure 40:
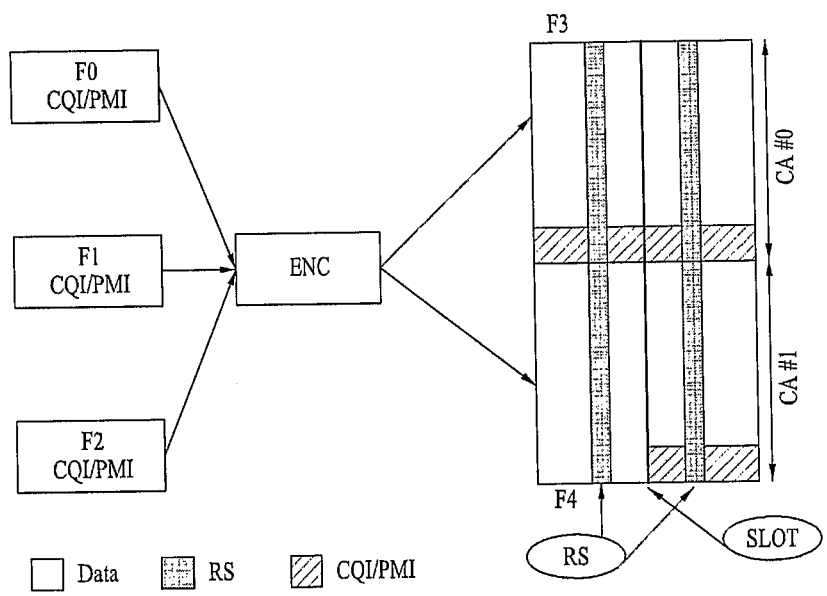

FIG. 40 illustrates a method for transmitting CQIs/PMIs about three DL carrier groups in two UL carrier groups according to an exemplary embodiment of the present invention.

Referring to FIG. 40, a CQI/PMI is measured or calculated for each DL carrier group. The CQIs/PMIs about the DL carrier groups are jointly encoded in a single ENC and distributed to the UL carrier groups. The coded CQIs/PMIs are mapped in the time-first manner, following data in each of the UL carrier groups, such that they are arranged in a predetermined order of the DL carrier groups or they are interlaced with one another on a symbol basis. If an RI is transmitted together, the data, the RI, and the CQIs/PMIs in this order are sequentially mapped in the time-first manner.

On the premise that UL carrier groups to be used are preliminarily agreed between the BS and the mobile terminal, the BS should notify the mobile terminal of DL carrier groups to be used and/or the priority levels or numbers of the DL carrier groups, for implementation of the CQI/PMI transmission methods illustrated in FIGS. 37 to 40.

Figure 41:
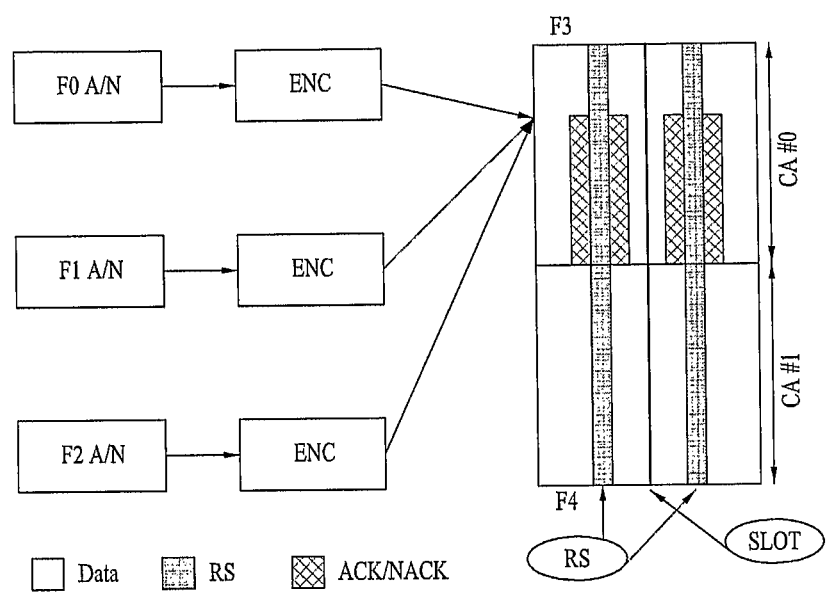
FIGS. 41 to 49 illustrate methods for transmitting ACKs/NACKs for three DL carrier groups in UL carrier groups according to exemplary embodiments of the present invention.

FIG. 41 illustrates a method for transmitting ACKs/NACKs for three DL carrier groups in a predetermined UL carrier group according to an exemplary embodiment of the present invention.

Referring to FIG. 41, HARQ responses, i.e. ACKs/NACKs for the respective DL carrier groups are encoded separately in ENCs and transmitted in the predetermined UL carrier group (e.g., CA #0). The coded ACKs/NACKs are mapped to REs corresponding to symbols adjacent to RSs, starting from a last subcarrier toward a first subcarrier available for transmission in the UL carrier group, in such a manner that the coded ACKs/NACKs are arranged in a predetermined order of the DL carrier groups or are interlaced with one another on a symbol basis.

Figure 42:
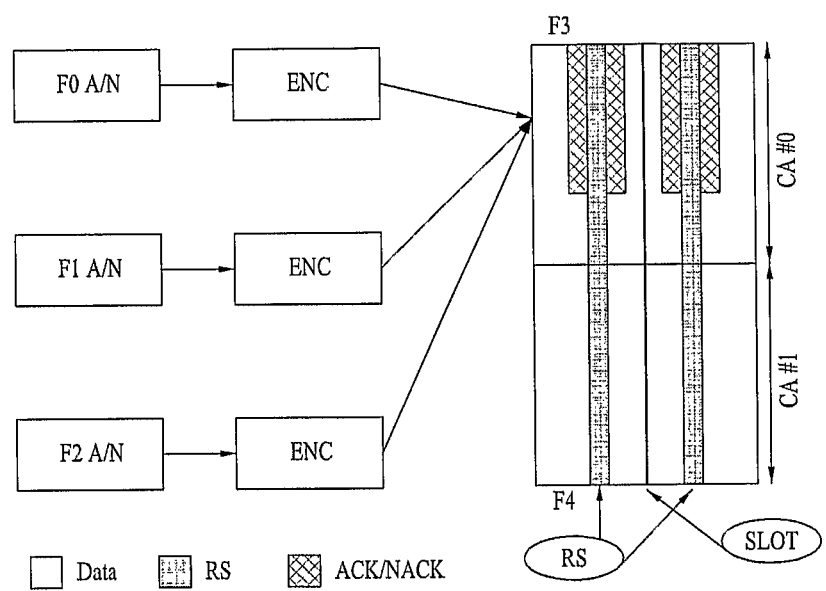

FIG. 42 illustrates a method for transmitting ACKs/NACKs for three DL carrier groups in a predetermined UL carrier group according to an exemplary embodiment of the present invention.

Referring to FIG. 42, HARQ responses, i.e. ACKs/NACKs for the respective DL carrier groups are encoded separately in ENCs and transmitted in the predetermined UL carrier group. The coded ACKs/NACKs are mapped to REs corresponding to symbols adjacent to RSs, starting from a first subcarrier toward a last subcarrier available for transmission in the UL carrier group, in such a manner that the coded ACKs/NACKs are arranged in a predetermined order of the DL carrier groups or are interlaced with one another on a symbol basis.

Figure 43:
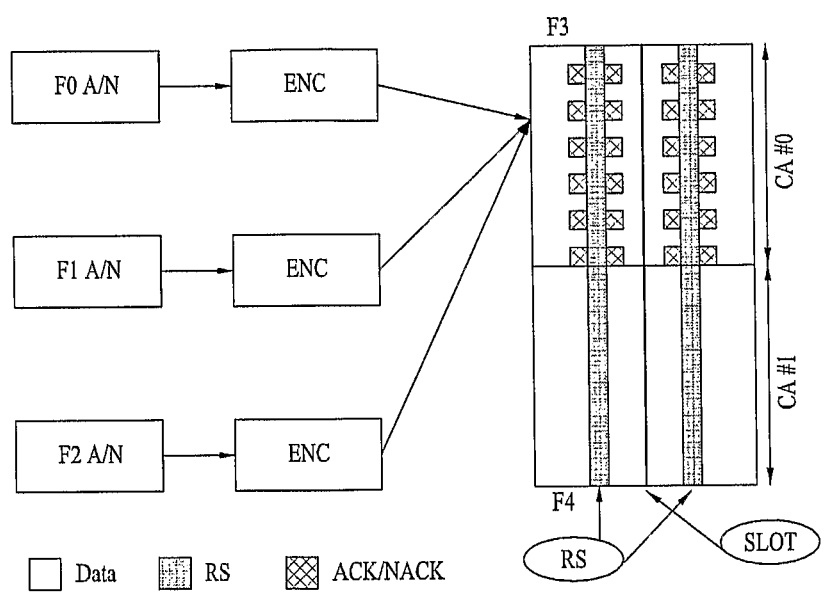

FIG. 43 illustrates a method for transmitting ACKs/NACKs for three DL carrier groups in a predetermined UL carrier group according to an exemplary embodiment of the present invention.

Referring to FIG. 43, HARQ responses, i.e. ACKs/NACKs about the respective DL carrier groups are encoded separately in ENCs and transmitted in the predetermined UL carrier group. The number of subcarriers available for transmission in the UL carrier group is added to the number of the coded ACK/NACK symbols and the sum is divided by the maximum number of ACK/NACK symbols that can be mapped per subcarrier (4 in the exemplary embodiment of the present invention) and rounded up. The coded ACKs/NACKs are distributed to the available subcarriers using the rounded-up value, at a maximum of four REs per subcarrier in such a manner that they are arranged in a predetermined order of the DL carrier groups or are interlaced with one another on a symbol basis.

Figure 44:
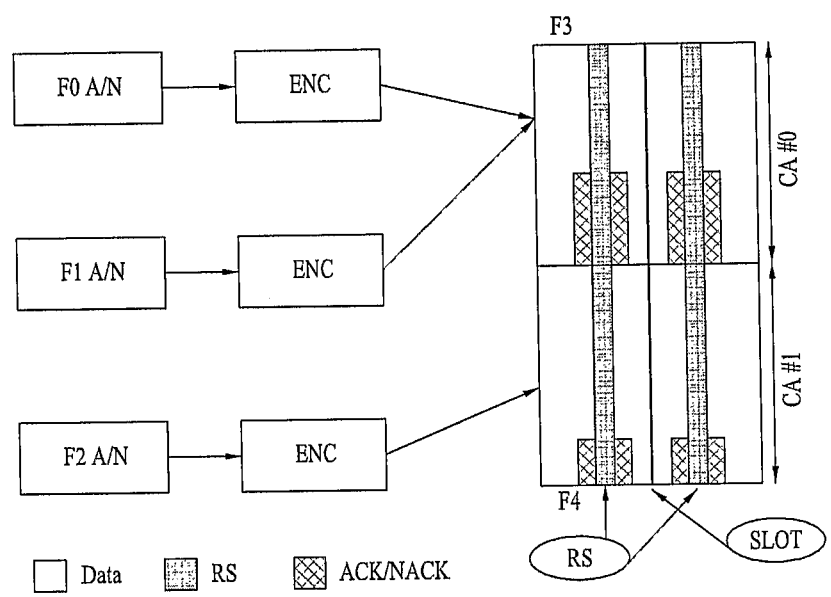

FIG. 44 illustrates a method for transmitting ACKs/NACKs for three DL carrier groups in two UL carrier groups according to an exemplary embodiment of the present invention.

Referring to FIG. 44, HARQ responses, i.e. ACKs/NACKs about the respective DL carrier groups are encoded separately in ENCs and distributed to the two UL carrier groups. The coded ACKs/NACKs are mapped to REs corresponding to symbols adjacent to RSs, starting from a last subcarrier toward a first subcarrier available for transmission in each of the UL carrier groups, in such a manner that the coded ACKs/NACKs are arranged in a predetermined order of the DL carrier groups or are interlaced with one another on a symbol basis.

Figure 45:
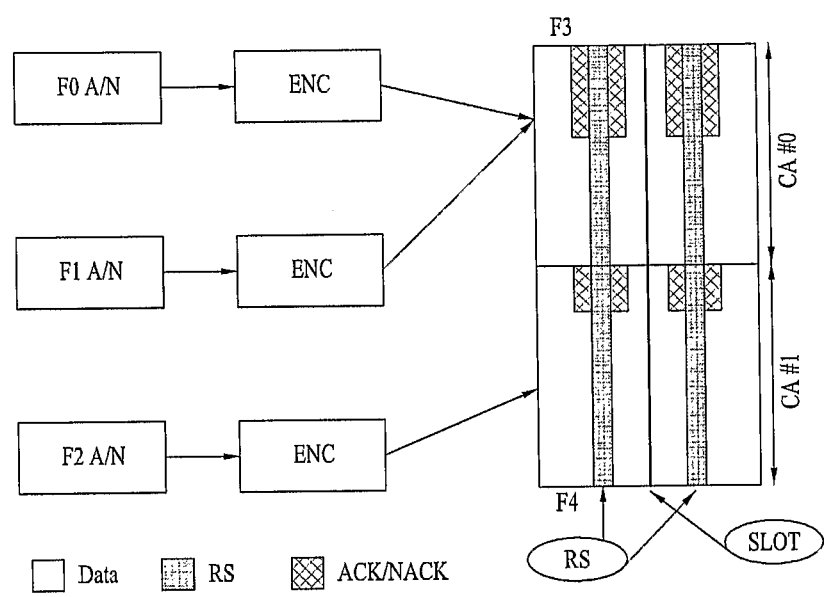

FIG. 45 illustrates a method for transmitting ACKs/NACKs for three DL carrier groups in two UL carrier groups according to an exemplary embodiment of the present invention.

Referring to FIG. 45, HARQ responses, i.e. ACKs/NACKs for the respective DL carrier groups are encoded separately in ENCs and distributed to the UL carrier groups, for transmission. The coded ACKs/NACKs are mapped to REs corresponding to symbols adjacent to RSs, starting from a first subcarrier toward a last subcarrier available for transmission in each of the UL carrier groups, in such a manner that the coded ACKs/NACKs are arranged in a predetermined order of the DL carrier groups or are interlaced with one another on a symbol basis.

Figure 46:
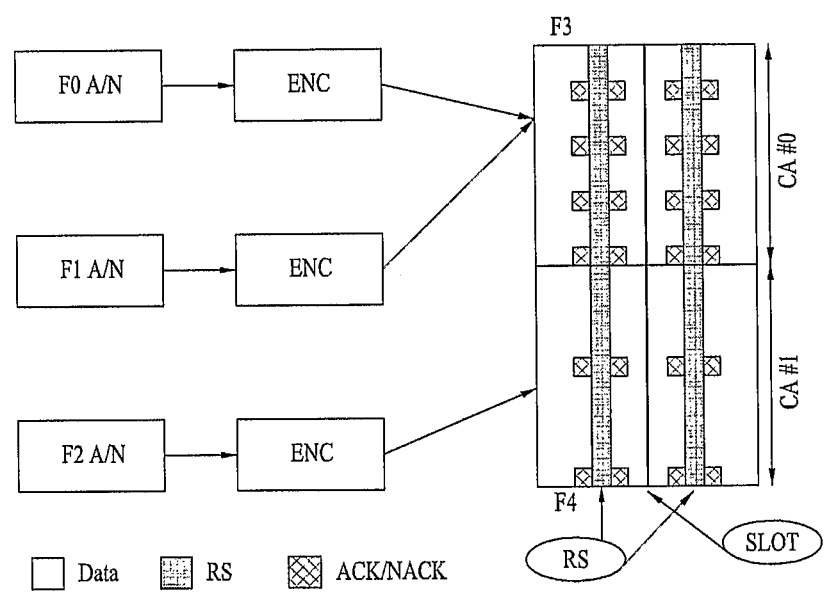

FIG. 46 illustrates a method for transmitting ACKs/NACKs for three DL carrier groups in two UL carrier groups according to an exemplary embodiment of the present invention.

Referring to FIG. 46, HARQ responses, i.e. ACKs/NACKs about the respective DL carrier groups are encoded separately in ENCs and distributed to the UL carrier groups, for transmission. The number of subcarriers available for transmission in the UL carrier group is added to the number of the coded ACK/NACK symbols and the sum is divided by the maximum number of ACK/NACK symbols that can be mapped per subcarrier (4 in the exemplary embodiment of the present invention) and rounded up. The coded ACKs/NACKs are distributed to the available subcarriers using the rounded-up value, at a maximum of four REs per subcarrier in such a manner that they are arranged in a predetermined order of the DL carrier groups or are interlaced with one another on a symbol basis.

On the premise that UL carrier groups to be used are preliminarily agreed between the BS and the mobile terminal, the BS should notify the mobile terminal of DL carrier groups to be used and/or the priority levels or numbers of the DL carrier groups, for implementation of the ACK/NACK transmission methods illustrated in FIGS. 41 to 46. Also, the coded ACKs/NACKs are basically positioned in a maximum of four REs adjacent to RSs per subcarrier by puncturing data mapped to the REs.

Figure 47:
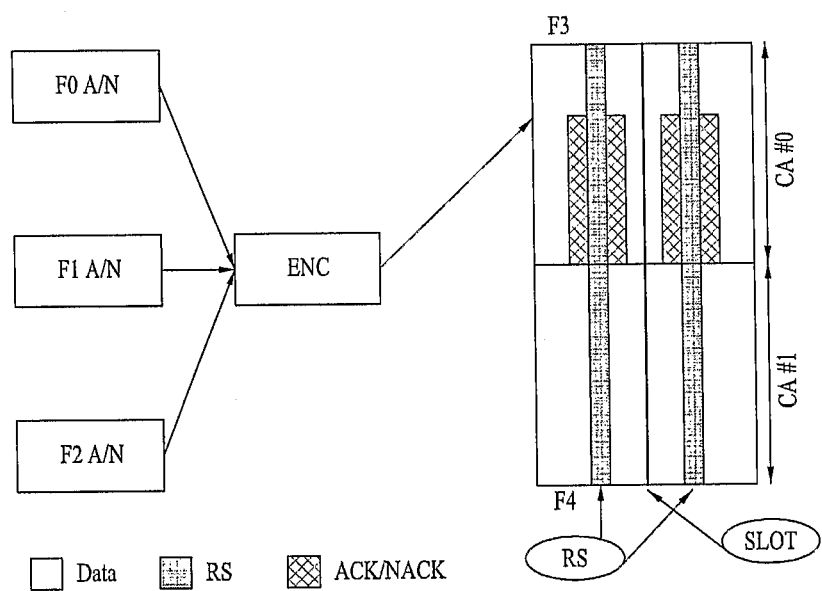
Figure 48:
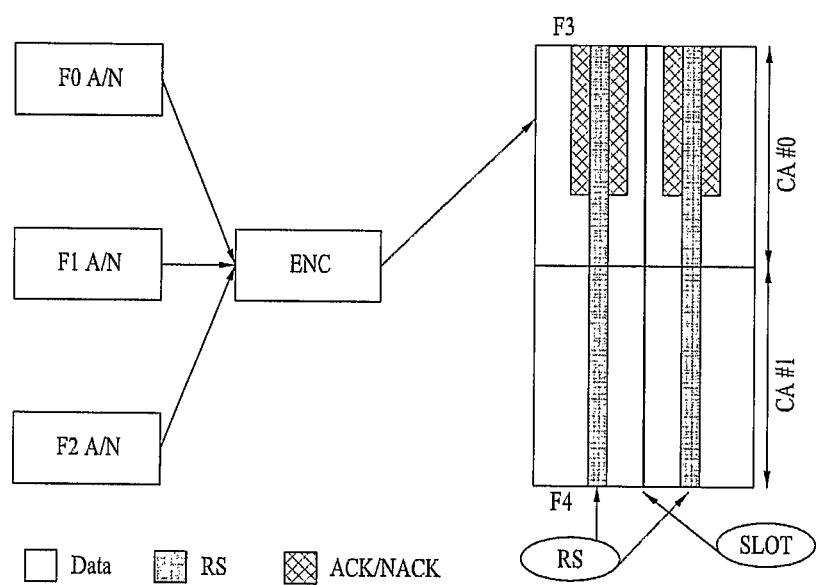
Figure 49:
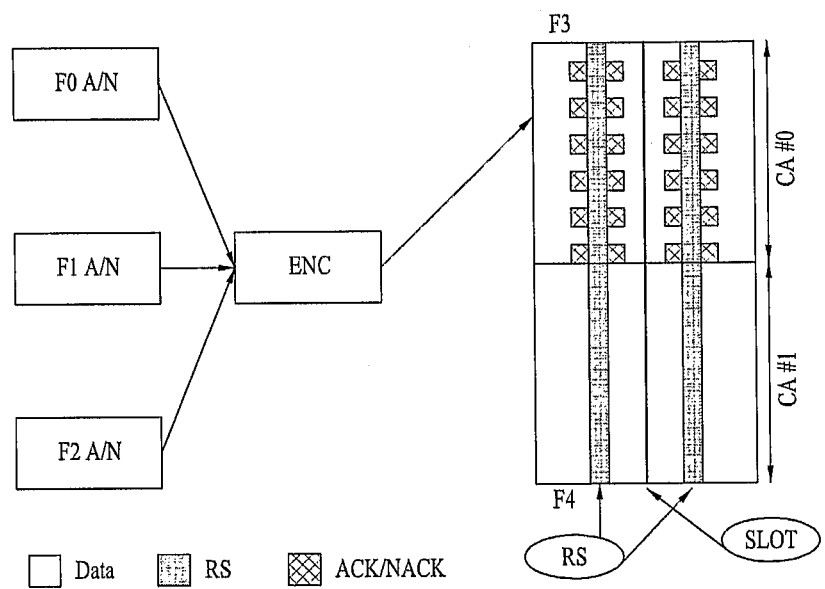
Figure 50:
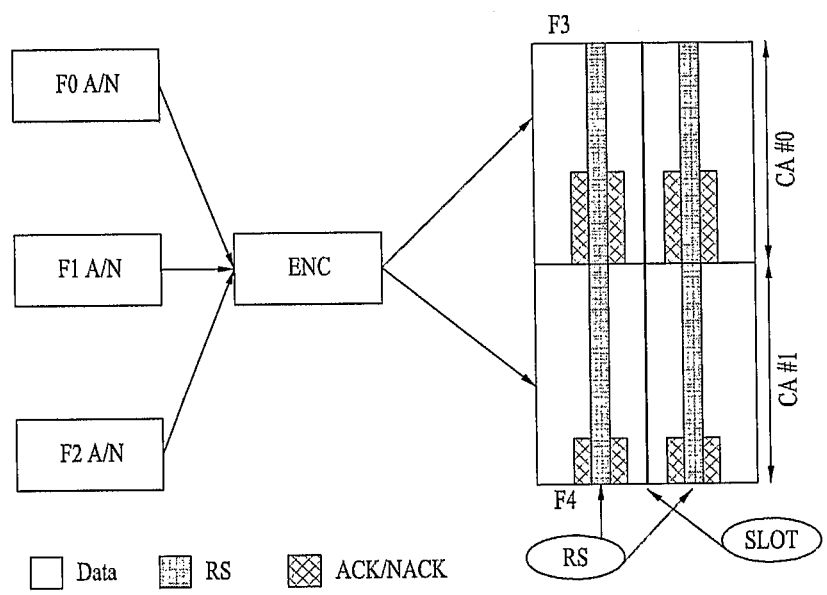
FIGS. 50 to 53 illustrate methods for transmitting ACKs/NACKs for three DL carrier groups in two UL carrier groups according to exemplary embodiments of the present invention.
Figure 51:
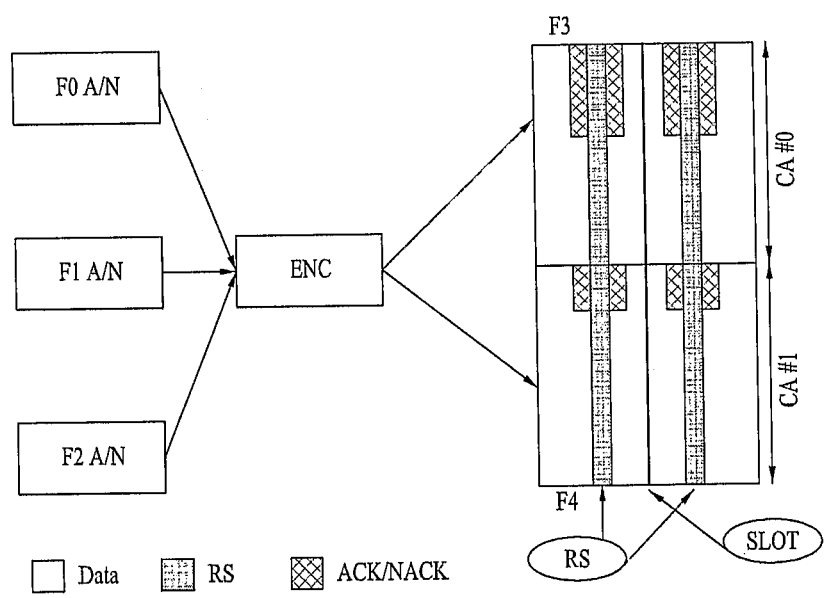
Figure 52:
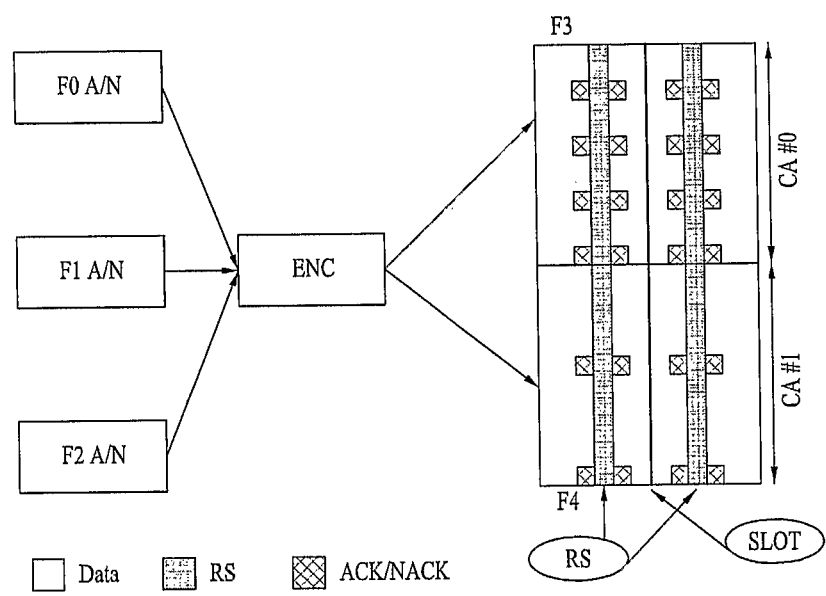

FIGS. 47, 48 and 49 illustrate methods for transmitting ACKs/NACKs for three DL carrier groups in a predetermined UL carrier group according to exemplary embodiments of the present invention. FIGS. 50, 51 and 52 illustrate methods for transmitting ACKs/NACKs for three DL carrier groups in two UL carrier groups according to exemplary embodiments of the present invention. The methods illustrated in FIGS. 47 to 52 are identical to those illustrated in FIGS. 41 to 46 except that the ACKs/NACKs for the three DL carrier groups are all jointly encoded in a single ENC.

Figure 53:
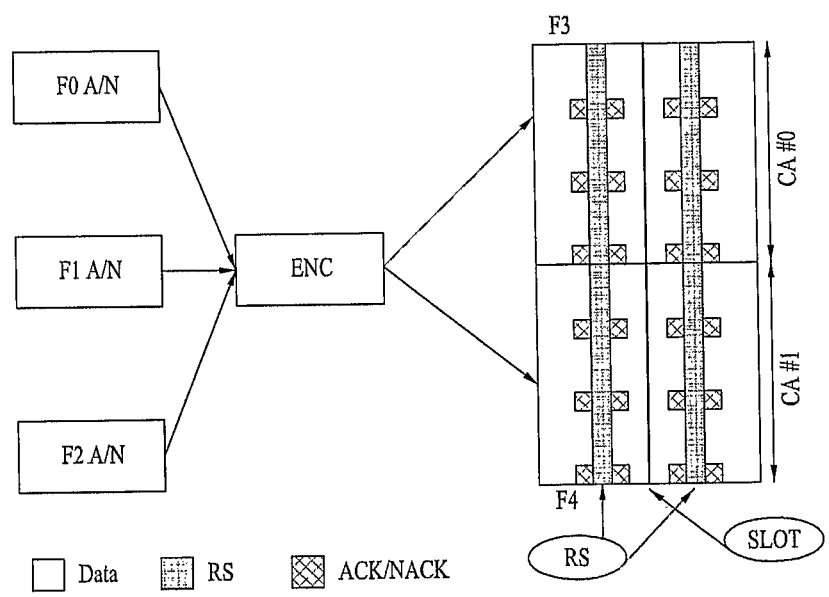

FIG. 53 illustrates a method for transmitting ACKs/NACKs for three DL carrier groups in two UL carrier groups according to an exemplary embodiment of the present invention.

Referring to FIG. 53, HARQ responses, i.e. ACKs/NACKs for the respective DL carrier groups are all jointly encoded in a single ENC and distributed to the UL carrier groups. The number of subcarriers available for transmission in the UL carrier group is added to the number of the coded ACK/NACK symbols and the sum is divided by the maximum number of ACK/NACK symbols that can be mapped per subcarrier (4 in the exemplary embodiment of the present invention) and rounded up. The coded ACKs/NACKs are distributed to the available subcarriers using the rounded-up value, at a maximum of four REs per subcarrier in such a manner that they are arranged in a predetermined order of the DL carrier groups or are interlaced with one another on a symbol basis.

On the premise that UL carrier groups to be used are preliminarily agreed between the BS and the mobile terminal, the BS should notify the mobile terminal of DL carrier groups to be used and/or the priority levels or numbers of the DL carrier groups, for implementation of the ACK/NACK transmission method illustrated in FIG. 53. Also, the coded ACKs/NACKs are basically positioned in a maximum of four REs adjacent to RSs per subcarrier by puncturing data mapped to the REs.

Figure 54:
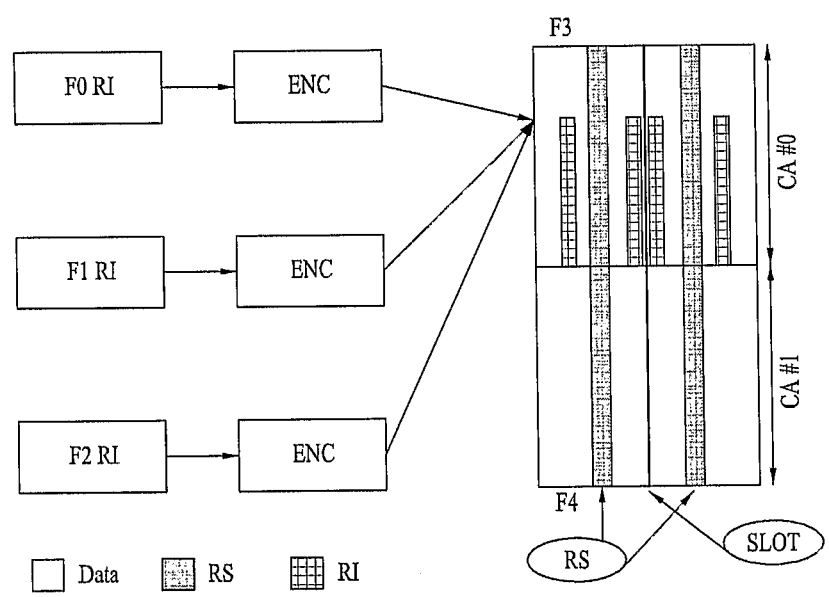
FIGS. 54 to 61 illustrate methods for transmitting RIs for three DL carrier groups in UL carrier groups according to exemplary embodiments of the present invention.

FIG. 54 illustrates a method for transmitting RIs for three DL carrier groups in a predetermined UL carrier group according to an exemplary embodiment of the present invention.

Referring to FIG. 54, RIs for the respective DL carrier groups are encoded separately in ENCs and transmitted in the predetermined UL carrier group (e.g., CA #0). The coded RIs are mapped to REs corresponding to symbols one RE apart from RSs, starting from a last subcarrier toward a first subcarrier available for transmission in the UL carrier group, in such a manner that the coded ACKs/NACKs are arranged in a predetermined order of the DL carrier groups or are interlaced with one another on a symbol basis.

Figure 55:
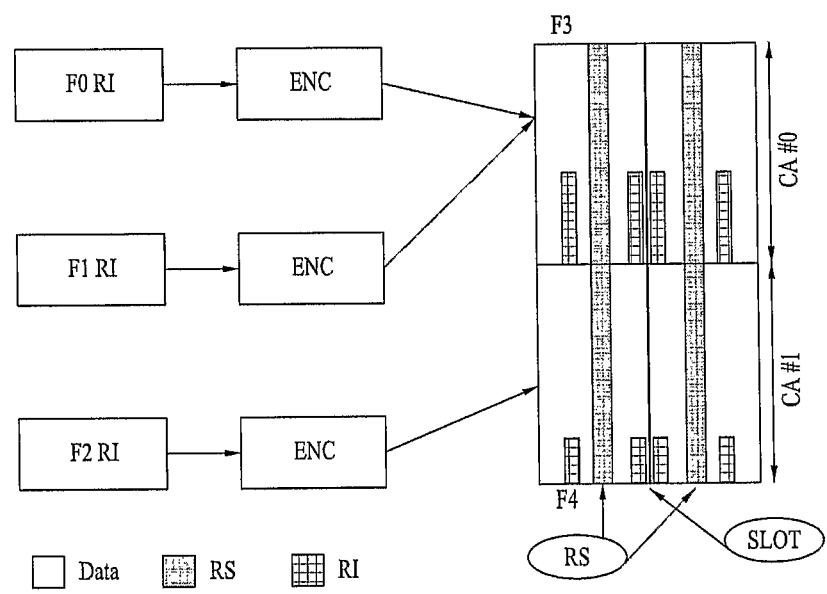

FIG. 55 illustrates a method for transmitting RIs for three DL carrier groups in two UL carrier groups according to an exemplary embodiment of the present invention.

Referring to FIG. 55, RIs for the respective DL carrier groups are encoded separately in ENCs and distributed to the UL carrier groups. The coded RIs are mapped to REs corresponding to symbols one RE apart from RSs, starting from a last subcarrier toward a first subcarrier available for transmission in each of the UL carrier groups, in such a manner that the coded RIs are arranged in a predetermined order of the DL carrier groups or are interlaced with one another on a symbol basis.

Figure 56:
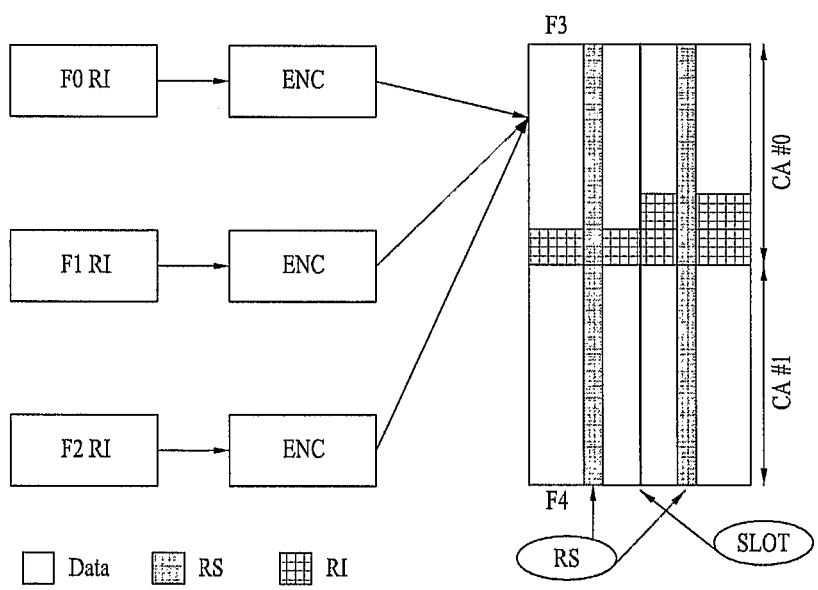

FIG. 56 illustrates a method for transmitting RIs for three DL carrier groups in a predetermined UL carrier group according to an exemplary embodiment of the present invention.

Referring to FIG. 56, RIs for the respective DL carrier groups are encoded separately in ENCs and transmitted in the predetermined UL carrier group (e.g., CA #0). The coded RIs are mapped in the time-first manner, following data in the UL carrier group, in such a manner that the coded RIs are arranged in a predetermined order of the DL carrier groups or are interlaced with one another on a symbol basis. If CQIs/PMIs are transmitted together, the data, the RIs, and the CQIs/PMIs in this order are sequentially mapped in the time-first manner. Meanwhile, when ACKs/NACKs are transmitted together with the RIs, the ACKs/NACKs may be positioned next to the RSs by puncturing the RIs mapped in the UL carrier group.

Figure 57:
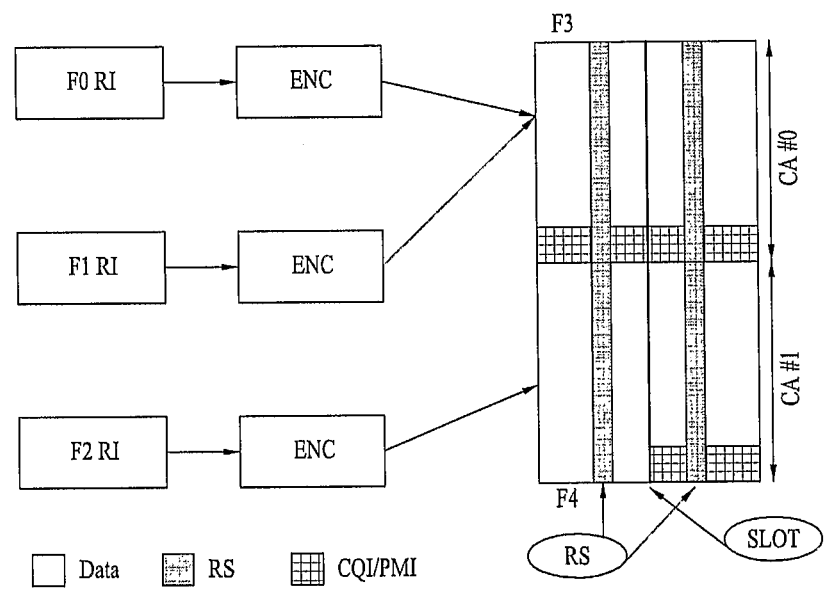

FIG. 57 illustrates a method for transmitting RIs for three DL carrier groups in two UL carrier groups according to an exemplary embodiment of the present invention.

Referring to FIG. 57, RIs for the respective DL carrier groups are encoded separately in ENCs and distributed to the UL carrier groups. The coded RIs are mapped in the time-first manner, following data in each of the UL carrier groups, in such a manner that the coded RIs are arranged in a predetermined order of the DL carrier groups or are interlaced with one another on a symbol basis. If CQIs/PMIs are transmitted together, the data, the RIs, and the CQIs/PMIs in this order are sequentially mapped in the time-first manner. Meanwhile, when ACKs/NACKs are transmitted together with the RIs, the ACKs/NACKs may be positioned next to the RSs by puncturing the RIs mapped in the UL carrier groups.

On the premise that UL carrier groups to be used are preliminarily agreed between the BS and the mobile terminal, the BS should notify the mobile terminal of DL carrier groups to be used and/or the priority levels or numbers of the DL carrier groups, for implementation of the RI transmission methods illustrated in FIGS. 54 to 57.

Figure 58:
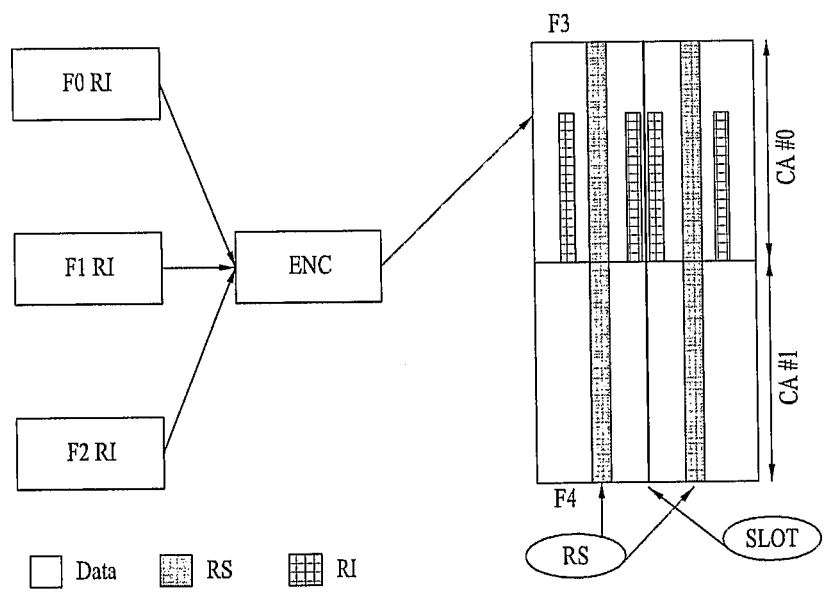
Figure 59:
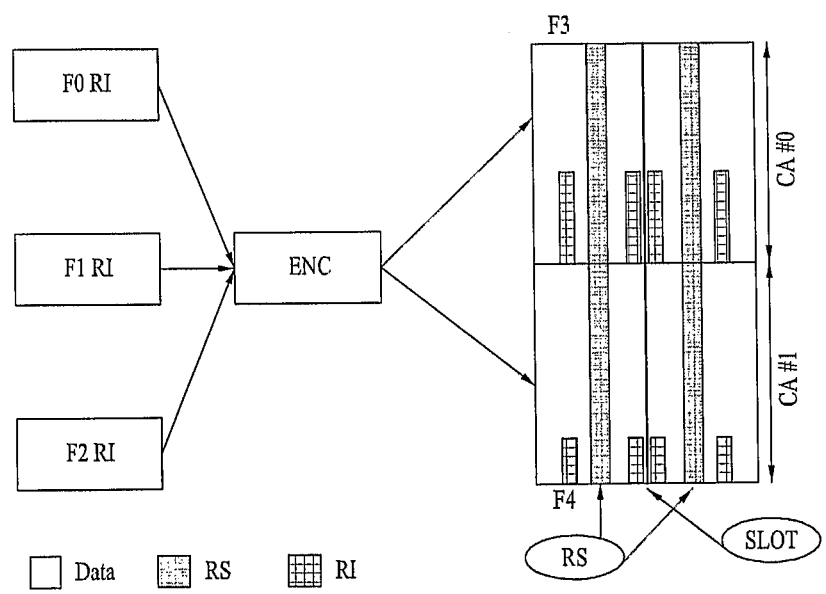
Figure 60:
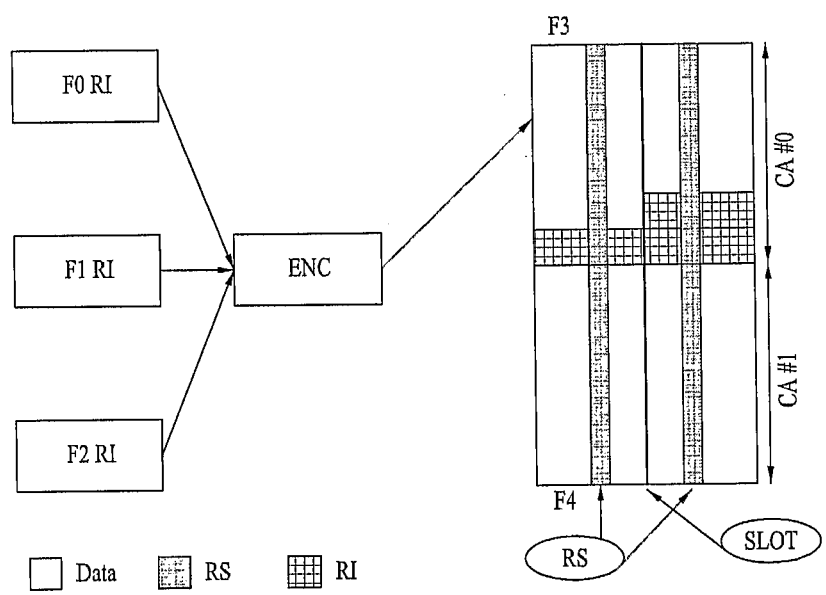
Figure 61:
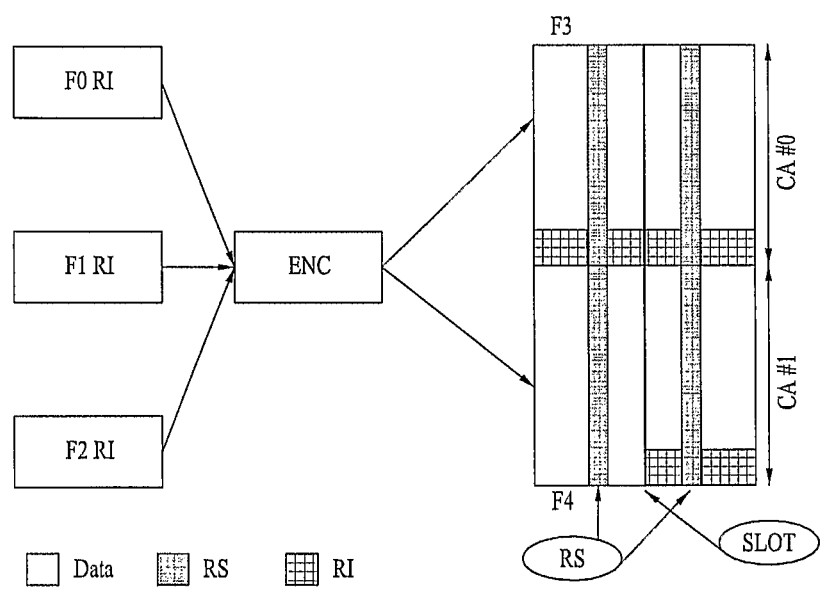

FIG. 58 illustrates a method for transmitting RIs for three DL carrier groups in a predetermined UL carrier group according to an exemplary embodiment of the present invention. FIG. 59 illustrates a method for transmitting RIs for three DL carrier groups in two UL carrier groups according to an exemplary embodiment of the present invention. FIG. 60 illustrates a method for transmitting RIs for three DL carrier groups in a predetermined UL carrier group according to an exemplary embodiment of the present invention. FIG. 61 illustrates a method for transmitting RIs for three DL carrier groups in two UL carrier groups according to an exemplary embodiment of the present invention. The RI transmission methods illustrated in FIGS. 58 to 61 are identical to those illustrated in FIGS. 54 to 57 except that the RIs for the three DL carrier groups are all jointly encoded in a single ENC.

Embodiment 6

Figure 62:
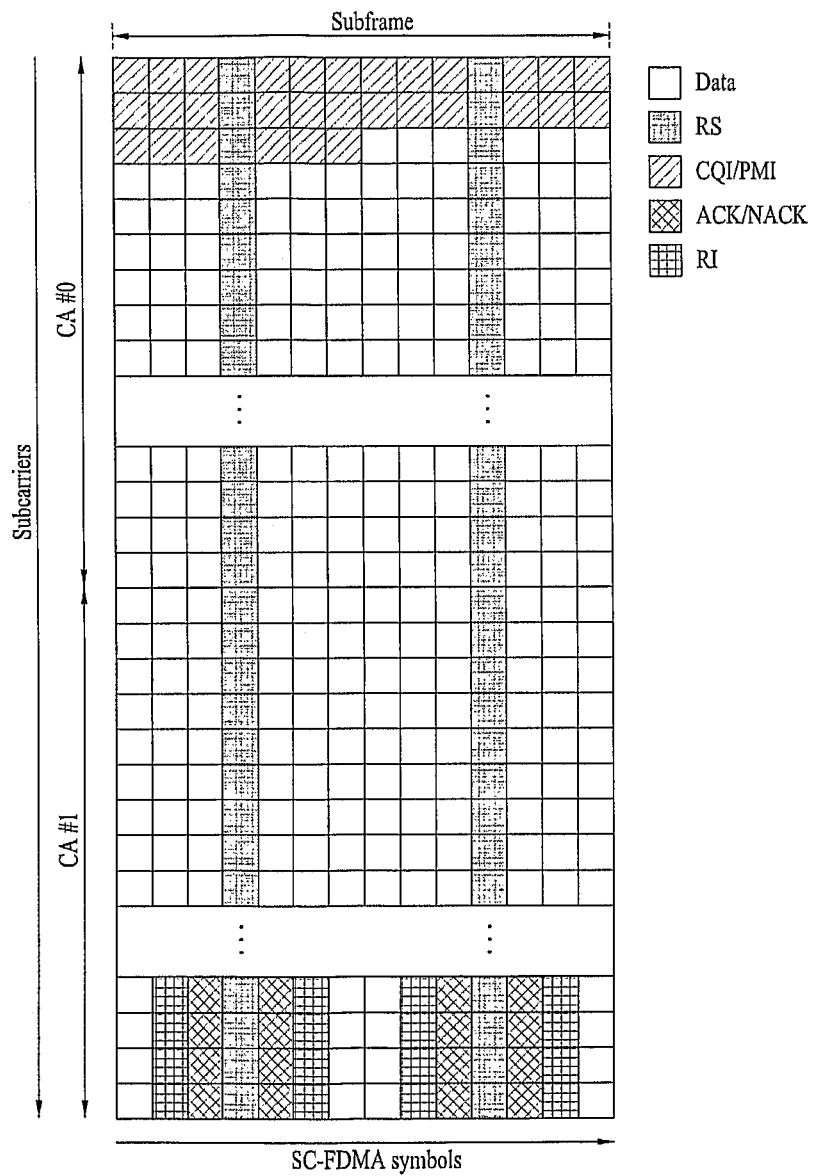
FIGS. 62 to 73 illustrate methods for transmitting control information about N DL carrier groups in UL carrier groups according to exemplary embodiments of the present invention.

FIG. 62 illustrates a method for transmitting control information about N DL carrier groups in two UL carrier groups according to an exemplary embodiment of the present invention.

Referring to FIG. 62, a CQI/PMI is measured or calculated for each DL carrier group. The CQIs/PMIs about the DL carrier groups are encoded separately in ENCs or jointly in a single ENC and mapped in the time-first manner, starting from a first SC-FDMA symbol of a first subcarrier among a set of subcarriers used, such that they are arranged in a predetermined order of the DL carrier groups or they are interlaced with one another on a symbol basis.

HARQ responses, i.e. ACKs/NACKs for the DL carrier groups are encoded separately in the ENCs or jointly in the single ENC and mapped to REs corresponding to symbols adjacent to an RS (REs corresponding to four symbols adjacent to RSs, if the number of RSs per subcarrier is 2), starting from a last subcarrier toward the first subcarrier among the set of subcarriers used, in such a manner that the coded ACKs/NACKs are arranged in a predetermined order of the DL carrier groups or are interlaced with one another on a symbol basis.

RIs for the DL carrier groups are encoded separately in the ENCs or jointly in the single ENC and mapped to REs corresponding to symbols one RE apart from the RS (REs corresponding to four symbols one RE apart from RSs, if the number of RSs per subcarrier is 2), starting from the last subcarrier toward the first subcarrier among the set of subcarriers used, in such a manner that the coded ACKs/NACKs are arranged in a predetermined order of the DL carrier groups or are interlaced with one another on a symbol basis.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

Figure 63:
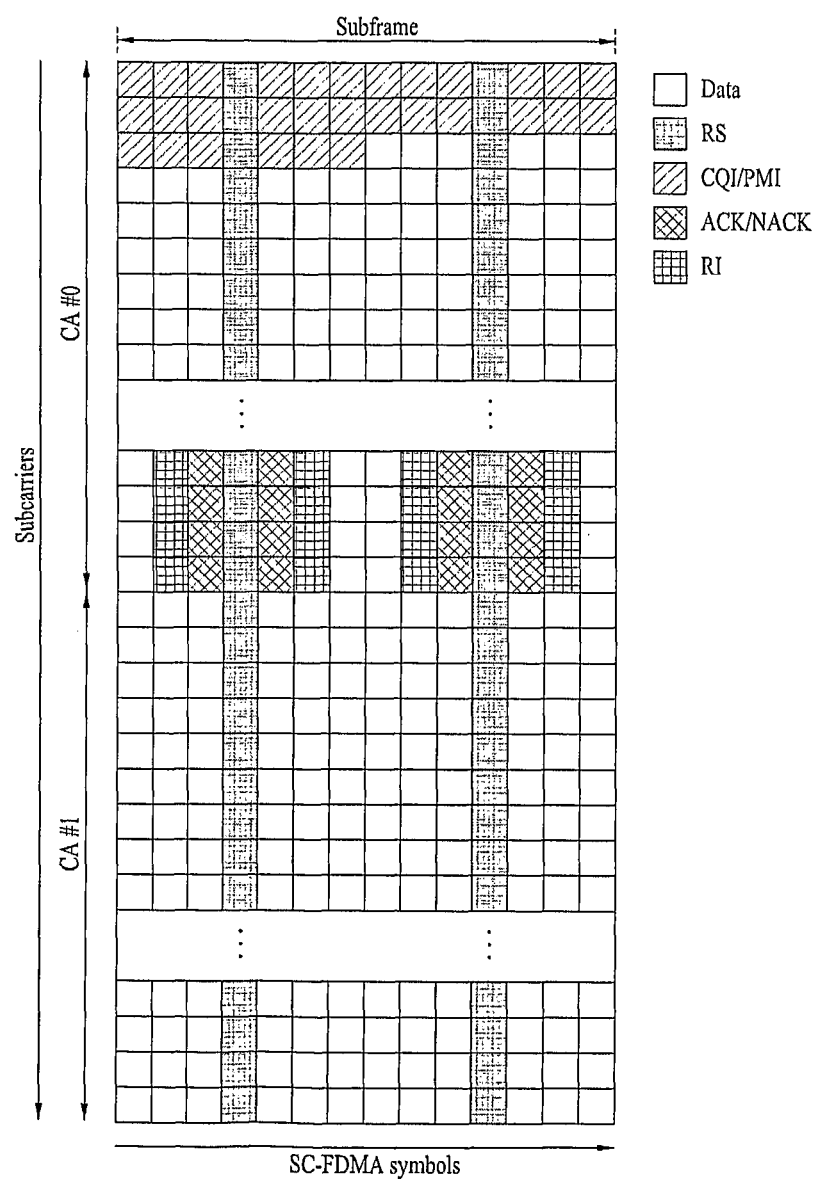

FIG. 63 illustrates a method for transmitting control information about N DL carrier groups in a predetermined UL carrier group according to an exemplary embodiment of the present invention.

Referring to FIG. 63, a CQI/PMI is measured or calculated for each DL carrier group. The CQIs/PMIs about the DL carrier groups are encoded separately in ENCS or jointly in a single ENC and mapped in the time-first manner, starting from a first SC-FDMA symbol of a first subcarrier available for transmission in the UL carrier group, such that they are arranged in a predetermined order of the DL carrier groups or they are interlaced with one another on a symbol basis.

HARQ responses, i.e. ACKs/NACKs for the DL carrier groups are encoded separately in the ENCs or jointly in the single ENC and mapped to REs corresponding to symbols adjacent to an RS (REs corresponding to four symbols adjacent to RSs, if the number of RSs per subcarrier is 2), starting from a last subcarrier toward the first subcarrier available for transmission in the UL carrier group, in such a manner that the coded ACKs/NACKs are arranged in a predetermined order of the DL carrier groups or are interlaced with one another on a symbol basis.

RIs for the DL carrier groups are encoded separately in the ENCs or jointly in the single ENC and mapped to REs corresponding to symbols one RE apart from the RS (REs corresponding to four symbols one RE apart from RSs, if the number of RSs per subcarrier is 2), starting from the last subcarrier toward the first subcarrier available for transmission in the UL carrier group, in such a manner that the coded RIs are arranged in a predetermined order of the DL carrier groups or are interlaced with one another on a symbol basis.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

Figure 64:
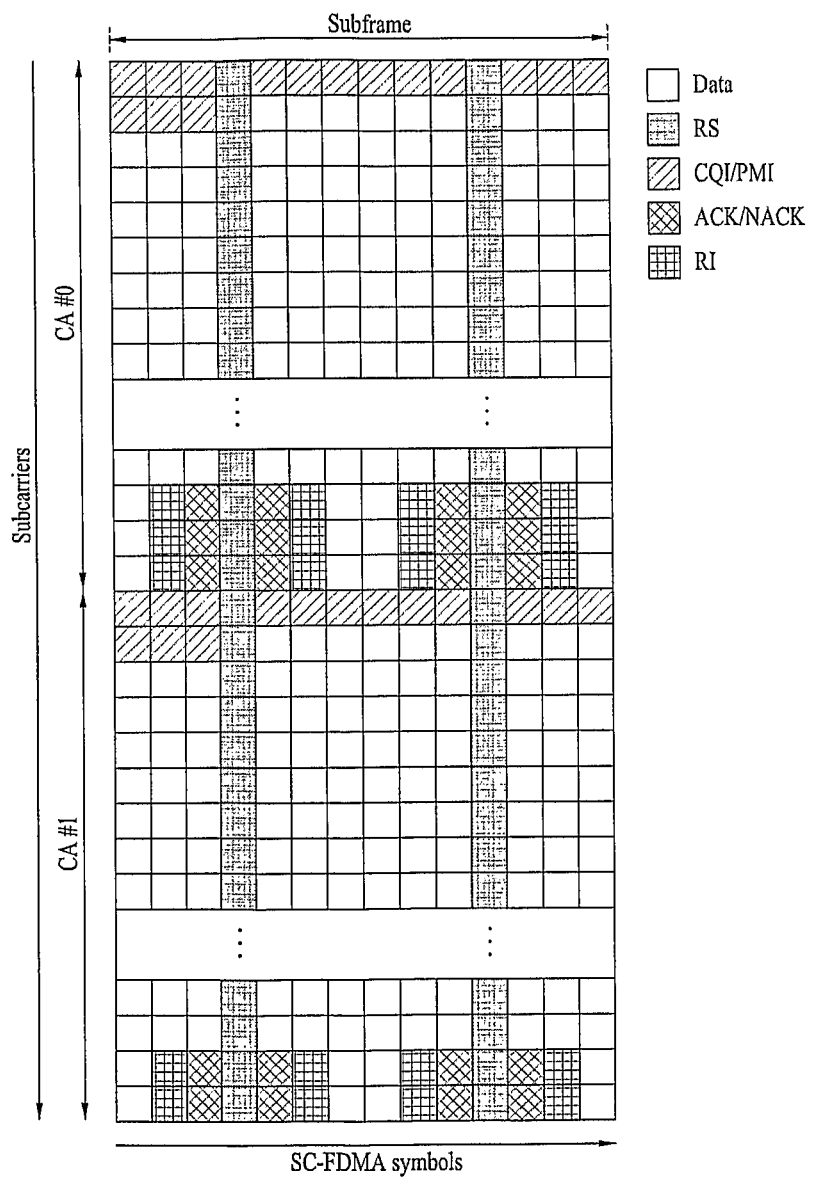

FIG. 64 illustrates a method for transmitting control information about N DL carrier groups in two UL carrier groups according to an exemplary embodiment of the present invention.

Referring to FIG. 64, a CQI/PMI is measured or calculated for each DL carrier group. The CQIs/PMIs about the DL carrier groups are encoded separately in ENCs or jointly in a single ENC. Or CQIs/PMIs about DL carrier groups assigned to the same UL carrier group are jointly encoded in an ENC. Then the coded CQIs/PMIs are distributed to the UL carrier groups. The coded CQIs/PMIs are mapped in the time-first manner, starting from a first SC-FDMA symbol of a first subcarrier available for transmission in each of the UL carrier groups, such that they are arranged in a predetermined order of the DL carrier groups or they are interlaced with one another on a symbol basis.

HARQ responses, i.e. ACKs/NACKs for the DL carrier groups are encoded separately in the ENCs or jointly in the single ENC. Or ACKs/NACKs for DL carrier groups assigned to the same UL carrier group are jointly encoded in an ENC. Then the coded ACKs/NACKs are distributed to the UL carrier groups. The coded ACKs/NACKs are mapped to REs corresponding to symbols adjacent to an RS (REs corresponding to four symbols adjacent to RSs, if the number of RSs per subcarrier is 2), starting from a last subcarrier toward the first subcarrier available for transmission in each of the UL carrier groups, in such a manner that the coded ACKs/NACKs are arranged in a predetermined order of the DL carrier groups or are interlaced with one another on a symbol basis.

RIs for the DL carrier groups are encoded separately in the ENCs or jointly in the single ENC. Or RIs for DL carrier groups assigned to the same UL carrier group are jointly encoded in an ENC. Then the coded RIs are distributed to the UL carrier groups. The coded RIs are mapped to REs corresponding to symbols one RE apart from the RS (REs corresponding to four symbols one RE apart from RSs, if the number of RSs per subcarrier is 2), starting from the last subcarrier toward the first subcarrier available for transmission in each of the UL carrier groups, in such a manner that the coded RIs are arranged in a predetermined order of the DL carrier groups or are interlaced with one another on a symbol basis.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

Figure 65:
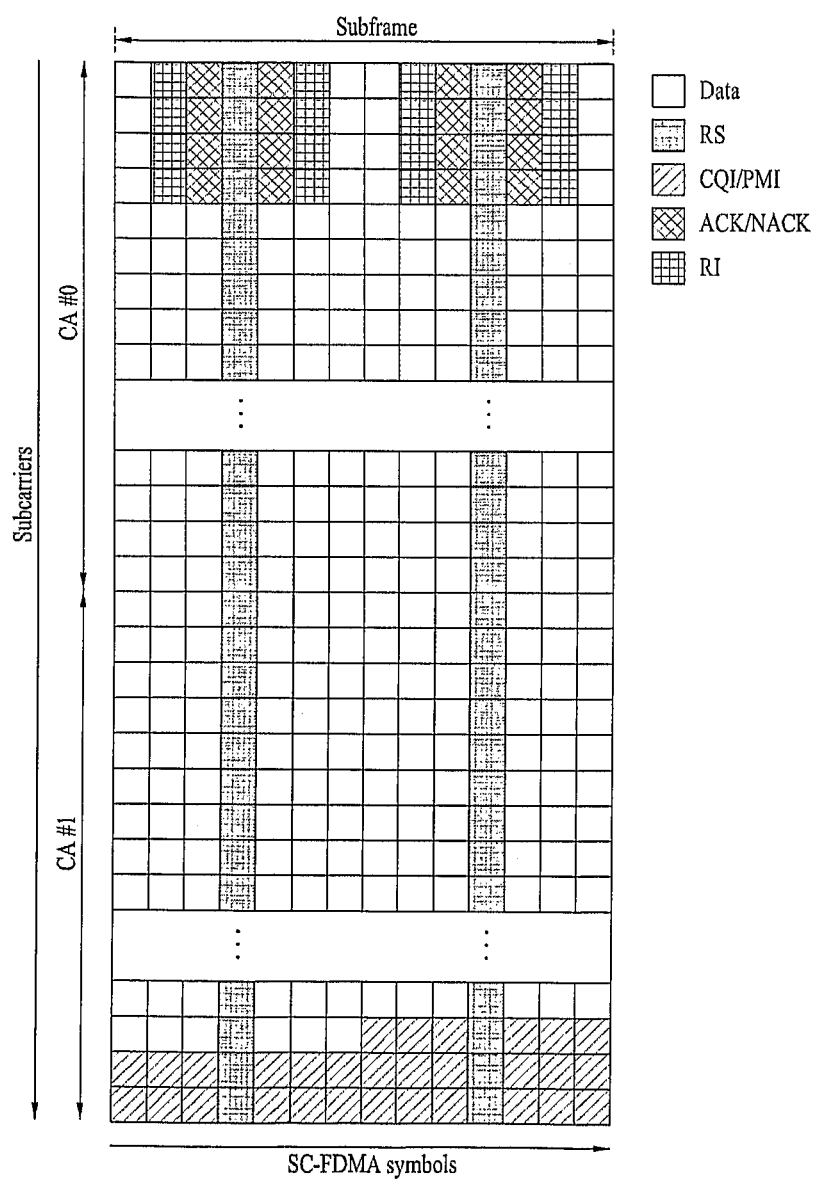

FIG. 65 illustrates a method for transmitting control information about N DL carrier groups in two UL carrier groups according to an exemplary embodiment of the present, invention.

Referring to FIG. 65, a CQI/PMI is measured or calculated for each DL carrier group. The CQIs/PMIs about the DL carrier groups are encoded separately in ENCs or jointly in a single ENC. Then the coded CQIs/PMIs are mapped in the time-first manner, following data, such that they are arranged in a predetermined order of the DL carrier groups or they are interlaced with one another on a symbol basis.

HARQ responses, i.e. ACKs/NACKs for the DL carrier groups are encoded separately in the ENCs or jointly in the single ENC. Then the coded ACKs/NACKs are mapped to REs corresponding to symbols adjacent to an RS (REs corresponding to four symbols adjacent to RSs, if the number of RSs per subcarrier is 2), starting from a first subcarrier toward a last subcarrier among a set of subcarriers used, in such a manner that the coded ACKs/NACKs are arranged in a predetermined order of the DL carrier groups or are interlaced with one another on a symbol basis.

RIs for the DL carrier groups are encoded separately in the ENCs or jointly in the single ENC. The coded RIs are mapped to REs corresponding to symbols one RE apart from the RS (REs corresponding to four symbols one RE apart from RSs, if the number of RSs per subcarrier is 2), starting from the first subcarrier toward the last subcarrier among the set of subcarriers used, in such a manner that the coded RIs are arranged in a predetermined order of the DL carrier groups or are interlaced with one another on a symbol basis.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

Figure 66:
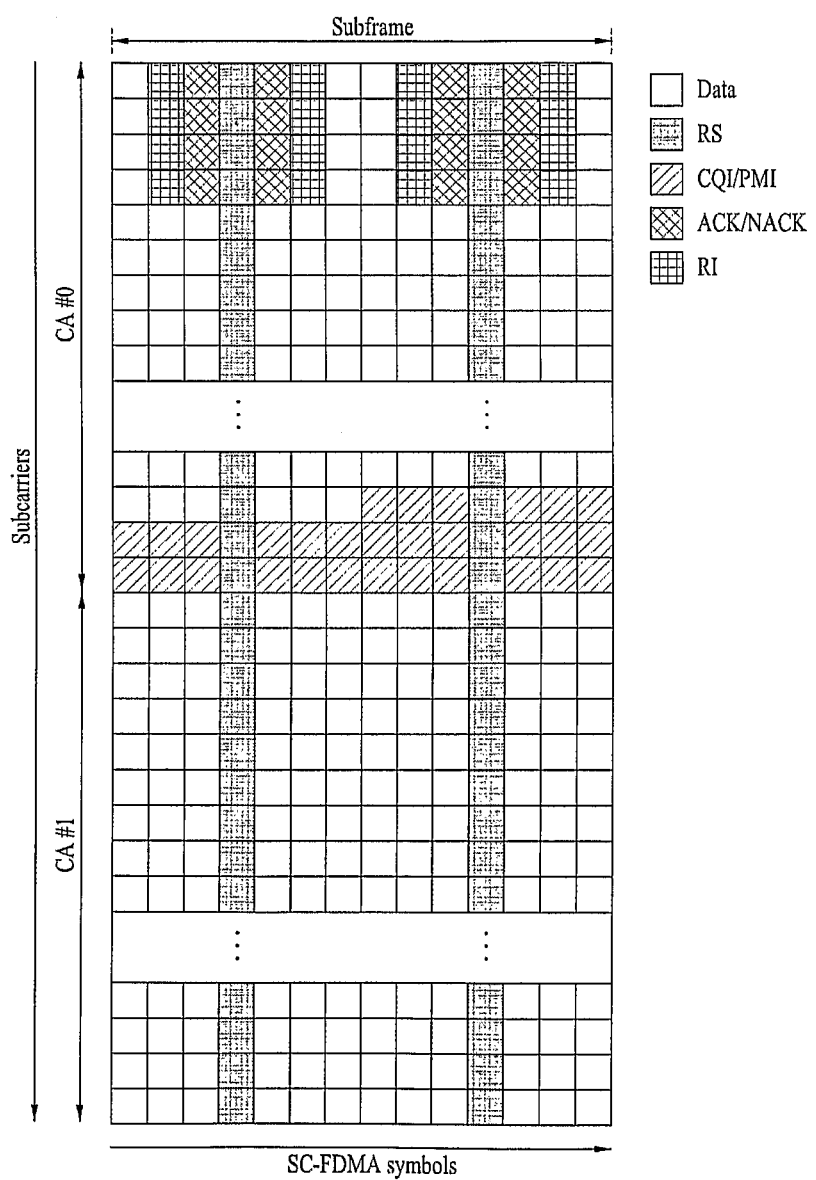

FIG. 66 illustrates a method for transmitting control information about N DL carrier groups in a predetermined UL carrier group according to an exemplary embodiment of the present invention.

Referring to FIG. 66, a CQI/PMI is measured or calculated for each DL carrier group. The CQIs/PMIs about the DL carrier groups are encoded separately in ENCs or jointly in a single ENC. Then the coded CQIs/PMIs are mapped in the time-first manner, following data in the UL carrier group, in such a manner that the coded CQIs/PMIs are arranged in a predetermined order of the DL carrier groups or are interlaced with one another on a symbol basis.

HARQ responses, i.e. ACKs/NACKs about the DL carrier groups are encoded separately in the ENCs or jointly in the single ENC. The coded ACKs/NACKs are mapped to REs corresponding to symbols adjacent to an RS (REs corresponding to four symbols adjacent to RSs, if the number of RSs per subcarrier is 2), starting from a first subcarrier toward a last subcarrier available for transmission in the UL carrier group, in such a manner that the coded ACKs/NACKs are arranged in a predetermined order of the DL carrier groups or are interlaced with one another on a symbol basis.

RIs for the DL carrier groups are encoded separately in the ENCs or jointly in the single ENC. Then the coded RIs are mapped to REs corresponding to symbols one RE apart from the RS (REs corresponding to four symbols one RE apart from RSs, if the number of RSs per subcarrier is 2), starting from the first subcarrier toward the last subcarrier available for transmission in the UL carrier group, in such a manner that the coded RIs are arranged in a predetermined order of the DL carrier groups or are interlaced with one another on a symbol basis.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

Figure 67:
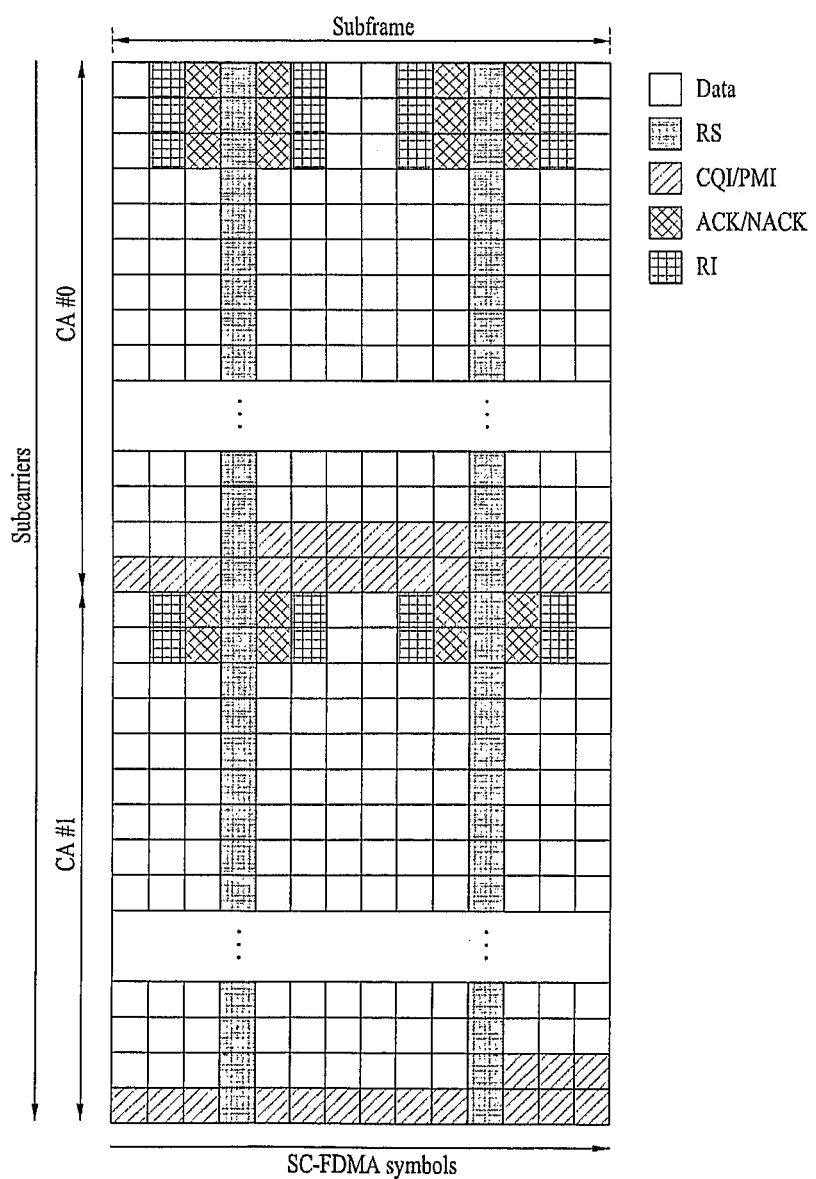

FIG. 67 illustrates a method for transmitting control information about N DL carrier groups in two UL carrier groups according to an exemplary embodiment of the present invention.

Referring to FIG. 67, a CQI/PMI is measured or calculated for each DL carrier group. The CQIs/PMIs about the DL carrier groups are encoded separately in ENCs or jointly in a single ENC. Or CQIs/PMIs about DL carrier groups assigned to the same UL carrier group are jointly encoded in an ENC. Then the coded CQIs/PMIs are distributed to the UL carrier groups. The coded CQIs/PMIs are mapped in the time-first manner, following data, such that they are arranged in a predetermined order of the DL carrier groups or they are interlaced with one another on a symbol basis.

HARQ responses, i.e. ACKs/NACKs for the DL carrier groups are encoded separately in the ENCs or jointly in the single ENC. Or the ACKs/NACKs for DL carrier groups assigned to the same UL carrier group are jointly encoded in an ENC. Then the coded ACKs/NACKs are distributed to the UL carrier groups. The coded ACKs/NACKs are mapped to REs corresponding to symbols adjacent to an RS (REs corresponding to four symbols adjacent to RSs, if the number of RSs per subcarrier is 2), starting from a first subcarrier toward a last subcarrier available for transmission in each of the UL carrier groups, in such a manner that the coded ACKs/NACKs are arranged in a predetermined order of the DL carrier groups or are interlaced with one another on a symbol basis.

RIs for the DL carrier groups are encoded separately in the ENCs or jointly in the single ENC. Or RIs for DL carrier groups assigned to the same UL carrier group are jointly encoded in an ENC. Then the coded RIs are distributed to the UL carrier groups. The coded RIs are mapped to REs corresponding to symbols one RE apart from the RS (REs corresponding to four symbols one RE apart from RSs, if the number of RSs per subcarrier is 2), starting from the first subcarrier toward the last subcarrier available for transmission in each of the UL carrier groups, in such a manner that the coded RIs are arranged in a predetermined order of the DL carrier groups or are interlaced with one another on a symbol basis.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

In the mean time, CA #0 and CA #1 denote UL carrier groups in FIGS. 62 to 67. It may be further contemplated that CA #0 and CA #1 denote parts of the UL carrier groups, respectively.

Figure 68:
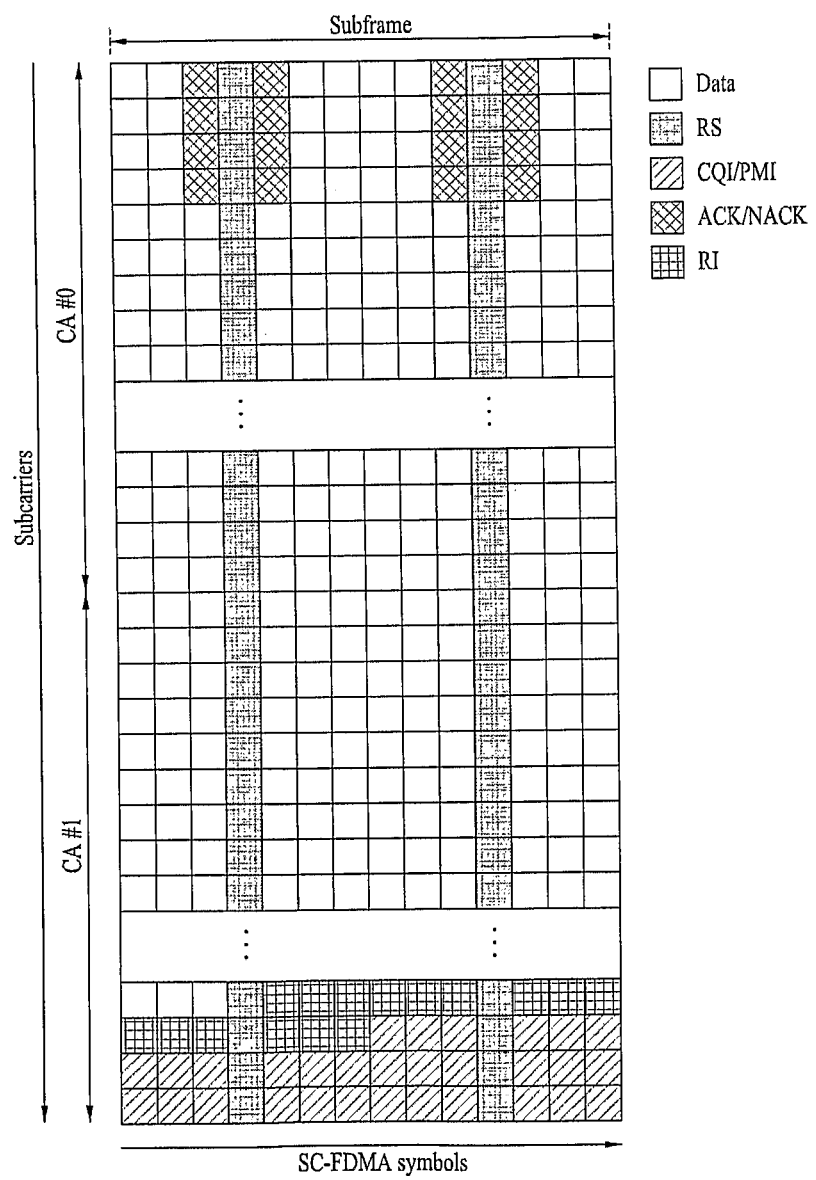

FIG. 68 illustrates a method for transmitting control information about N DL carrier groups in two UL carrier groups according to an exemplary embodiment of the present invention.

Referring to FIG. 68, a CQI/PMI is measured or calculated for each DL carrier group. The CQIs/PMIs about the DL carrier groups are encoded separately in ENCs or jointly in a single ENC. Then the coded CQIs/PMIs are mapped in the time-first manner, following data, such that they are arranged in a predetermined order of the DL carrier groups or they are interlaced with one another on a symbol basis. If RIs are also transmitted, the data, the RIs, and the CQIs/PMIs in this order are sequentially mapped in the time-first manner.

HARQ responses, i.e. ACKs/NACKs about the DL carrier groups are encoded separately in the ENCs or jointly in the single ENC. Then the coded ACKs/NACKs are mapped to REs corresponding to symbols adjacent to an RS (REs corresponding to four symbols adjacent to RSs, if the number of RSs per subcarrier is 2), starting from a first subcarrier toward a last subcarrier among a set of subcarriers used, in such a manner that the coded ACKs/NACKs are arranged in a predetermined order of the DL carrier groups or are interlaced with one another on a symbol basis.

RIs about the DL carrier groups are encoded separately in the ENCs or jointly in the single ENC. The coded RIs are mapped in the time-first manner, following the data, in such a manner that the coded ACKs/NACKs are arranged in a predetermined order of the DL carrier groups or are interlaced with one another on a symbol basis. If the CQIs/PMIs are transmitted together, the data, the RIs, and the CQIs/PMIs in this order are sequentially mapped in the time-first manner.

Data is rate-matched with the CQIs/PMIs and the RIs. Thus, the data is mapped to REs other than the REs of the CQIs/PMIs and the RIs in the time-first manner.

Figure 69:
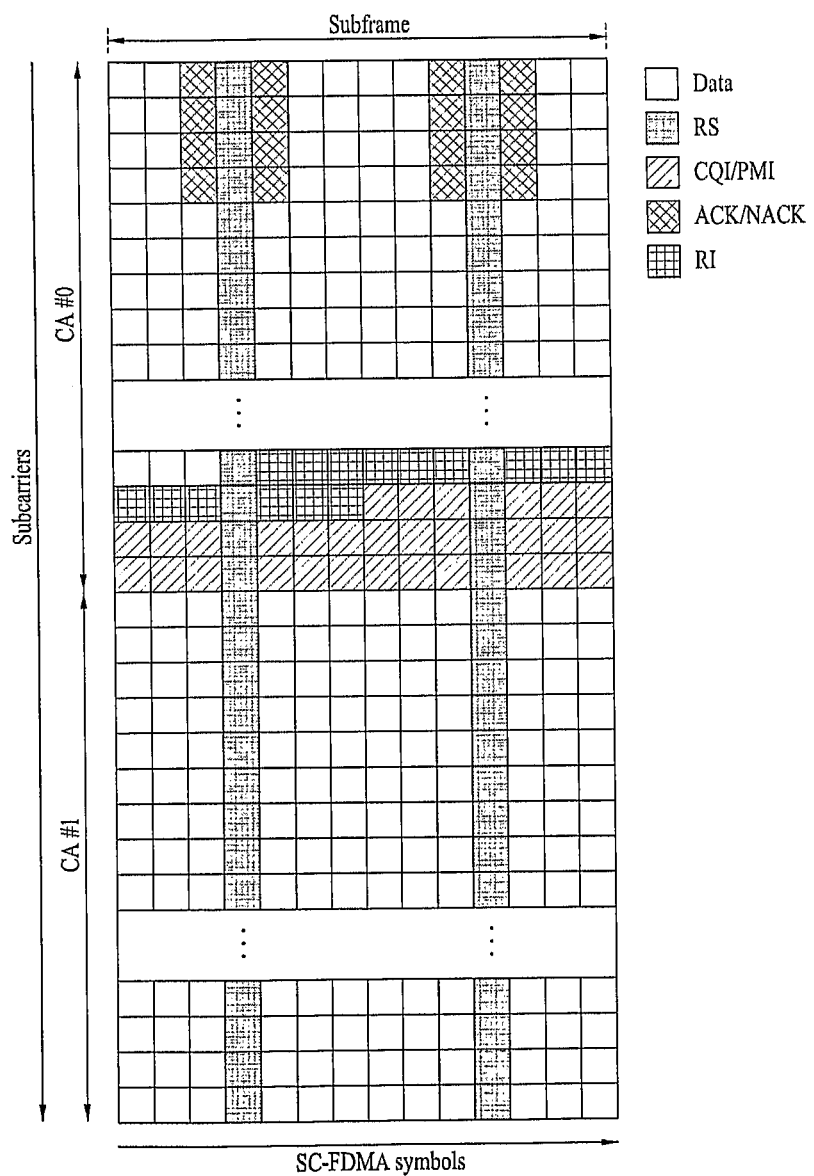

FIG. 69 illustrates a method for transmitting control information about N DL carrier groups in a predetermined UL carrier group according to an exemplary embodiment of the present invention.

Referring to FIG. 69, a CQI/PMI is measured or calculated for each DL carrier group. The CQIs/PMIs about the DL carrier groups are encoded separately in ENCs or jointly in a single ENC. Then the coded CQIs/PMIs are mapped in the time-first manner, following data in the UL carrier group, such that they are arranged in a predetermined order of the DL carrier groups or they are interlaced with one another on a symbol basis. If RIs are also transmitted, the data, the RIs, and the CQIs/PMIs in this order are sequentially mapped in the time-first manner.

HARQ responses, i.e. ACKs/NACKs about the DL carrier groups are encoded separately in the ENCs or jointly in the single ENC. Then the coded ACKs/NACKs are mapped to REs corresponding to symbols adjacent to an RS (REs corresponding to four symbols adjacent to RSs, if the number of RSs per subcarrier is 2), starting from a first subcarrier toward a last subcarrier available for transmission in the UL carrier group, in such a manner that the coded ACKs/NACKs are arranged in a predetermined order of the DL carrier groups or are interlaced with one another on a symbol basis.

The RIs about the DL carrier groups are encoded separately in the ENCs or jointly in the single ENC. The coded RIs are mapped in the time-first manner, following the data in the UL carrier group, in such a manner that the coded RIs are arranged in a predetermined order of the DL carrier groups or are interlaced with one another on a symbol basis. If the CQIs/PMIs are transmitted together, the data, the RIs, and the CQIs/PMIs in this order are sequentially mapped in the time-first manner.

Data is rate-matched with the CQIs/PMIs and the RIs. Thus, the data is mapped to REs other than the REs of the CQIs/PMIs and the RIs in the time-first manner.

Figure 70:
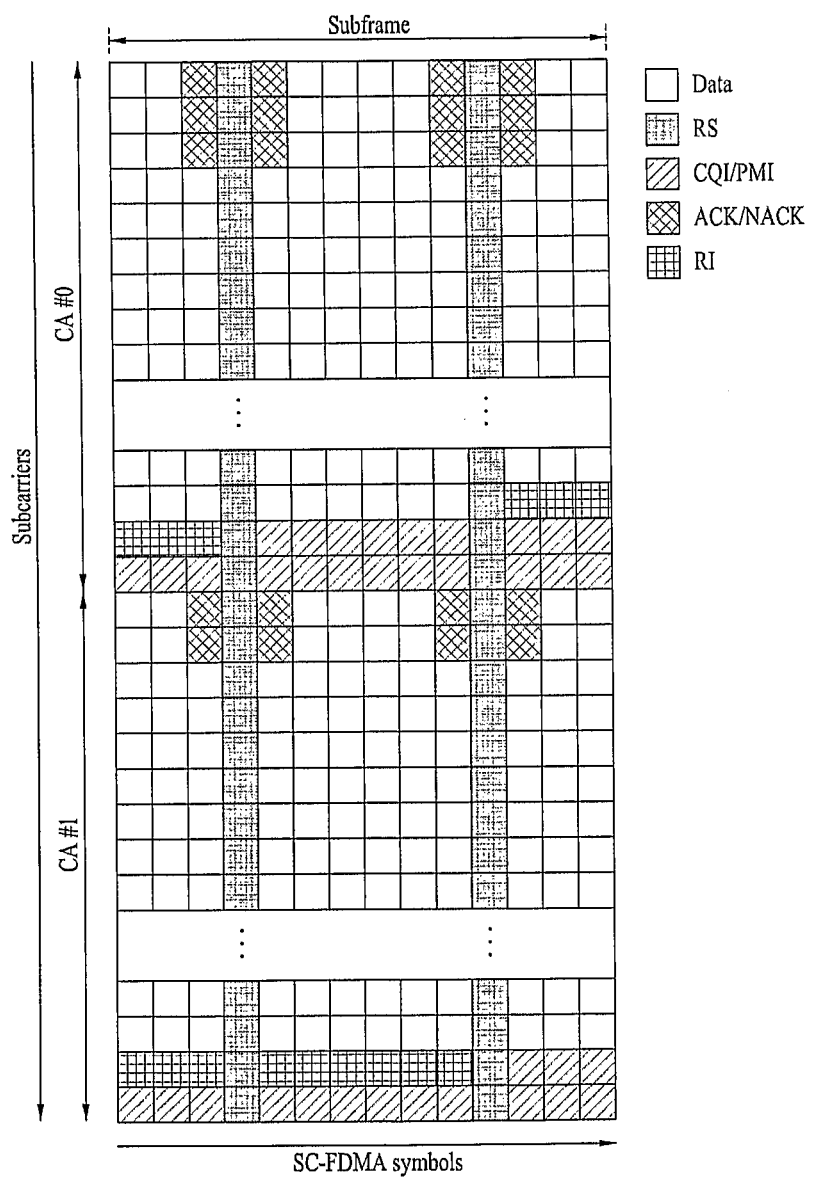

FIG. 70 illustrates a method for transmitting control information about N DL carrier groups in two UL carrier groups according to an exemplary embodiment of the present invention.

Referring to FIG. 70, a CQI/PMI is measured or calculated for each DL carrier group. The CQIs/PMIs about the DL carrier groups are encoded separately in ENCs or jointly in a single ENC. Or CQIs/PMIs about DL carrier groups assigned to the same UL carrier group are jointly encoded in an ENC. Then the coded CQIs/PMIs are distributed to the UL carrier groups. The coded CQIs/PMIs are mapped in the time-first manner, following data in each of the UL carrier groups, such that they are arranged in a predetermined order of the DL carrier groups or they are interlaced with one another on a symbol basis. If RIs are also transmitted, the data, the RIs, and the CQIs/PMIs in this order are sequentially mapped in the time-first manner.

HARQ responses, i.e. ACKs/NACKs for the DL carrier groups are encoded separately in the ENCs or jointly in the single ENC. Or the ACKs/NACKs for DL carrier groups assigned to the same UL carrier group are jointly encoded in an ENC. Then the coded ACKs/NACKs are distributed to the UL carrier groups. The coded ACKs/NACKs are mapped to REs corresponding to symbols adjacent to an RS (REs corresponding to four symbols adjacent to RSs, if the number of RSs per subcarrier is 2), starting from a first subcarrier toward a last subcarrier available for transmission in each of the UL carrier groups, in such a manner that the coded ACKs/NACKs are arranged in a predetermined order of the DL carrier groups or are interlaced with one another on a symbol basis.

RIs for the DL carrier groups are encoded separately in the ENCs or jointly in the single ENC. Or RIs for DL carrier groups assigned to the same UL carrier group are jointly encoded in an ENC. Then the coded RIs are distributed to the UL carrier groups. The coded RIs are mapped in the time-first manner, following the data in each of the UL carrier groups, in such a manner that the coded RIs are arranged in a predetermined order of the DL carrier groups or are interlaced with one another on a symbol basis. If the CQIs/PMIs are transmitted together, the data, the RIs, and the CQIs/PMIs in this order are sequentially mapped in the time-first manner.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

Figure 71:
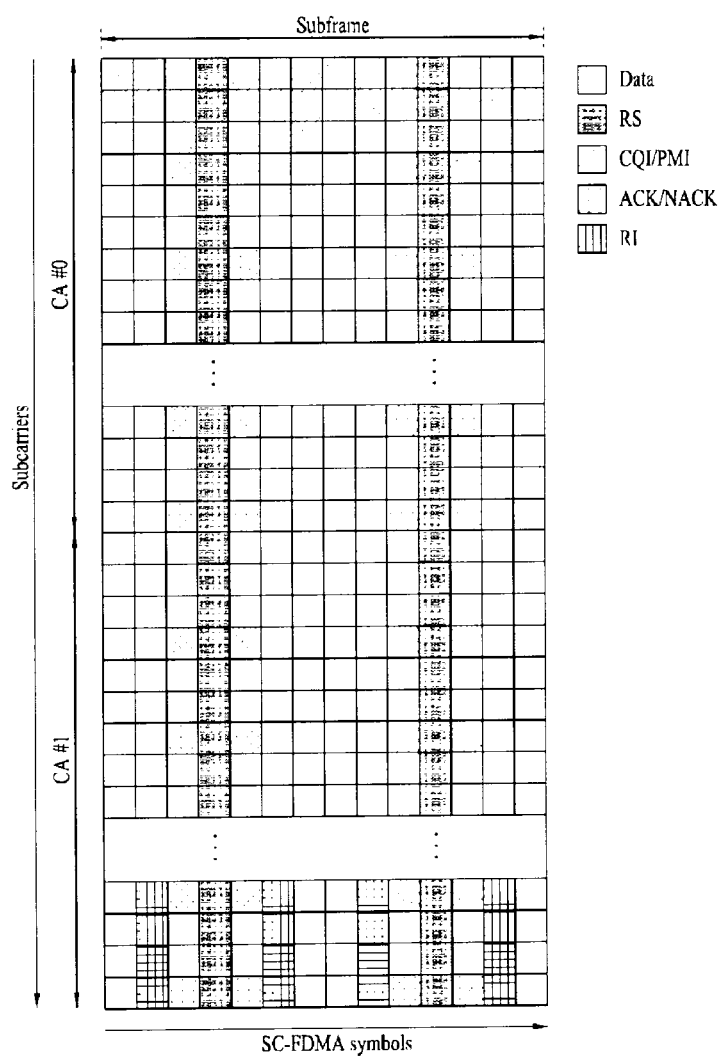

FIG. 71 illustrates a method for transmitting control information about N DL carrier groups in two UL carrier groups according to an exemplary embodiment of the present invention.

Referring to FIG. 71, a CQI/PMI is measured or calculated for each DL carrier group. The CQIs/PMIs about the DL carrier groups are encoded separately in ENCs or jointly in a single ENC. Then the coded CQIs/PMIs are mapped in the time-first manner, starting from a first SC-FDMA symbol of a first subcarrier among a set of subcarriers used, such that they are arranged in a predetermined order of the DL carrier groups or they are interlaced with one another on a symbol basis.

HARQ responses, i.e. ACKs/NACKs for the respective DL carrier groups are encoded separately in the ENCs or jointly in the single ENC and distributed to the UL carrier groups, for transmission. The total number of subcarriers available for transmission except for the subcarriers having the CQIs/PMIs in the UL carrier groups is added to the number of the coded ACK/NACK symbols and the sum is divided by the maximum number of ACK/NACK symbols per subcarrier and rounded up. The coded ACKs/NACKs are mapped to the available subcarriers except the subcarriers including the CQIs/PMIs, at a maximum of four REs per subcarrier (there are four symbols adjacent to RSs, if the number of RSs per subcarrier is 2), in such a manner that they are arranged in a predetermined order of the DL carrier groups or are interlaced with one another on a symbol basis.

RIs for the DL carrier groups are encoded separately in the ENCs or jointly in the single ENC. Then the coded RIs are mapped to REs corresponding to symbols one RE apart from the RS (REs corresponding to four symbols one RE apart from RSs, if the number of RSs per subcarrier is 2), starting from the last subcarrier toward the first subcarrier among the set of subcarriers available for transmission, in such a manner that the coded RIs are arranged in a predetermined order of the DL carrier groups or are interlaced with one another on a symbol basis.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

Figure 72:
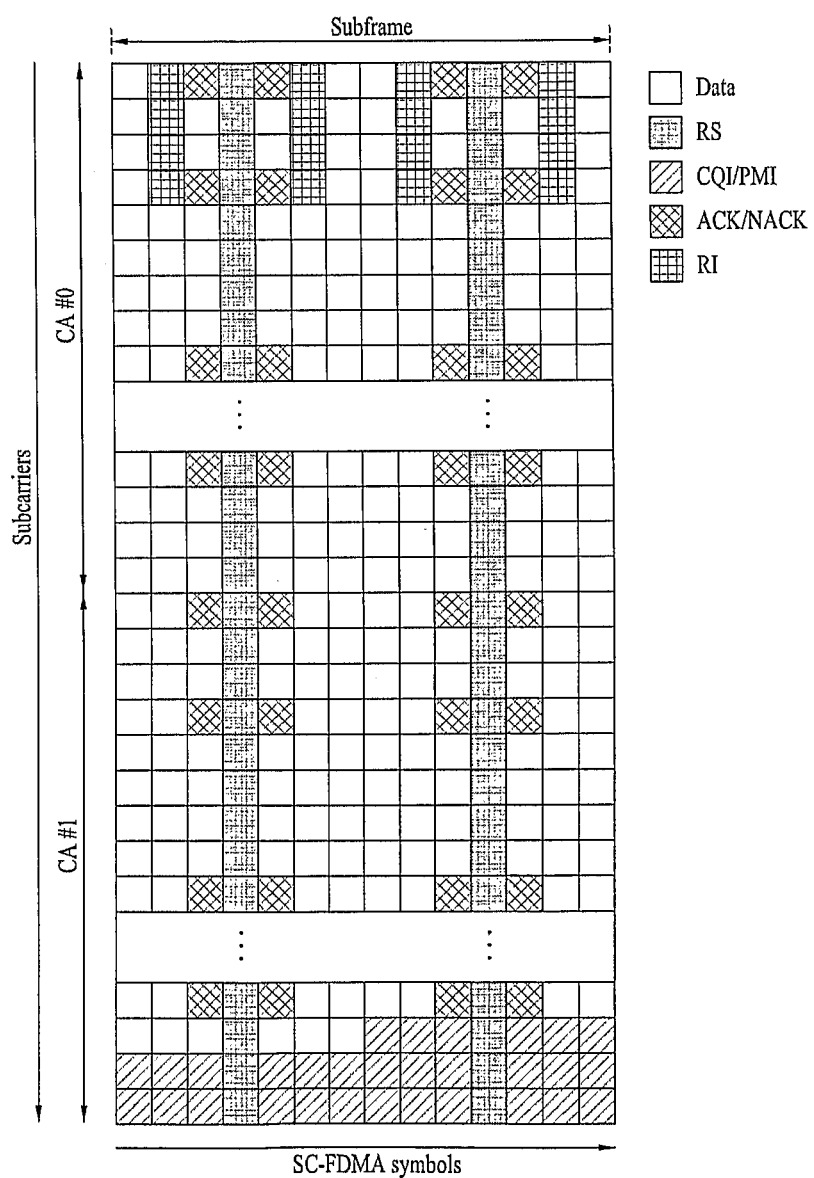

FIG. 72 illustrates a method for transmitting control information about N DL carrier groups in two UL carrier groups according to an exemplary embodiment of the present invention.

Referring to FIG. 72, a CQI/PMI is measured or calculated for each DL carrier group. The CQIs/PMIs about the DL carrier groups are encoded separately in ENCs or jointly in a single ENC. Then the coded CQIs/PMIs are mapped in the time-first manner, following data, such that they are arranged in a predetermined order of the DL carrier groups or they are interlaced with one another on a symbol basis.

HARQ responses, i.e. ACKs/NACKs for the respective DL carrier groups are encoded separately in the ENCs or jointly in the single ENC and distributed to the UL carrier groups, for transmission. The total number of subcarriers available for transmission except for the subcarriers having the CQIs/PMIs in the UL carrier groups is added to the number of the coded ACK/NACK symbols and the sum is divided by the maximum number of ACK/NACK symbols per subcarrier and rounded up. The coded ACKs/NACKs are mapped to the available subcarriers except the subcarriers including the CQIs/PMIs, at a maximum of four REs per subcarrier (there are four symbols adjacent to RSs, if the number of RSs per subcarrier is 2), in such a manner that they are arranged in a predetermined order of the DL carrier groups or are interlaced with one another on a symbol basis.

RIs for the DL carrier groups are encoded separately in the ENCs or jointly in the single ENC. Then the coded RIs are mapped to REs corresponding to symbols one RE apart from the RS (REs corresponding to four symbols one RE apart from RSs, if the number of RSs per subcarrier is 2), starting from a first subcarrier toward a last subcarrier among a set of subcarriers used, in such a manner that the coded RIs are arranged in a predetermined order of the DL carrier groups or are interlaced with one another on a symbol basis.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs.

Figure 73:
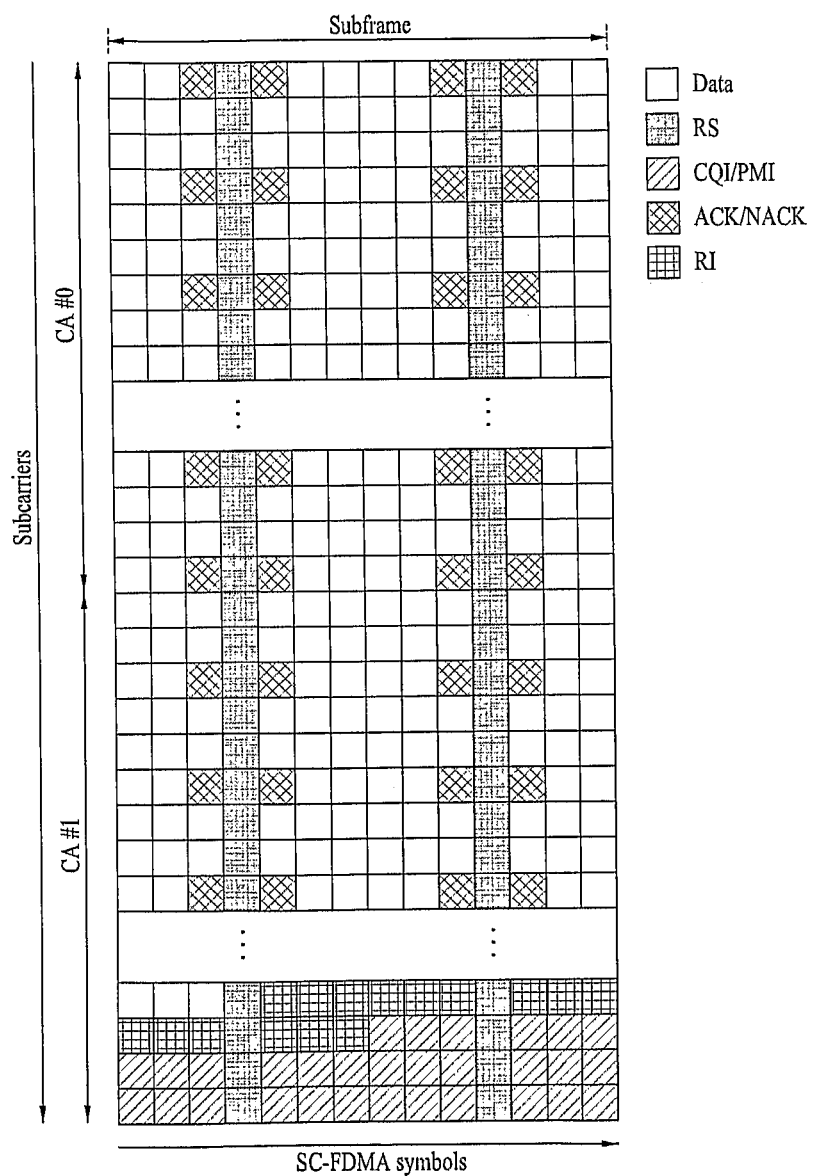

FIG. 73 illustrates a method for transmitting control information about N DL carrier groups in two UL carrier groups according to an exemplary embodiment of the present invention.

Referring to FIG. 73, a CQI/PMI is measured or calculated for each DL carrier group. The CQIs/PMIs about the DL carrier groups are encoded separately in ENCs or jointly in a single ENC. Then the coded CQIs/PMIs are mapped in the time-first manner, following data, such that they are arranged in a predetermined order of the DL carrier groups or they are interlaced with one another on a symbol basis. If an RI is transmitted together, the data, the RI, and the CQIs/PMIs in this order are sequentially mapped in the time-first manner.

HARQ responses, i.e. ACKs/NACKs for the respective DL carrier groups are encoded separately in the ENCs or jointly in the single ENC and distributed to the UL carrier groups, for transmission. The total number of subcarriers available for transmission except for the subcarriers having the CQIs/PMIs in the UL carrier groups is added to the number of the coded ACK/NACK symbols and the sum is divided by the maximum number of ACK/NACK symbols per subcarrier and rounded up. The coded ACKs/NACKs are mapped to the available subcarriers except the subcarriers including the CQIs/PMIs, at a maximum of four REs per subcarrier (there are four symbols adjacent to RSs, if the number of RSs per subcarrier is 2), in such a manner that they are arranged in a predetermined order of the DL carrier groups or are interlaced with one another on a symbol basis.

RIs for the DL carrier groups are encoded separately in the ENCs or jointly in the single ENC. Then the coded RIs are mapped in the time-first manner, following the data, in such a manner that the coded RIs are arranged in a predetermined order of the DL carrier groups or are interlaced with one another on a symbol basis. If the CQIs/PMIs are transmitted together, the data, the RIs, and the CQIs/PMIs in this order are sequentially mapped in the time-first manner.

Data is rate-matched with the CQIs/PMIs and the RIs. Thus, the data is mapped to REs other than the REs of the CQIs/PMIs and the RIs in the time-first manner. Meanwhile, the data is punctured for the ACKs/NACKs FIG. 74 is a block diagram of a device which is applicable to a UE and can implement the above-described methods.

Figure 74:
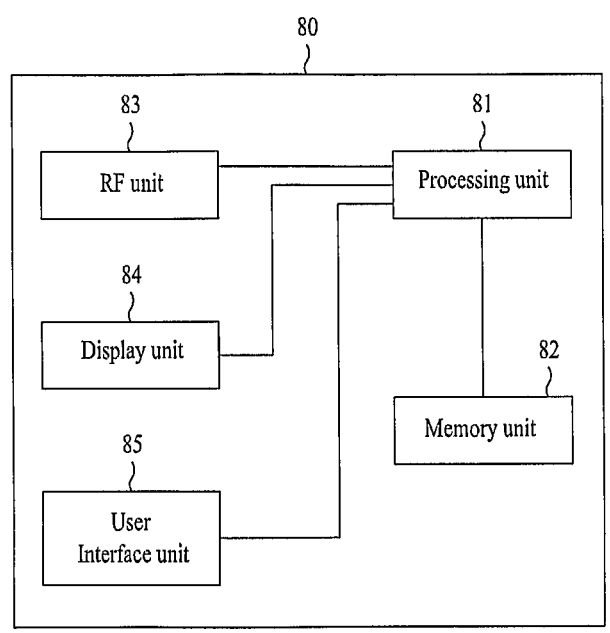
FIG. 74 is a block diagram of a device which is applicable to a User Equipment (UE) and can implement the above-described methods.

Referring to FIG. 74, a device 80 includes a processing unit 81, a memory unit 82, a Radio Frequency (RF) unit 83, a display unit 84, and a user interface unit 85. The processing unit 81 takes charge of physical interface protocol layers. The processing unit 81 provides a control plane and a user plane. The functionalities of each layer may be performed in the processing unit 81. The memory unit 82 is electrically connected to the processing unit and stores an operating system, application programs, and normal files. If the device 80 is a UE, the display unit 84 may display various pieces of information and may be implemented using a Liquid Crystal Display (LCD), an Organic Light Emitting Diode (OLED), or the like, which is known in the art. The user interface unit 85 may be configured in combination with a known user interface such as a keypad, a touch screen, etc. The RF unit 83 is electrically connected to the processing unit 812, for transmitting and receiving RF signals.

In the exemplary embodiments of the present invention, a description is made of a data transmission and reception relationship between a BS and a mobile terminal. In some cases, a specific operation described as performed by the BS may be performed by an upper node of the BS.

Namely, it is apparent that, in a network comprised of a plurality of network nodes including a BS, various operations performed for communication with a mobile terminal may be performed by the BS, or network nodes other than the BS. The term 'BS' may be replaced with the term 'evolved Node B (eNB)', 'fixed station', 'Node B', 'access point', etc. In the present invention, a mobile terminal corresponds to a UE. The term 'mobile terminal' may be replaced with the term 'Mobile Station (MS)', 'Subscriber Station (SS)', 'Mobile Subscriber Station' (MSS), etc.

The exemplary embodiments of the present invention may be achieved by various means, for example, hardware, firmware, software, or a combination thereof. In a hardware configuration, a method for reporting a CQI in a wireless communication system according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, a method for reporting a CQI in a wireless communication system according to exemplary embodiments of the present invention may be implemented in the form of a module, a procedure, a function, etc. performing the above-described functions or operations. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

It is obvious to those skilled in the art that claims that are not explicitly cited in each other in the appended claims may be presented in combination as an exemplary embodiment of the present invention or included as a new claim by a subsequent amendment after the application is filed.

MODE FOR INVENTION

Various embodiments have been described in the best mode for carrying out the invention.

INDUSTRIAL APPLICABILITY

As apparent from the above description, embodiments of the present invention are applicable to a user equipment (UE), a base station (BS), or other devices of a wireless mobile communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting uplink control information in a wireless communication system, the method comprising:
receiving one or more downlink component carriers among N downlink component carriers created by dividing a multi-carrier by an integer N; and
transmitting control information about the received one or more downlink component carriers in one or more uplink component carriers among N uplink component carriers created by dividing a multi-carrier by the integer N,
wherein the control information about the received one or more downlink component carriers is distributed equally or unequally to the one or more uplink component carriers and the control information includes at least one of a Channel Quality Information/Precoding Matrix Index (CQI/PMI), an ACKnowledgment/Negative ACKnowledgment (ACK/NACK), and a Rank Indication (RI), and
wherein the control information about each of the received one or more downlink component carriers is separately encoded, concatenated, and distributed equally or unequally to the one or more uplink component carriers.

2. The method according to claim 1, wherein if data is constructed in a plurality of code blocks in a subframe included in the one or more uplink component carriers, the plurality of code blocks are interlaced on a time-domain modulation symbol basis in the subframe and mapped to the subframe.

3. The method according to claim 1, wherein if data is constructed in a plurality of code blocks in a subframe included in the one or more uplink component carriers, each of the plurality of code blocks is mapped diagonally to the subframe on a time-domain modulation symbol basis.

4. The method according to claim 1, wherein the CQI/PMI included in the control information about the received one or more downlink component carriers is sequentially mapped, starting from a first symbol of a first subcarrier used for uplink transmission.

5. The method according to claim 1, wherein the ACK/NACK included in the control information about the received one or more downlink component carriers is mapped to symbols next to symbols to which a Reference Signal (RS) is mapped, starting from a last subcarrier toward a first subcarrier used for uplink transmission.

6. The method according to claim 1, wherein the ACK/NACK included in the control information about the received one or more downlink component carriers is mapped to symbols next to symbols to which an RS is mapped, starting from a first subcarrier toward a last subcarrier used for uplink transmission.

7. The method according to claim 1, wherein the RI included in the control information about the received one or more downlink component carriers is mapped to symbols apart from an RS by one Resource Element (RE), starting from a last subcarrier toward a first subcarrier used for uplink transmission.

8. The method according to claim 1, wherein the RI included in the control information about the received one or more downlink component carriers is mapped sequentially, following data mapped in a predetermined carrier group.

9. A User Equipment (UE) for transmitting uplink control information in a wireless communication system, the UE comprising:
a receiver for receiving one or more downlink component carriers among N downlink component carriers created by dividing a multi-carrier by an integer N;
a transmitter for transmitting control information about the received one or more downlink component carriers in one or more uplink component carriers among N uplink component carriers created by dividing a multi-carrier by the integer N; and
a processor for distributing the control information about the received one or more downlink component carriers equally or unequally to the one or more uplink component carriers,
wherein the control information includes at least one of a Channel Quality Information/Precoding Matrix Index (CQI/PMI), an ACKnowledgment/Negative ACKnowledgment (ACK/NACK), and a Rank Indication (RI), and
wherein the processor separately encodes control information about each of the received one or more downlink component carriers, concatenates the separately coded control information, and distributes the concatenated control information equally or unequally to the one or more uplink component carriers.

10. The UE according to claim 9, wherein if data is constructed in a plurality of code blocks in a subframe included in the one or more uplink component carriers, the processor maps the plurality of code blocks to the subframe by interlacing the plurality of code blocks on a time-domain modulation symbol basis.

11. The UE according to claim 9, wherein if data is constructed in a plurality of code blocks in a subframe included in the one or more uplink component carriers, the processor maps each of the plurality of code blocks diagonally to the subframe on a time-domain modulation symbol basis.

12. The UE according to claim 9, wherein the processor sequentially maps the CQI/PMI included in the control information about the received one or more downlink component carriers, starting from a first symbol of a first subcarrier used for uplink transmission.

13. The UE according to claim 9, wherein the processor maps the ACK/NACK included in the control information about the received one or more downlink component carriers to symbols next to symbols to which a Reference Signal (RS) is mapped, starting from a last subcarrier toward a first subcarrier used for uplink transmission.

14. The UE according to claim 9, wherein the processor maps the ACK/NACK included in the control information about the received one or more downlink component carriers to symbols next to symbols to which an RS is mapped, starting from a first subcarrier toward a last subcarrier used for uplink transmission.

15. The UE according to claim 9, wherein the processor maps the RI included in the control information about the received one or more downlink component carriers to symbols apart from an RS by one Resource Element (RE), starting from a last subcarrier toward a first subcarrier used for uplink transmission.

16. The UE according to claim 9, wherein the processor sequentially maps the RI included in the control information about the received one or more downlink component carriers, subsequently to data mapped in a predetermined carrier group.

* * * * *